US008130486B2

(12) United States Patent
Kawahara et al.

(10) Patent No.: US 8,130,486 B2
(45) Date of Patent: Mar. 6, 2012

(54) ELECTRONIC COMPONENT AND METHOD OF MANUFACTURING THE SAME

(75) Inventors: Kazuya Kawahara, Kyoto (JP); Yuuki Murata, Yamaguchi (JP); Takashi Oda, Yamaguchi (JP)

(73) Assignee: Panasonic Corporation, Osaka (JP)

( * ) Notice: Subject to any disclaimer, the term of this patent is extended or adjusted under 35 U.S.C. 154(b) by 479 days.

(21) Appl. No.: 12/498,572

(22) Filed: Jul. 7, 2009

(65) Prior Publication Data
US 2010/0014217 A1 Jan. 21, 2010

(30) Foreign Application Priority Data

Jul. 10, 2008 (JP) .................................. 2008-179839
Jul. 10, 2008 (JP) .................................. 2008-179840
Jul. 10, 2008 (JP) .................................. 2008-179841

(51) Int. Cl.
*H01G 4/32* (2006.01)
*H01G 9/04* (2006.01)
*H01G 9/10* (2006.01)

(52) U.S. Cl. ........ 361/511; 361/530; 361/538; 361/520; 29/25.03; 29/25.42

(58) Field of Classification Search ................. 361/511, 361/515, 517, 520, 530–531, 533, 535, 538–529, 361/540, 323; 29/25.42, 25.03
See application file for complete search history.

(56) References Cited

U.S. PATENT DOCUMENTS

| 4,760,494 | A | * | 7/1988 | Crum ............................. 361/272 |
| 4,763,227 | A | * | 8/1988 | Novacek ........................ 361/538 |
| 4,931,961 | A | * | 6/1990 | Ando et al. .................... 361/535 |
| 7,719,822 | B2 | * | 5/2010 | Kodera ........................... 361/520 |
| 7,778,012 | B2 | * | 8/2010 | Fujimoto ....................... 361/523 |
| 2003/0123217 | A1 | * | 7/2003 | Nakamura et al. ........... 361/520 |
| 2006/0034026 | A1 | * | 2/2006 | Chiku et al. .................... 361/85 |

FOREIGN PATENT DOCUMENTS

| JP | 01150315 A | * | 6/1989 |
| JP | 04373113 A | * | 12/1992 |
| JP | 6-045201 | | 2/1994 |

* cited by examiner

*Primary Examiner* — Eric Thomas
(74) *Attorney, Agent, or Firm* — Wenderoth, Lind & Ponack, L.L.P.

(57) ABSTRACT

An electronic component includes a functional element, first and second collectors joined to the functional element, and an outer package integrally covering the functional element and the first and second collectors. The functional element has first and second end surfaces having circular shapes and a side surface having a cylindrical shape extending along a center axis. The element includes first and second electrode foils rolled about the center axis and exposed from the first and second surfaces, respectively. The outer package has first and second surfaces parallel to the first and second end surfaces of the functional element, and has first to fourth corners as seen from a direction of the center axis. The first corner is adjacent to the second corner. The first and second terminals are arranged at the first and second corners of the outer package, respectively. This electronic component can have a small size and a small height while reducing its equivalent series resistance.

21 Claims, 29 Drawing Sheets

ELECTRONIC COMPONENT AND METHOD OF MANUFACTURING THE SAME

FIELD OF THE INVENTION

The present invention relates to an electronic component, such as a solid electrolytic capacitor, having a small equivalent series resistance, and a method of manufacturing the capacitor.

BACKGROUND OF THE INVENTION

Electronic components having a small equivalent series resistance (ESR) and being excellent in high frequency characteristics have recently required as digital equipments have been developed. Solid electrolytic capacitors employing solid electrolyte, such as manganese dioxide, polyaniline, polypyrrole, or polythiophene are put in the market as an electronic component. A capacitor including a roll type functional element having a rolled electrode foil and a capacitor including a stacked type functional element having electrode foils stacked in a thickness direction are known as the solid electrolytic capacitors. The roll type element can have a larger capacitance due to its structure and can be more efficiently produced than the stacked type element.

FIG. 34 is a cross-sectional view of solid electrolytic capacitor 601, a conventional electronic component including a roll type functional element disclosed in JP6-45201A. Solid electrolytic capacitor 601 includes roll type capacitor element 101, a pair of lead wires 102 drawn out from capacitor element 101, and outer package resin 103 that covers capacitor element 101. Capacitor element 101 includes a positive electrode foil having a dielectric oxide layer on a surface roughened by an etching process, a negative electrode foil, and a solid electrolyte layer produced on a surface of the positive electrode foil. A separator is provided between the positive electrode foil and the negative electrode foil. The positive electrode foil, the negative electrode foil, and the separator are rolled to form roll type capacitor element 101. Respective one ends of the pair of lead wires 102 has one end rolled in and connected to the positive electrode foil and the negative electrode foil of capacitor element 101. Respective other ends are drawn out from the electrode foils of capacitor element 101. Outer package resin 103 covers capacitor element 101 to expose respective portions of lead wires 102 to outside. The solid electrolyte layer includes a polyaniline film formed on the surface of the positive electrode foil, and a polypyrrole film formed on the polyaniline film. The polypyrrole film is formed by chemical polymerization.

In solid electrolytic capacitor 601, fine etching pits formed in the surface of the positive electrode foil by etching increases the surface area of the surface at a large magnification. The solid electrolyte layer is uniformly and densely formed within the fine etching pits, hence providing solid electrolytic capacitor 601 with excellent electrical characteristics, such as a large capacitance, as well as a small size and a low profile.

Solid electrolytic capacitor 601 including conventional roll type capacitor element 101 is prevented from having a smaller size and a lower profile while maintaining the electrical characteristics, such as large capacitance.

Roll type capacitor element 101 generally has a cylindrical shape. An electronic component, such as solid electrolytic capacitor 601, occupies substantially a space having a rectangular parallelepiped shape when mounted on a circuit board. Therefore, a dead space is formed at four corners of the space when circular columnar shaped capacitor element 101 is accommodated in the space having the rectangular parallelepiped shape. In order to reduce the size and height of conventional solid electrolytic capacitor 601, the width, length, and thickness of the electrode foils of capacitor element 101 need to be further reduced as capacitor element 101 cannot effectively occupy the dead space. The capacitance per unit area of the electrode foil can be increased by raising the magnification of increase of the surface area by etching even while the width, length, and thickness of the electrode foil are reduced. However, the etching pits becomes finer if the surface area is increased by etching, and accordingly, prevents the solid electrolyte from covering the surface of the electrode foil, hence providing the capacitor with a large resistance. The finer pits reduces the strength of the electrode foil, hence preventing control in production processes, such as lead wire connection and electrode foil rolling. Thus, conventional solid electrolytic capacitor 601, upon having a smaller size and a smaller height, adversely affects electrical characteristics, such as a small capacitance and a large ESR.

SUMMARY OF THE INVENTION

An electronic component includes a functional element, first and second collectors joined to the functional element, and an outer package integrally covering the functional element and the first and second collectors. The functional element has first and second end surfaces having circular shapes and a side surface having a cylindrical shape extending along a center axis. The element includes first and second electrode foils rolled about the center axis and exposed from the first and second surfaces, respectively. The outer package has first and second surfaces parallel to the first and second end surfaces of the functional element, and has first to fourth corners as seen from a direction of the center axis. The first corner is adjacent to the second corner. The first and second terminals are arranged at the first and second corners of the outer package, respectively.

This electronic component can have a small size and a small height while reducing its equivalent series resistance.

DETAILED DESCRIPTION OF PREFERRED EMBODIMENTS

Exemplary Embodiment 1

Figure 1:
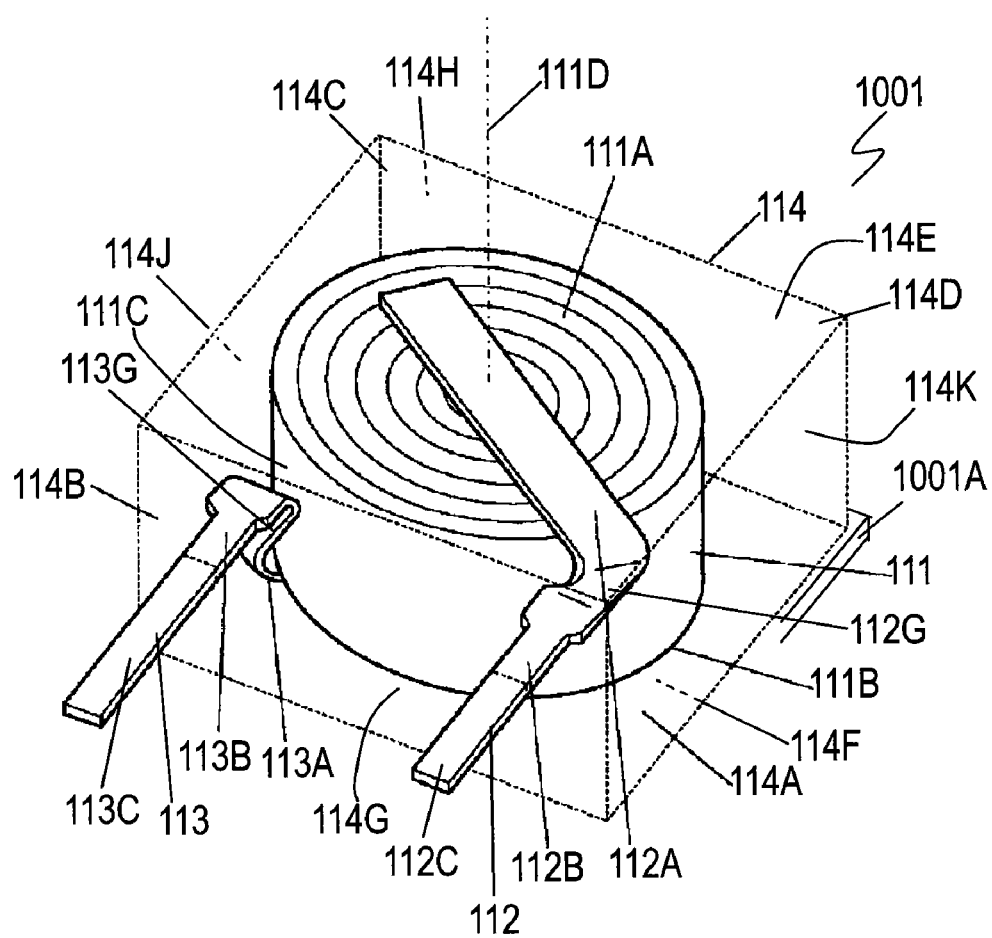
FIG. 1 is a perspective view of an electronic component according to Exemplary Embodiment 1 of the present invention.

FIG. 1 is a perspective view of solid electrolytic capacitor 1001, an electronic component, according to Exemplary Embodiment 1 of the present invention. Solid electrolytic capacitor 1001 includes capacitor element 111, i.e. a functional element, having end surfaces 111A and 111B opposite to each other, positive electrode collector 112 joined to end surface 111A of capacitor element 111, negative electrode collector 113 joined to end surface 111B of capacitor element 111, and outer package 114 for integrally covering capacitor element 111, positive electrode collector 112, and negative electrode collector 113. Capacitor element 111 is of a roll-type in which end surface 111A and end surface 111B function as a positive electrode and a negative electrode of capacitor element 111, respectively. Capacitor element 111 has a cylindrical shape extending along center axis 111D. Capacitor element 111 has circular end surfaces 111A and 111B opposite to each other arranged along center axis 111D, and side surface 111C extending parallel to center axis 111D and about center axis 111D. Positive electrode collector 112 includes collector plate 112A joined to end surface 111A of capacitor element 111, and terminal 112B for external connection extending from collector plate 112A. Negative electrode collector 113 includes collector plate 113A joined to end surface 111B of capacitor element 111, and terminal 113B for external connection extending from collector plate 113A. Outer package 114 having has a rectangular parallelepiped shape integrally covers capacitor element 111, positive electrode collector 112, and negative electrode collector 113 while exposing portions of terminals 112B and 113B of collectors 112 and 113 to outside. Outer package 114 has surfaces 114E and 114F perpendicular to center axis 111D, and surfaces 114G, 114H, 114J, and 114K connected to surfaces 114E and 114F and parallel to center axis 111D. Surfaces 114E and 114F have a square shape or a rectangular shape. Surfaces 114G, 114H, 114J, and 114K have a rectangular shape. Terminals 112B and 113B protrude from surface 114G. Surface 114H is parallel to surface 114G and positioned opposite to surface 114G. Surface 114J is connected perpendicularly to surfaces 114G and 114H. Surface 114K is connected perpendicularly to surfaces 114G and 114H, is parallel to surface 114J, and is positioned opposite to surface 114J. Outer package 114 has four corners 114A to 114D that are not occupied by capacitor element 111 as seen from a direction of center axis 111D, that is, as seen from surfaces 114E and 114F. Respective portions of terminals 112B and 113B of collectors 112 and 113 are arranged at corners 114A and 114B of the rectangular parallelepiped shape of outer package 114, respectively. Terminals 112B and 113B extend from corners 114A and 114B, respectively. Surface 114F is a mounting surface adapted to contact circuit board 1001A when solid electrolytic capacitor 1001 is mounted onto circuit board 1001A. Surface 114G extends from corner 114A to corner 114B. Surface 114K extends from corner 114A to corner 114C.

Capacitor element 111 includes a positive electrode foil made of valve metal, such as aluminum, a dielectric oxide layer provided on a surface of the positive electrode foil, a separator provided on the dielectric oxide layer, and a negative electrode foil made of valve metal, such as aluminum, provided on the separator. The positive electrode foil, the dielectric oxide layer, the separator, and the negative electrode foil are rolled about center axis 111D to have a substantially cylindrical shape. Side surface 111C having a cylindrical shape provided at an outer periphery of capacitor element 111 is fastened with an insulating tape, such as an adhesive tape. The surface area of the surface of the positive electrode foil at which the dielectric oxide layer is provided is enlarged by etching. Center axis 111D is perpendicular to surface 114F, the mounting surface of solid electrolytic capacitor 1001.

The positive electrode foil and the negative electrode foil of capacitor element 111 are rolled while deviating from each other along center axis 111D. Thus, the positive electrode foil is exposed at end surface 111A, and the negative electrode foil is exposed at end surface 111B.

Capacitor element 111 further includes an electrolyte held between the positive electrode foil and the negative electrode foil, mainly held in the separator. The electrolyte may employ solid conductive polymer, such as polyaniline, polypyrrole, polythiophene, or a derivative thereof, or liquid electrolyte, such as electrolytic solution.

Each of the positive electrode and the negative electrode may include a collector made of aluminum foil and a polarized electrode layer made of carbon material arranged on the collector. The positive electrode and the negative electrode overlaps across the separator, and are rolled to have a substantially cylindrical shape.

Capacitor element 111 may be a metalized film capacitor. The capacitor has a substantially cylindrical shape in which the positive electrode and the negative electrode both made of metalized film overlap and are rolled. The metalized film includes a dielectric film made from polyethylene telephtalate, polypropylene, polyethylene naphthalate, or polyphenylene sulfide, and a vapor deposited electrode formed by partially vapor depositing metal, such as aluminum, on a surface of the dielectric film. The positive electrode and the negative electrode overlap and are rolled such that the vapor deposited electrodes of the positive electrode and the negative electrode do not contact each other.

The functional element is an active element or a passive element that performs an electrical function. For instance, if the electronic component is a capacitor, the electronic component has a predetermined electrical function serving as a capacitor. In this case, the functional element is a capacitor element, and performs a predetermined electrical function serving as the capacitor. If the electronic component is a battery, the electronic component has a predetermined electrical function serving as a battery. In this case, the functional element is a battery element, and performs a predetermined electrical function serving as the battery. If the electronic component is a semiconductor device, the electronic component has a predetermined electrical function serving as a semiconductor device. In this case, the functional element is a semiconductor element, and performs a predetermined electrical function serving as the semiconductor device.

Collector plate 112A and terminal 112B of positive electrode collector 112 are unitarily formed, and similarly, collector plate 113A and terminal 113B of negative electrode collector 113 are unitarily formed.

Collector plates 112A and 113A are made of a metal material having a plate shape. Collector plates 112A and 113A contact end surfaces 111A and 111B of capacitor element 111, respectively. Then, collector plate 112A and the positive electrode exposed at end surface 111A are mechanically and electrically joined by laser welding. Collector plate 113A and the negative electrode exposed at end surface 111B are mechanically and electrically joined by laser welding.

Further conductive materials, such as metal fine particles, may be provided between collector plate 112A and end surface 111A and between collector plate 113A and end surface 113B to join collector plate 112A and end surface 111A and to join collector plate 113A and end surface 111B.

Collector plates 112A and 113A are made of material, such as elementary substance of aluminum, iron, nickel or copper, or metal base material, such as aluminum alloy, iron alloy, nickel alloy, or copper alloy, that can be mechanically and electrically joined with the electrodes of capacitor element 111. In the case that the electrode foil is made of aluminum, collector plates 112A and 113A are preferably made of plate material of aluminum. Collector plates 112A and 113A can be easily joined to edges of the electrode foils exposed at end surfaces 111A and 111B of capacitor element 111 with a large joining area.

Terminals 112B and 113B are made of flat metal materials unitarily formed with collector plates 112A and 113A, respectively. Terminals 112B and 113B are connected to respective one ends of collector plates 112A and 113A, and are arranged at respective corners 114A and 114B of outer package 114 adjacent to each other of the rectangular parallelepiped shape.

Figure 2:
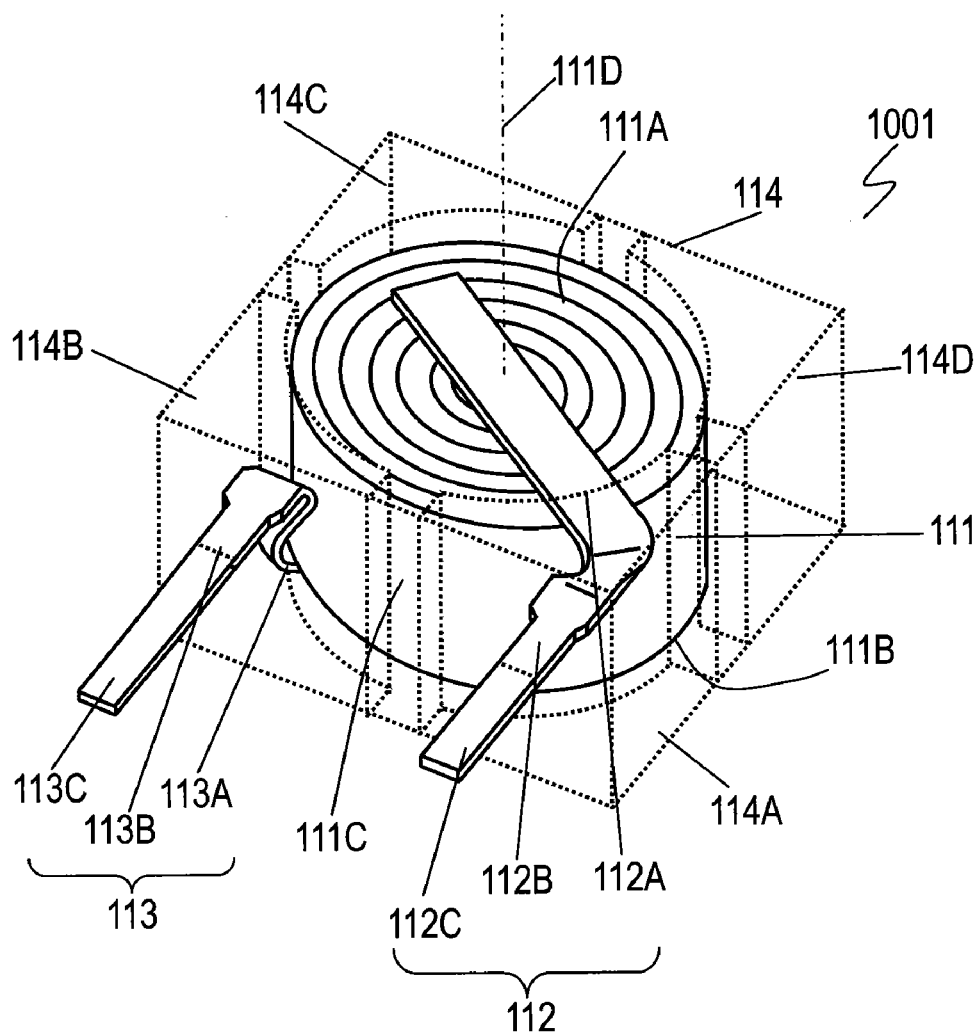
FIG. 2 is a perspective view of the electronic component according to Embodiment 1.

FIG. 2 is a perspective view of solid electrolytic capacitor 1001 for illustrating corners 114A to 114D of outer package 114. As shown in FIG. 2, capacitor element 111 is accommodated in outer package 114 such that circular end surfaces 111A, 111B of cylindrical capacitor element 111 are parallel to surfaces the rectangular parallelepiped shape of outer package 114 opposite to each other. Corners 114A to 114D are positioned between cylindrical side surface 111C of capacitor element 111 and a surface of the rectangular parallelepiped shape of outer package 114. Corners 114A and 114D are positioned diagonally in the rectangular parallelepiped shape. Corners 114B and 114C are positioned diagonally in the rectangular parallelepiped shape. Corners 114A and 114B are positioned adjacent to each other. Collector plate 112A of positive electrode collector 112 extends elongatedly from corner 114A towards corner 114C across center axis 111D. Collector plate 113A of positive electrode collector 113 extends elongatedly from corner 114B towards corner 114D across center axis 111D.

Terminals 112B and 113B have distal end portions 112C and 113C, respectively, that are exposed to outside of outer package 114. Plated layers may be formed on surfaces of distal end portion 112C and 113C of terminal 112B and 113B to connect securely to circuit board 1001A by soldering. The plated layers may be formed by plating elementary substance, such as Ni or Sn, or tin-based metal, such as tin alloy containing Sn and at least one of Ag, Bi, In, and Pb.

Outer package 114 covers capacitor element 111 while exposing the portions of terminals 112B and 113B to the outside, and is made of insulating resin, such as epoxy resin, having high air tightness, high heat resistance, and excellent mechanical properties.

Capacitor element 111 may be accommodated in a metal case having an opening. In this case, the opening of the metal case is sealed with an insulating elastic member, such as a rubber, having apertures allowing the portions of terminals 112B and 113B to exposed to outside.

A method of manufacturing solid electrolytic capacitor 1001 according to Embodiment 1 will be described below. FIGS. 3A to 3F illustrate the method of manufacturing solid electrolytic capacitor 1001.

Figure 3A:
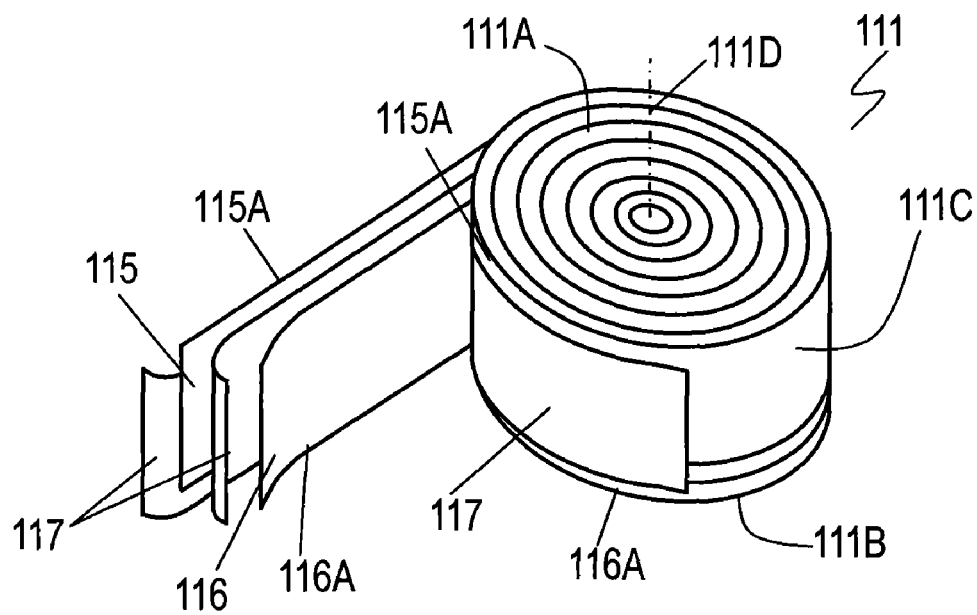
FIGS. 3A to 3F are perspective views of the electronic component according to Embodiment 1 for illustrating a method of manufacturing the electronic component

FIG. 3A illustrates the structure of capacitor element 111. Electrode foil 115, electrode foil 116, and separator 117 having an insulating property are stacked and rolled about center axis 111D to have a substantially cylindrical shape while separator 117 is provided between positive electrode foil 115 and negative electrode foil 116. Then, side surface 111C having a substantially cylindrical shape is fastened with an insulating tape to provide roll type capacitor element 111. Electrode foil 115 is made of valve metal, aluminum according to Embodiment 1, and includes a dielectric oxide layer at a surface of the electrode foil 115. Negative electrode foil 116 is made of aluminum. In this case, center axis 111D is perpendicular to a surface of circuit board 1001A to which solid electrolytic capacitor 1001 is adapted to be mounted. Electrode foil 115 has the same width as electrode foil 116 in the direction of center axis 111D. While being would, electrode foil 115 deviates from electrode foil 116 towards end surface 111A along center axis 111D. This arrangement exposes edge 115A of electrode foil 115 at end surface 111A of capacitor element 111 to allow edge 115A to protrude from end surface 111A. Similarly, this arrangement expose edge 116A of electrode foil 116 at end surface 111B to allow edge 116A to protrude from end surface 111B. Separator 117 is made of porous insulator, such as fiber having numerous voids. Electrode 115 is removed from end surface 111B. Electrode 116 is removed from end surface 111A.

Figure 3B:
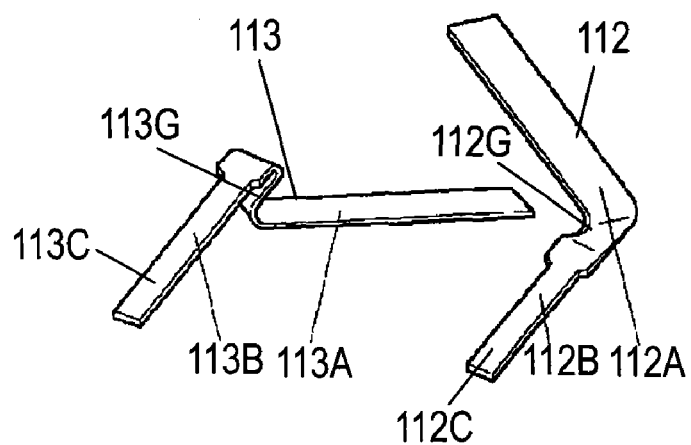

FIG. 3B is a perspective view of positive electrode collector 112 and negative electrode collector 113. Collectors 112 and 113 are made of a metal plate made of aluminum. Terminal 112B extends from one end of collector plate 112A, and has a smaller width than collector plate 112A. Terminal 113B extends from one end of collector plate 113A, and has a smaller width than collector plate 113A.

Plated layers made of tin-based alloy may be provided on respective surfaces of distal end portions 112C and 113C of terminals 112B and 113B so as to be easily soldered to circuit board 1001A.

Collector 112 further includes junction portion 112G connected between collector plate 112A and terminal 112B. Junction portion 112G is substantially perpendicular to collector plate 112A and terminal 112B. Junction portion 112G can be formed by bending collector plate 112A substantially perpendicularly, and then bending the plate substantially perpendicularly to the previously-bent direction. Collector plate 112A is parallel to distal end portion 112C of terminal 112B. Collector 113 further includes junction portion 113G connected between collector plate 113A and terminal 113B. Junction portion 113G is substantially perpendicular to collector plate 113A and terminal 113B. Junction portion 113G can be formed by bending collector plate 113A substantially perpendicularly, and then bending the plate substantially perpendicularly to the previously-bent direction. Collector plate 113A is parallel to distal end portion 113C of terminal 113B.

Each junction portion 112G and 113G can be formed by bending terminals 112B and 113B instead of collector plates 112A and 113A.

Figure 3C:
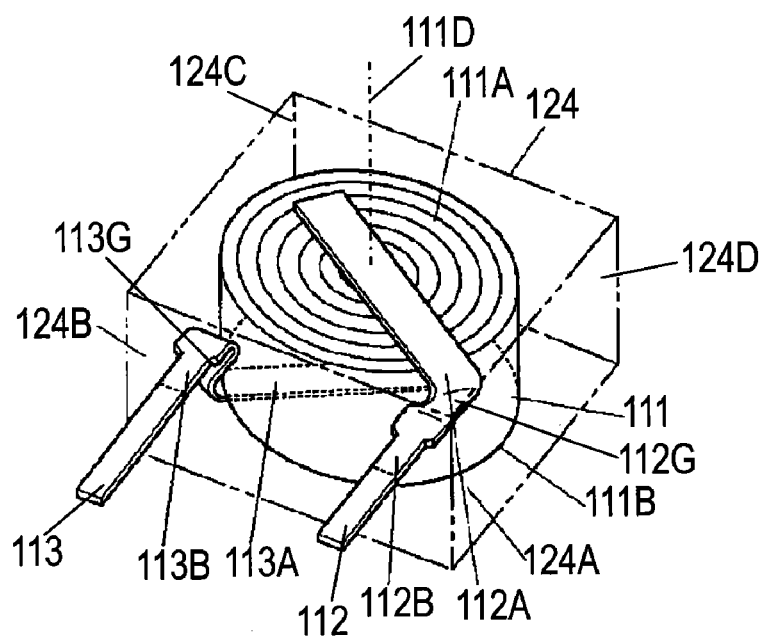

Collectors 112 and 113 are then attached to capacitor element 111, as shown in FIG. 3C. Virtual rectangular parallelepiped 124 shows a range in which outer package 114 covers capacitor element 111. Terminals 112B and 113B are positioned at corners 124A and 124B of virtual rectangular parallelepiped 124 adjacent to each other, such that distal end portions 112C and 113C of terminals 112B and 113B extend in the same direction perpendicular to center axis 111D, respectively. Upon being attached, collector plate 112A is joined to edge 115A of electrode foil 115 protruding from end surface 111A of capacitor element 111, and collector plate 113A is joined to edge 116A of electrode foil 116 protruding from end surface 111B of capacitor element 111.

As shown in FIG. 3C, junction portions 112G and 113G of collectors 112 and 113 are parallel to center axis 111D, that is, side surface 111C of capacitor element 111 having the cylindrical surface while collectors 112 and 113 are attached to capacitor element 111. Therefore, collectors 112 and 113 can be arranged at predetermined positions with respect to capacitor element 111 easily.

Junction portions 112G and 113G can be formed by bending collector plates 112A and 113A or terminals 112B and 113B after collector plates 112A and 113A are attached to capacitor element 111.

Figure 3D:
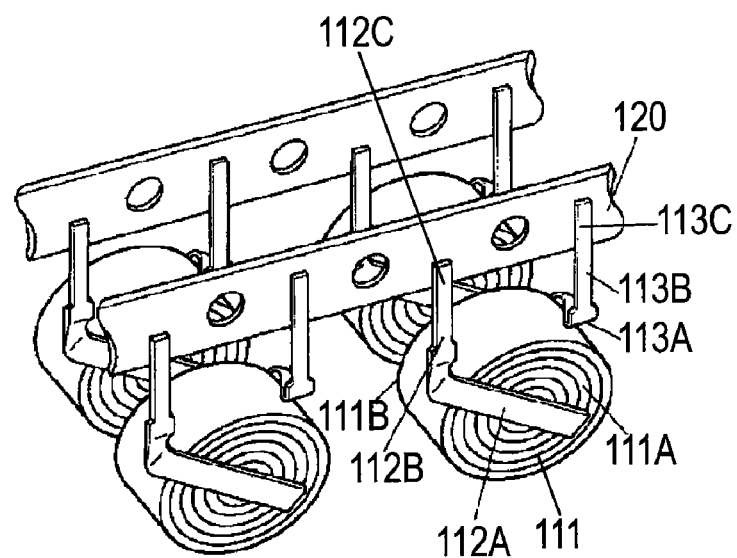

After that, as shown in FIG. 3D, distal end portions 112C and 113C of terminals 112B and 113B extending in the same direction are fixed to conveyor base 120 having a band shape with an adhesive to convey capacitor element 111. Distal end portions 112C and 113C of terminals 112B and 113B can be held with a chucking device pinching the distal end portions.

Figure 3E:
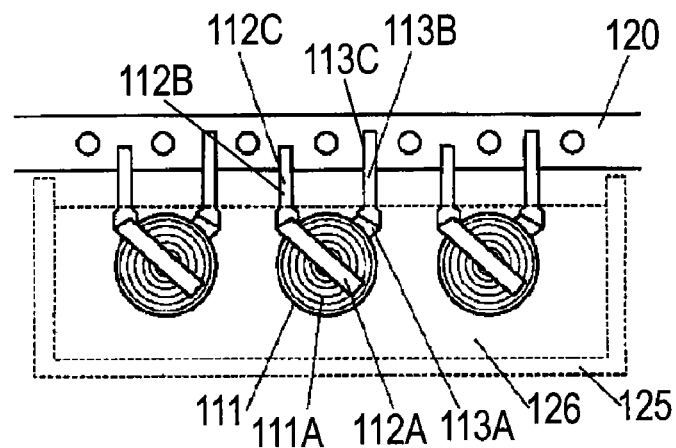

As shown in FIG. 3E, electrolyte-forming solution 126 containing polymerizable monomer, such as pyrrole or thiophene, and oxidant is prepared in container 125. While distal end portions 112C and 113C of terminals 112B and 113B held by conveying base 120 are located above capacitor element 111, capacitor element 111 is immersed in electrolyte-forming solution 126 to fill between electrode foils 115 and 116 of capacitor element 111 with electrolyte-forming solution 126. In this case, distal end portions 112C and 113C of terminals 112B and 113B are removed from solution 126 to prevent the portions from being immersed in electrolyte-forming solution 126. Then, capacitor element 111 is taken out from electrolyte-forming solution 126, thus forming a solid electrolyte layer containing conductive polymer, such as polypyrrole or polythiophene, on the surfaces of electrode foils 115 and 116 and in the voids of separator 117 by chemical polymerization at a predetermined temperature for a predetermined period of time.

Instead of immersing capacitor element 111 in electrolyte-forming solution 126 containing the polymerizable monomer and the oxidant, the capacitor element 111 can be sequentially immersed separately into polymerizable monomer solution and oxidant solution. The order of immersing capacitor element 111 into the polymerizable monomer solution and the oxidant solution can be appropriately determined.

Electrolyte-forming solution 126 contains solvent and additive, such as surfactant in addition to the polymerizable monomer and the oxidant, which are main constituents of polymerization reaction.

The polymerization for forming the solid electrolyte layer can be an electrolytic polymerization, or both the electrolytic polymerization and a chemical polymerization may be used.

Electrolyte-forming solution 126 may be solution for forming solid electrolytes, such as TCNQ complex salt or manganese dioxide, other than the conductive polymer.

Driving electrolytic solution containing organic solvent, such as ethylene glycol or γ-butyrolactone, and electrolyte material having conductive ion can be used as electrolyte-forming solution 126.

Electrolyte-forming solution 126 can be solution containing conductive polymer dispersed therein.

Figure 3F:
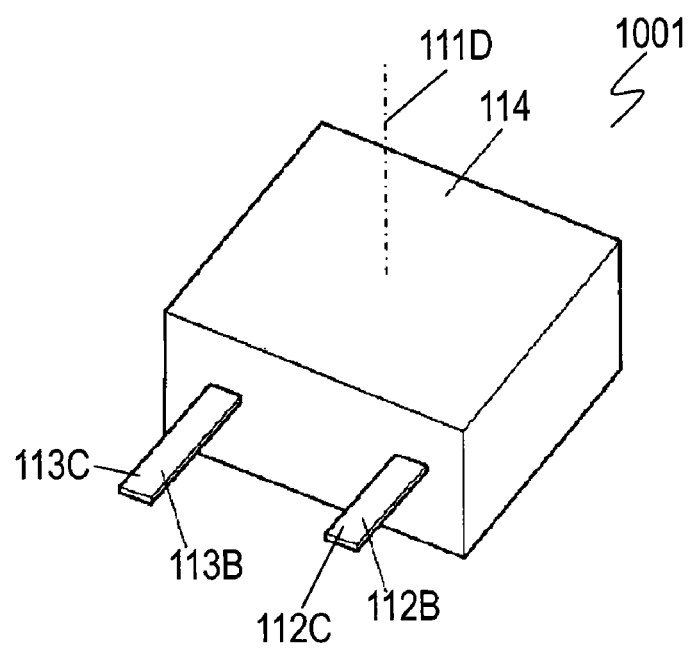

Then, as shown in FIG. 3F, outer package 114 having the rectangular parallelepiped shape is formed by covering capacitor element 111 with insulating resin material, such as epoxy. At this moment, terminals 112B and 113B are arranged at adjacent corners 114A and 114B of outer package 114, respectively while distal end portions 112C and 112B of terminals 112B and 113B are exposed to outside from surface 114G, respectively.

A voltage is then applied between terminals 112B and 113B to restore a defective portion of the dielectric oxide layer of electrode foil 115 so as to insulate the solid electrolyte at the defective portion and its vicinity, thereby reducing a leakage current and fabricating solid electrolytic capacitor 1001.

Capacitor element 111 can be immersed in re-anodizing solution after collectors 112 and 113 are attached to capacitor element 111, as shown in FIG. 3C, and then, the voltage may be applied between terminals 112B and 113B to re-anodizing electrode foil 115 to restore the dielectric oxide layer of electrode foil 115. In this case, capacitor element 111 can be immersed in the re-anodizing solution while being held by conveyor base 120, as shown in FIG. 3D.

Figure 34:
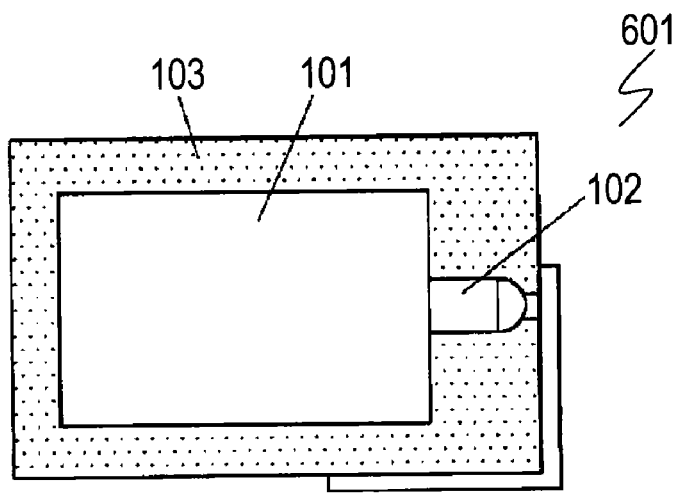
FIG. 34 shows a cross-sectional view of a conventional electronic component.

In solid electrolytic capacitor 1001, the electronic component according to Embodiment 1, collector plates 112A and 113A of collectors 112 and 113 are joined to edges 115A and 116A of electrode foils 115 and 116 protruding from end surfaces 111A and 111B of cylindrical capacitor element 111, respectively. This structure reduces a connection resistance between electrode foils 115 and 116 and collectors 112 and 113 more than lead wire 102 rolled in the electrode foil of conventional solid electrolytic capacitor 601 shown in FIG. 34, thus providing solid electrolytic capacitor 1001 with low equivalent series resistance (ESR).

Collector plates 112A and 113A are not rolled with electrode foils 115 and 116, and allow end surfaces 111A and 111B of capacitor element 111 to have a circular shape close to a perfect circle. Capacitor element 101 of conventional solid electrolytic capacitor 601 shown in FIG. 34 may cause short-circuiting due to the contact between the electrode foil and the edge of the lead wire where stress concentrates. In capacitor element 111 according to Embodiment 1, electrode foils 115 and 116 are rolled with uniform forces, and are not prevented from the above short circuiting.

The rectangular parallelepiped shape of outer package 114 matches with a space having a rectangular parallelepiped shaped space on circuit board 1001A substantially occupied by capacitor 1001 mounted on circuit board 1001A. Roll type capacitor element 111 having the cylindrical shape is accommodated in outer package 114, and causes four corners 114A to 114D of outer package 114 to become dead spaces that are not occupied by capacitor element 111. Terminals 112B and 113B are arranged at corners 114A and 114B of corners 114A to 114D, respectively, so that a dead space on circuit board 1001A formed by mounting solid electrolytic capacitor 1001 can be effectively utilized. Therefore, outer package 114 and solid electrolytic capacitor 1001 can have small sizes while the size of capacitor element 111 is not reduced, that is, while electrical characteristics, such as a large capacitance, is maintained.

Terminals 112B and 113B are arranged at corners 114A and 114B of outer package 114 adjacent to each other, respectively, and are not arranged at corners of four corners 114A to 114D positioned diagonally. Thus, during processes for manufacturing solid electrolytic capacitor 1001, particularly in the process for immersing capacitor element 111 in liquid substance, such as electrolyte-forming solution 126, capacitor element 111 can be immersed sufficiently in the liquid substance while distal end portions 112C and 113C of terminals 112B and 113B are located above capacitor element 111, thereby preventing the liquid substance from being attached to distal end portions 112C and 113C of terminals 112B and 113B. As a result, the liquid substance can sufficiently fill capacitor element 111 to form a dense electrolyte layer, accordingly providing capacitor element 111 with a low resistance and a large capacitance. Further, this arrangement provides capacitor element 111 with air tightness at an interface between terminals 112B and 113B and outer package 114 and allows distal end portions 112C and 113C of terminals 112B and 113B to be soldered easily, hence manufacturing solid electrolytic capacitor 1001 having high quality efficiently.

As shown in FIG. 3E, when capacitor element 111 is immersed in the liquid substance, such as electrolyte-forming solution 126, collector plates 112A and 113A of collectors 112 and 113 having plate shapes cover portions of end surfaces 111A and 111B of capacitor element 111. If collector plates 112A and 113A extend elongatedly in the same direction, that is, if the entire surfaces of collector plates 112A and 113A face each other across capacitor element 111, collector plates 112A and 113A blocks the portion of capacitor element 111 between collector plates 112A and 113A, hence preventing the liquid substance from penetrating into capacitor element 111.

In solid electrolytic capacitor 1001, the electronic component according to Embodiment 1, collector plate 112A extends elongatedly from corner 124A (114A) towards corner 124C (114C) positioned diagonally from corner 124A (114A). Collector plate 113A extends elongatedly from corner 124B (114B) adjacent to corner 124A and towards corner 124D (114D) positioned diagonally from corner 124B (114B). Collector plates 112A and 113A thus extend in directions perpendicular to each other so that collector plates 112A and 113A deviate to facing each other partially, as shown in FIG. 3C. This arrangement reduces the portion of capacitor element 111 blocked by collector plates 112A and 113A, accordingly allowing the liquid substance to sufficiently penetrate into capacitor element 111. As a result, a dense electrolyte layer can be formed in capacitor element 111, and provides capacitor element 111 with a low resistance and a large capacitance. This arrangement reduces a period of time for immersing capacitor element 111 in the liquid substance, accordingly allowing solid electrolytic capacitor 1001 with high quality to be manufactured efficiently.

Distal end portions 112C and 113C of terminals 112B and 113B are exposed from same surface 114G of outer package 114 and extend in the same direction. Therefore, as shown in FIG. 3D, during processes for manufacturing solid electrolytic capacitor 1001, distal end portions 112C and 113C of terminals 112B and 113B can be easily fixed to single conveyor base 120, thereby allowing solid electrolytic capacitor 1001 to be manufactured at high productivity.

Figure 4A:
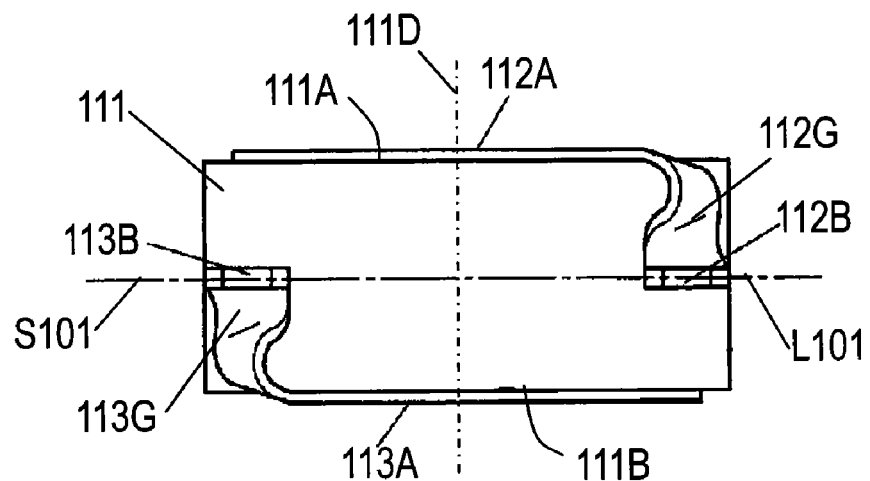
FIGS. 4A and 4B are side views of a functional element of the electronic component according to Embodiment 1.
Figure 4B:
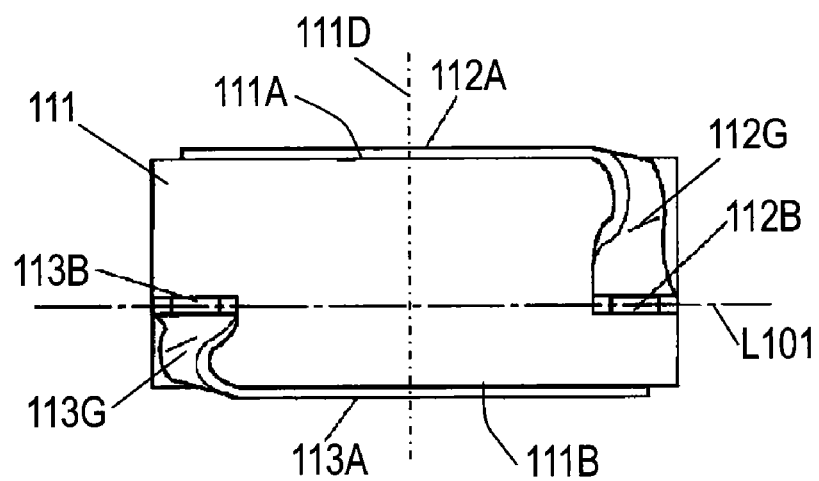

FIGS. 4A and 4B are side views of capacitor element 111, a functional element of solid electrolytic capacitor 1001, the electronic component according to Embodiment 1. Line L101 connecting distal end portions 112C and 113C of terminals 112B and 113B is substantially parallel to end surfaces 11A and 111B of capacitor element 111. Thus, as shown in FIG. 3D, intervals between plural capacitor elements 111 having distal end portions 112C and 113C of terminals 112B and 113C fixed to conveyor base 120 can be reduced, hence allowing electrolytic capacitor 1001 to be manufactured at high productivity with a small manufacturing apparatus with a small footprint. Furthermore, as shown in FIG. 3E, when plural capacitor elements 111 fixed to conveyor base 120 are immersed in the liquid substance, such as electrolyte-forming solution 126, container 125 storing the liquid substance can have a small size and has a quality easily controlled.

As shown in FIG. 4A, surface S101 which is parallel to end surfaces 111A and 111B of capacitor element 111 and which includes line L101 can be positioned at the middle between end surfaces 111A and 111B to allow collectors 112 and 113 to have the same shape, hence allowing components of the capacitor to be standardized and allowing solid electrolytic capacitor 1001 to be manufactured at high productivity.

Junction portions 112G and 113G extend perpendicularly from collector plates 112A and 113A of collectors 112 and 113 in outer package 114, respectively. Terminals 112B and 113B extend perpendicularly from junction portions 112G and 113G such that distal end portions 112C and 113C of terminals 112B and 113B are exposed from surface 114G of outer package 114. This structure provides a long path along which external elements, such as air and moisture, entering from the interface between terminals 112B and 113B and outer package 114 reach capacitor element 111. These external elements may deteriorate characteristics of capacitor element 111. The structure of collectors 112 and 113 prevents the external elements from reaching capacitor element 111, hence providing solid electrolytic capacitor 1001 with long-term environment resistance.

Figure 5:
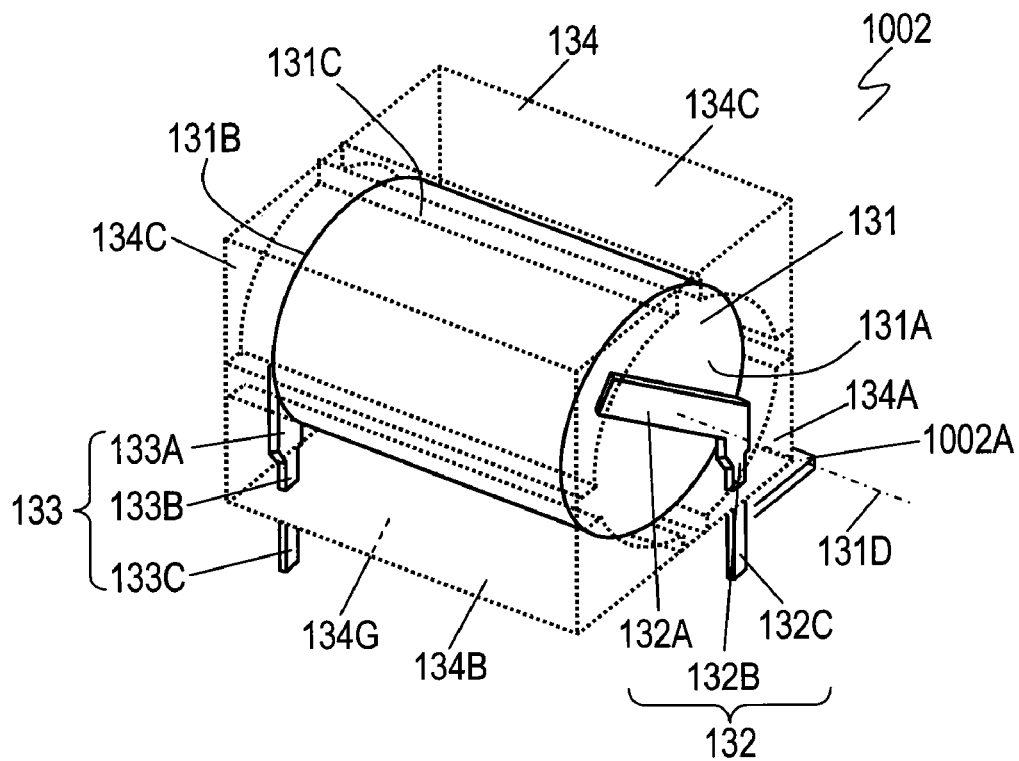
FIG. 5 is a perspective view of another electronic component according to Embodiment 1.

FIG. 5 is a perspective view of solid electrolytic capacitor 1002, another electronic component according to Embodiment 1. Solid electrolytic capacitor 1002 shown in FIG. 5 includes capacitor element 131, collectors 132 and 133 and outer package 134 instead of capacitor element 111, collectors 112 and 113, and outer package 114 of solid electrolytic capacitor 1001 shown in FIGS. 1 and 2. Capacitor element 131 has a cylindrical shape, and includes end surfaces 131A and 131B, side surface 131C, and center axis 131D similar to end surfaces 111A and 111B, side surface 111C, and center axis 111D of capacitor element 111 of solid electrolytic capacitor 1001, respectively. Outer package 134 having a rectangular parallelepiped shape accommodates capacitor element 131 having the cylindrical shape, and includes corners 134A to 134D and surfaces 134F and 134G similar to corners 114A to 114D and surfaces 114F and 114G of solid electrolytic capacitor 1001, respectively. Collectors 132 and 133 include collector plates 132A and 133A, terminals 132B and 133B, and distal end portions 132C and 133C similar to collector plates 112A and 113A, terminals 112B and 113B, and distal end portions 112C and 113C of collectors 112 and 113 of solid electrolytic capacitor 1001, respectively. Terminals 132B and 133B extend in the same direction perpendicular to center axis 131D from collector plates 133A and 133B, respectively. Terminals 132B and 133B are joined to end surfaces 131A and 131B of capacitor element 131, respectively. Distal end portions 132C and 133C of terminals 132B and 133B are exposed from surface 134G of outer package 134. Surface 134G is a mounting surface adapted to contact circuit board 1002A when capacitor 1002 is mounted onto circuit board 1002A. Center axis 131D is parallel to surface 134G, the mounting surface.

In order to reduce the height of solid electrolytic capacitor 1002 shown in FIG. 5, the areas of end surfaces 131A and 131B of capacitor element 131 become small, and the width of the electrode foil of capacitor element 131 along center axis 131D becomes large to ensure electrical characteristics, such as a capacitance. Therefore, the liquid substance penetrates into capacitor element 131 less than capacitor element 111 of solid electrolytic capacitor 1001.

In contrary, solid electrolytic capacitor 1001 shown in FIGS. 1 and 2 is mounted while surface 114G of outer package 114 contacts circuit board 1001A, and thus, the areas of end surfaces 111A and 111B of capacitor element 111 can be large even if its height is small. Therefore, the widths of electrode foils 115 and 116 in the direction perpendicular to center axis 111D can be large to ensure electrical characteristics, such as a capacitance. Therefore, the liquid substance can penetrate easily into capacitor element 111.

In the case that solid electrolytic capacitor 1001 according to Embodiment 1 has polarity, an appearance of capacitor 1001 can be modified appropriately to allow the polarity to be visually recognized. As shown in FIG. 1, the polarities of terminals 112B and 113B can be visually recognized by the lengths of distal end portions 112C and 113C exposed to the outside of outer package 114 which are different from each other.

Exemplary Embodiment 2

Figure 6:
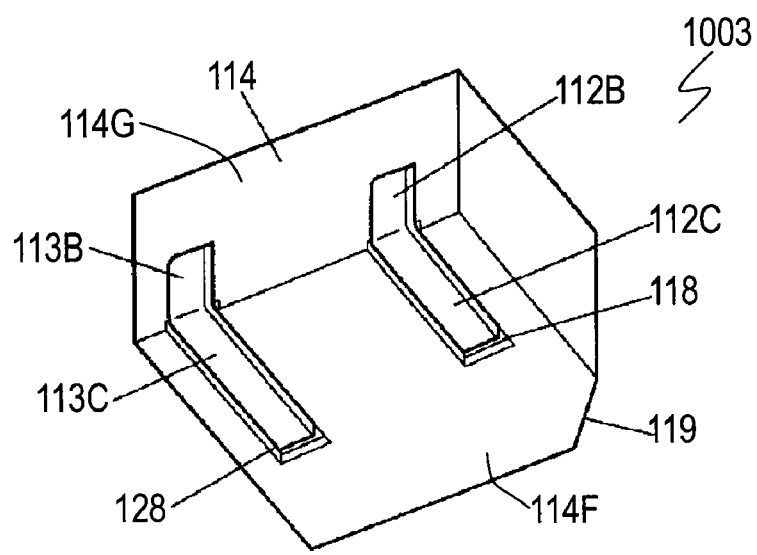
FIG. 6 is a bottom perspective view of an electronic component according to Exemplary Embodiment 2 of the invention.

FIG. 6 is a bottom perspective view of solid electrolytic capacitor 1003, an electronic component according to Exemplary Embodiment 2 of the present invention. In FIG. 6, components identical to those of solid electrolytic capacitor 1001 according to Embodiment 1 shown in FIGS. 1 to 3F are denoted by the same reference numerals, and their description will be omitted.

In solid electrolytic capacitor 1003 shown in FIG. 6, distal end portions 112C and 113C of terminals 112B and 113B exposed from outer package 114 are bent and extend along surfaces 114G and 114F of outer package 114. Solid electrolytic capacitor 1003 can be surface mounted on circuit board 1001A while surface 114F of outer package 114 contacts circuit board 1001A. Surface 114F of outer package 114 has grooves 118 and 128 formed therein. Distal end portions 112C and 113C of terminals 112B and 113B are fit into grooves 118 and 128.

Figure 7:
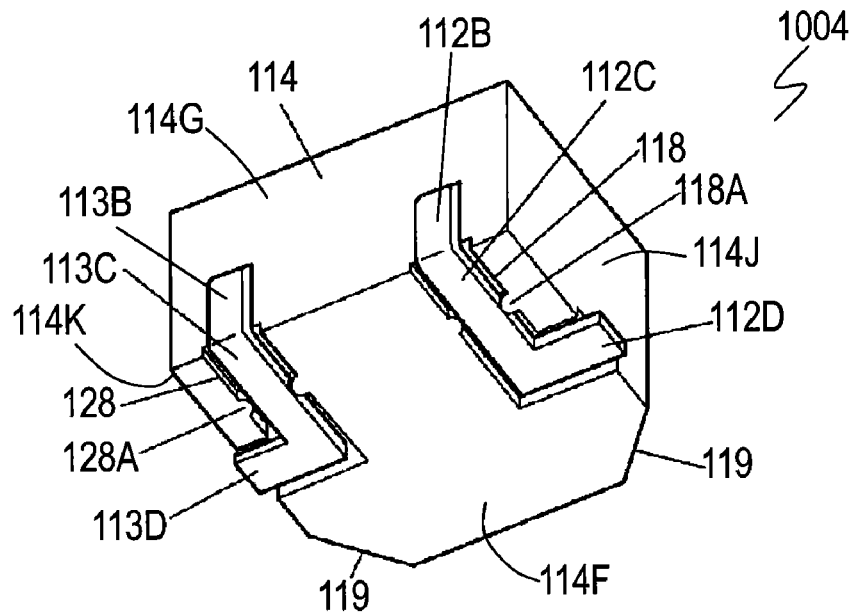
FIG. 7 is a bottom perspective view of another electronic component according to Embodiment 2.

FIG. 7 is a bottom perspective view of solid electrolytic capacitor 1004, a further electronic component according to Embodiment 2 of the invention. In FIG. 7, components identical to those of solid electrolytic capacitor 1003 shown in FIG. 6 are denoted by the same reference numerals, and their description will be omitted.

As shown in FIG. 7, distal end portions 112C and 113C of terminals 112B and 113B provided on surface 114F of outer package 114 include projections 112D and 113D that protrude outside from surfaces 114K and 114J of outer package 114, respectively. A user cannot confirm visually, from outside, whether or not distal end portions 112C and 113C which are provided on surface 114F of outer package 114 are soldered when solid electrolytic capacitor 1004 is soldered on circuit board 1001A. Projections 112D and 113D allow the user to confirm visually indirectly whether or not distal end portions 112C and 113C are soldered when solid electrolytic capacitor 1004 is soldered on circuit board 1001A.

Terminals 112B and 113B are bent along the surface of outer package 114. Protrusions 118A and 128A for sandwiching distal end portions 112C and 113C and fixing in grooves 118 and 128 may be provided on inner surfaces of grooves 118 and 128, respectively.

Figure 8:
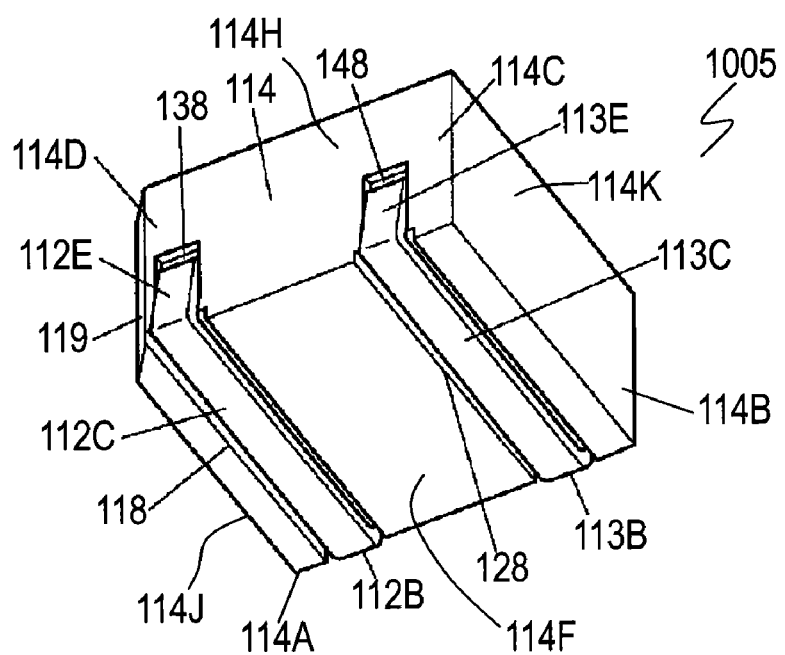
FIG. 8 is a bottom perspective view of a further electronic component according to Embodiment 2.

FIG. 8 is a bottom perspective view of solid electrolytic capacitor 1005, a further electronic component according to Embodiment 2 of the invention. In FIG. 8, components identical to those of solid electrolytic capacitor 1003 shown in FIG. 6 are denoted by the same reference numerals, and their description will be omitted.

As shown in FIG. 8, in solid electrolytic capacitor 1005, distal end portions 112C and 113C of terminals 112B and 113B exposed from surface 114G of outer package 114 and reach surface 114H opposite to surface 114G beyond surface 114F. Distal end portions 112C and 113C are arranged in grooves 118 and 128 formed in surface 114F of outer package 114, respectively. Distal end portions 112C and 113C includes pawl 112E and 113E which are bent and extend along surface 114H of outer package 114. Surface 114H of outer package 114 has recesses 138 and 148 therein for receiving the distal ends of pawls 112E and 113E, respectively. The depths of recesses 138 and 148 increase as being farther away from surface 114F. This configuration fixes distal end portions 112C and 113C easily in grooves 118 and 128, respectively, without precisely controlling the widths of distal end portions 112C and 113C and grooves 118 and 128.

Recesses 138 and 148 are preferably provided in corners 114C and 114D of outer package 114 where terminals 112B and 113B are not provided, hence utilizing the space effectively without changing the size of outer package 114.

If solid electrolytic capacitors 1003 to 1005 according to Embodiment 2 have polarity, the appearance of the capacitors can be determined appropriately to allow the polarity to be visually recognized. In solid electrolytic capacitor 1003 shown in FIG. 6, the polarities of terminals 112B and 113B can be visually recognized by the lengths of distal end portions 112C and 113C exposed to outside of outer package 114 which are different from each other. Furthermore, the polarities of terminal 113B and terminal 112B exposed from corner 114B and corner 114A opposite to corner 114C and corner 114D, respectively, can be visually recognized by forming chamfered portion 119 only in one of corners 114C and 114D of four corners 114A to 114D of outer package 114 having the rectangular parallelepiped shape where terminals 112B and 113B are not provided.

In solid electrolytic capacitor 1004 shown in FIG. 7, chamfered portion 119 is formed in both corners 114C and 114D of the outer package. This structure reduces the amount of resin material of outer package 114, accordingly reducing the cost of capacitor 1004.

The shape of chamfered portion 119 may be flat or curved, and may be any shape that can indicate the polarity and that can ensure necessary characteristics, such as air tightness, heat resistance, impact resistance, and vibration resistance of outer package 114.

Exemplary Embodiment 3

Figure 9:
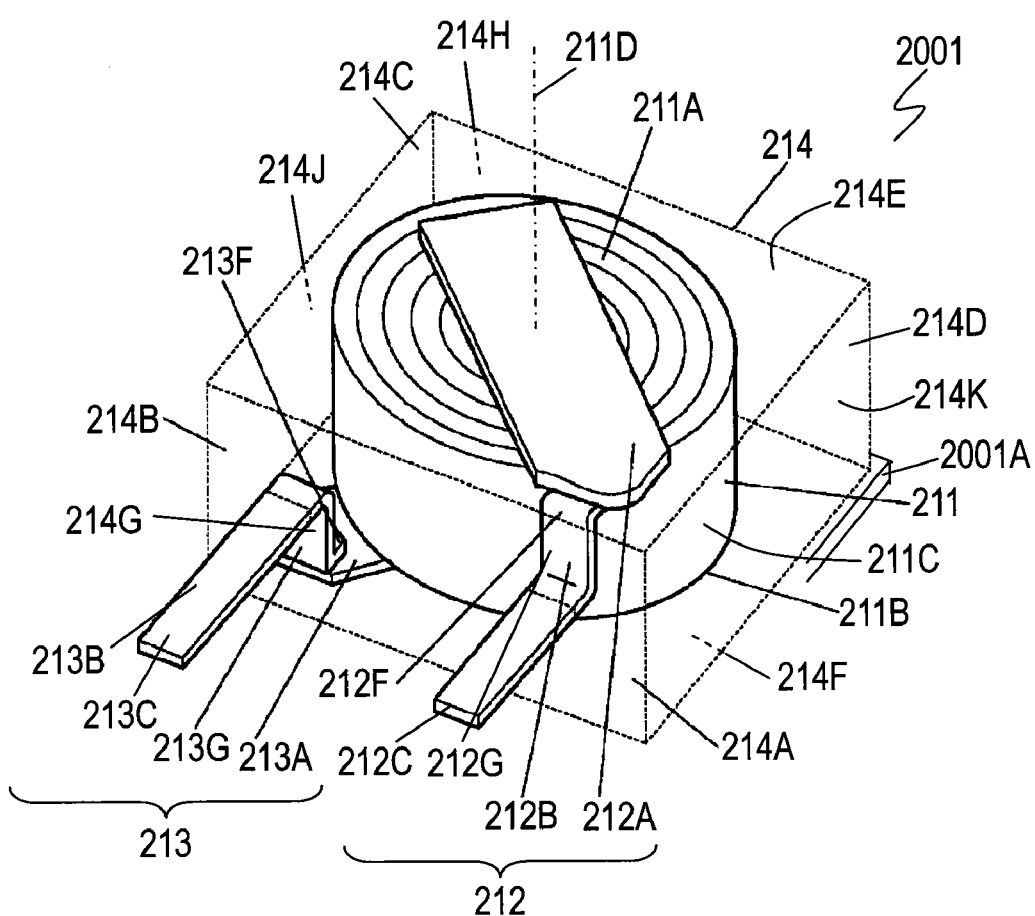
FIG. 9 is a perspective view of an electronic component according to Exemplary Embodiment 3 of the invention.

FIG. 9 is a perspective view of solid electrolytic capacitor 2001, an electronic component according to exemplary Embodiment 3 of the present invention. Solid electrolytic capacitor 2001 includes capacitor element 211, a functional element, having end surfaces 211A and 211B opposite to each other, positive electrode collector 212 joined to end surface 211A of capacitor element 211, negative electrode collector 213 joined to end surface 211B of capacitor element 211, and outer package 214 for totally covering capacitor element 211, positive electrode collector 212, and negative electrode collector 213. Capacitor element 211 is a rolled-type. End surface 211A and end surface 211B function as a positive electrode and a negative electrode of capacitor element 211. Capacitor element 211 has a cylindrical shape extending along center axis 211D, and has circular end surfaces 211A and 211B opposite to each other along center axis 211D, and side surface 211C extending parallel to center axis 211D with center axis 211D as the center. Positive electrode collector 212 includes collector plate 212A joined to end surface 211A of capacitor element 211, and terminal 212B for external connection extending from collector plate 212A. Negative electrode collector 213 includes collector plate 213A joined to end surface 211B of capacitor element 211, and terminal 213B for external connection joined to collector plate 213A and extending from collector plate 213A. Outer package 214 integrally covers capacitor element 211, positive electrode collector 212, and negative electrode collector 213 while exposing portions of terminals 212B and 213B of collectors 212 and 213 to outside, and has a rectangular parallelepiped shape. Outer package 214 has surfaces 214E and 214F perpendicular to center axis 211D, and surfaces 214G, 214H, 214J, 214K connected to surfaces 214E and 214F and parallel to center axis 211D. Surfaces 214E and 214F have a square shape or a rectangular shape. Surfaces 214G, 214H, 214J, and 214K have a rectangular shape. Terminals 212B and 213B protrude from surface 214G. Surface 214H is parallel to surface 214G and positioned opposite to surface 214G. Surface 214J is connected perpendicular to surfaces 214G and 214H. Surface 214K is connected perpendicular to surfaces 214G and 214H, is parallel to surface 214J, and is positioned opposite to surface 214J. Outer package 214 has four corners 214A to 214D that are not occupied by capacitor element 211 as seen from a direction of center axis 211D, that is, as seen from surfaces 214E and 214F. Respective portions of terminals 212B and 213B of collectors 212 and 213 are arranged at corners 214A and 214B of the rectangular parallelepiped shape of outer package 214 adjacent to each other. Terminals 212B and 213B extend from corners 214A and 214B, respectively. Surface 214F is a mounting surface adapted to contact circuit board 2001A when solid electrolytic capacitor 2001 is mounted onto circuit board 2001A. Surface 214G extends from corner 214A to corner 214B. Surface 214K extends from corner 214A to corner 214D. Surface 214J extends from corner 214B to corner 214C.

Capacitor element 211 includes a positive electrode foil made of valve metal, such as aluminum, a dielectric oxide layer provided on a surface of the positive electrode foil, a separator provided on the dielectric oxide layer, and a negative electrode foil made of valve metal, such as aluminum, provided on the separator. The positive electrode foil, the dielectric oxide layer, the separator, and the negative electrode foil are rolled about center axis 211D to have a substantially cylindrical shape. Side surface 211C having a cylindrical shape provided at an outer periphery of capacitor element 211 is fastened with an insulating tape, such as an adhesive tape. The surface area of the surface of the positive electrode foil at which the dielectric oxide layer is provided is enlarged by etching. Center axis 211D is perpendicular to surface 214F, the mounting surface of solid electrolytic capacitor 2001.

The positive electrode foil and the negative electrode foil of capacitor element 211 are rolled while deviating from each other along center axis 211D. Thus, the positive electrode foil is exposed at end surface 211A, and the negative electrode foil is exposed at end surface 211B.

Capacitor element 211 further includes an electrolyte held between the positive electrode foil and the negative electrode foil, mainly held in the separator. The electrolyte may employ solid conductive polymer, such as polyaniline, polypyrrole, polythiophene, or a derivative thereof, or liquid electrolyte, such as electrolytic solution.

Each of the positive electrode and the negative electrode may include a collector made of aluminum foil and a polarized electrode layer made of carbon material arranged on the collector. The positive electrode and the negative electrode overlaps across the separator, and are rolled to have a substantially cylindrical shape.

Capacitor element 211 may be a metalized film capacitor. The capacitor has a substantially cylindrical shape in which the positive electrode and the negative electrode both made of metalized film overlap and are rolled. The metalized film includes a dielectric film made from polyethylene telephtalate, polypropylene, polyethylene naphthalate, or polyphenylene sulfide, and a vapor deposited electrode formed by partially vapor depositing metal, such as aluminum, on a surface of the dielectric film. The positive electrode and the negative electrode overlap and are rolled such that the vapor deposited electrodes of the positive electrode and the negative electrode do not contact each other.

The functional element is an active element or a passive element that performs an electrical function. For instance, if the electronic component is a capacitor, the electronic component has a predetermined electrical function serving as a capacitor. In this case, the functional element is a capacitor element, and performs a predetermined electrical function serving as the capacitor. If the electronic component is a battery, the electronic component has a predetermined electrical function serving as a battery. In this case, the functional element is a battery element, and performs a predetermined electrical function serving as the battery. If the electronic component is a semiconductor device, the electronic component has a predetermined electrical function serving as a semiconductor device. In this case, the functional element is a semiconductor element, and performs a predetermined electrical function serving as the semiconductor device.

Collector plates 212A and 213A are made of a metal material having a flat plate shape. Collector plates 212A and 213A contact end surfaces 211A and 211B of capacitor element 211, respectively. Then, collector plate 212A and the positive electrode exposed at end surface 211A are mechanically and electrically joined by laser welding, and collector plate 213A and the negative electrode exposed at end surface 211B are mechanically and electrically joined by laser welding.

Further conductive materials, such as metal fine particles, may be provided between collector plate 212A and end surface 211A and between collector plate 213A and end surface 213B to join collector plate 212A and end surface 211A and to join collector plate 213A and end surface 211B.

Collector plates 212A and 213A are made of material, such as elementary substance of aluminum, iron, nickel or copper, or metal base material, such as aluminum alloy, iron alloy, nickel alloy, or copper alloy, that can be mechanically and electrically joined with the electrodes of capacitor element 211. In the case that the electrode foil is made of aluminum, collector plates 212A and 213A are preferably made of plate material of aluminum. Collector plates 212A and 213A can be easily joined to edges of the electrode foils exposed at end surfaces 211A and 211B of capacitor element 211 with large joining area.

Terminals 212B and 213B are made of flat metal materials of elementary metal, such as aluminum, iron, nickel, or copper, or alloy, such as iron-based alloy, nickel-based a lot, or copper-based alloy. Terminals 212B and 213B have joining portions 212F and 213F joined to respective one ends of collector plates 212A and 213A by laser welding or resistance welding, respectively. Terminals 212B and 213B are arranged at respective corners 214A and 214B of the rectangular parallelepiped shape of outer package 214 adjacent to each other, respectively.

Collector plates 212A and 213A of collectors 212 and 213 are joined to end surfaces 211A and 211B of capacitor element 211, respectively, so as to take out the electrodes of capacitor element 211. Collector plates 212A and 213A contacts end surfaces 211A and 211B of capacitor element 211 with large contacting area. Collectors 212 and 213 have large widths to reduce their resistances, thus reducing the electrical resistance for taking out the electrodes. Therefore, collector plates 212A and 213A have larger widths than terminals 212B and 213B placed in a limited space of corners 214A and 214B of outer package 214.

Figure 10:
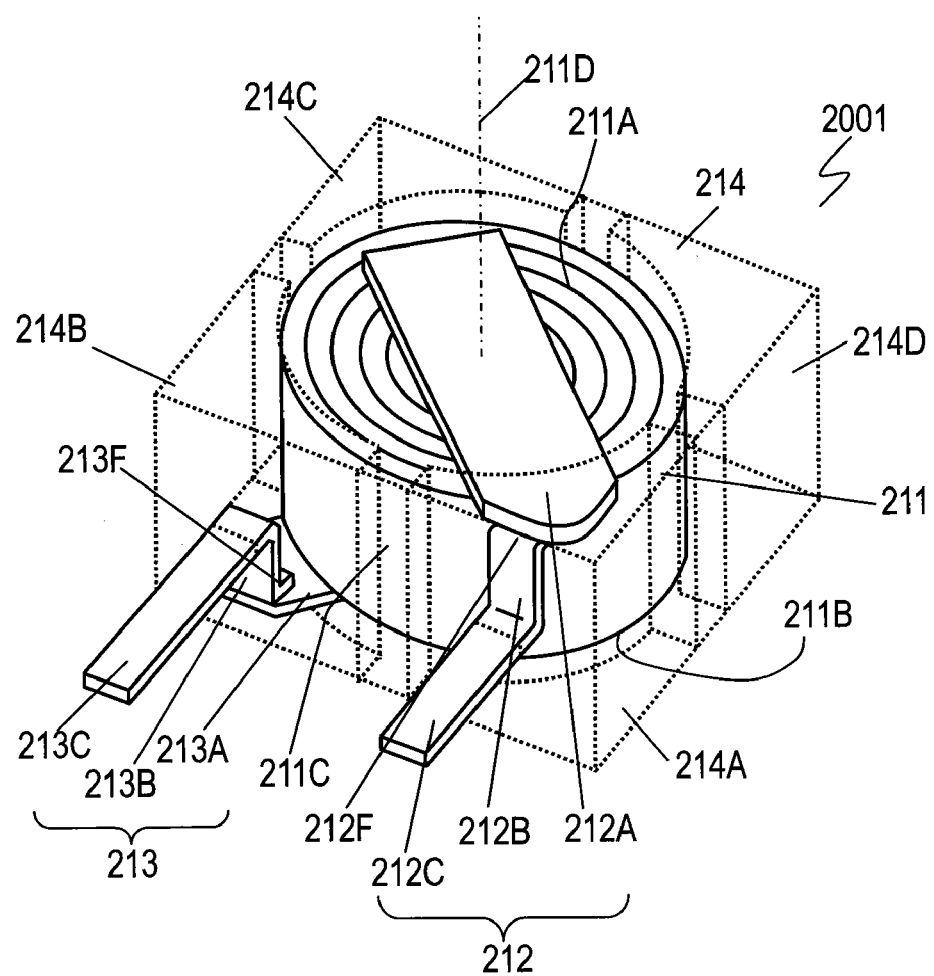
FIG. 10 is a perspective view of the electronic component according to Embodiment 3.

FIG. 10 is a perspective view of solid electrolytic capacitor 2001 for illustrating corners 214A to 214D of outer package 214. As shown in FIG. 10, capacitor element 211 is accommodated in outer package 214 such that circular end surfaces 211A and 211B of cylindrical capacitor element 211 are parallel to surfaces of the rectangular parallelepiped shape of outer package 214 opposite to each other. Corners 214A to 214D are positioned between cylindrical side surface 211C of capacitor element 211 and a surface of outer package 214 having a rectangular parallelepiped shape. Corners 214A and 214D are positioned diagonally from each other in the rectangular parallelepiped shape. Corners 214B and 214C are positioned diagonally from each other in the rectangular parallelepiped shape. Corners 214A and 214B are adjacent to each other. Collector plate 212A of positive electrode collector 212 extends elongatedly from corner 214A towards corner 214C beyond center axis 211D. Collector plate 213A of positive electrode collector 213 extends elongatedly from corner 214B towards corner 214D beyond center axis 211D.

Terminals 212B and 213B have distal end portions 212C and 213C exposed to outside of outer package 214, respectively. Plated layers may be formed on outer surfaces of distal end portion 212C and 213C of terminal 212B and 213B to securely connect with circuit board 2001A by soldering. The plated layers may be formed by plating simple substance, such as Ni or Sn, or tin-based metal, such as tin alloy containing Sn and at least one of Ag, Bi, In, and Pb.

Outer package 214 covers capacitor element 211 while exposing the portions of terminals 212B and 213B to the outside, and is made of insulating resin, such as epoxy resin, having high air tightness, high heat resistance, and excellent mechanical properties.

Capacitor element 211 may be accommodated in a metal case having an opening. In this case, the opening of the metal case is sealed with an insulating elastic member, such as a rubber, having apertures allowing the portions of terminals 212B and 213B to exposed to outside.

A method of manufacturing solid electrolytic capacitor 2001 according to Embodiment 3 will be described below. FIGS. 11A to 11F illustrate the method of manufacturing solid electrolytic capacitor 2001.

Figure 11A:
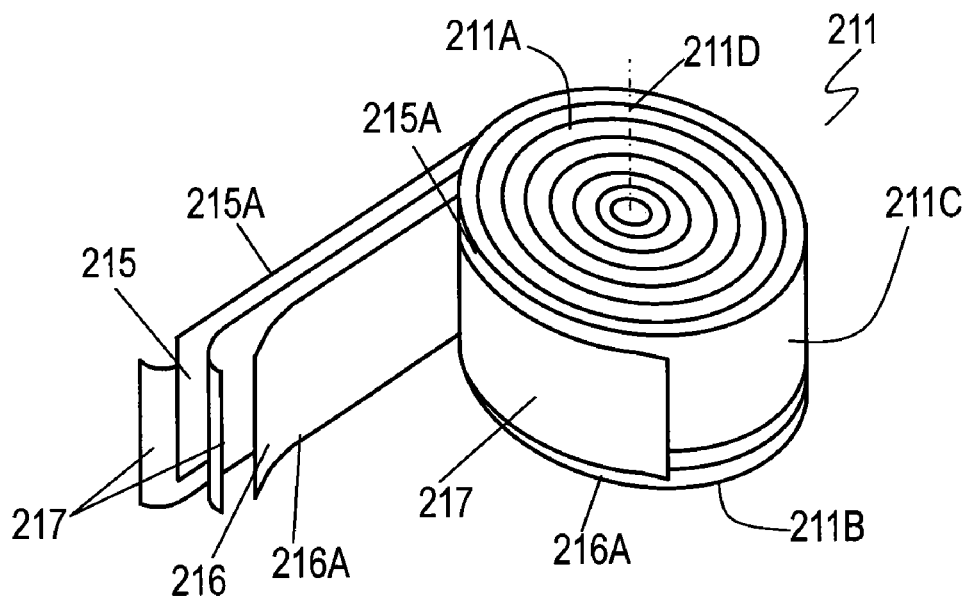
FIGS. 11A to 11F are perspective views of the electronic component according to Embodiment 3 for illustrating a method of manufacturing the electronic component

FIG. 11A illustrates the structure of capacitor element 211. Electrode foil 215, electrode foil 216, and separator 217 having an insulating property are stacked and rolled about center axis 211D to have a substantially cylindrical shape while separator 217 is provided between positive electrode foil 215 and negative electrode foil 216. Then, side surface 211C having a substantially cylindrical shape is fastened with an insulating tape to provide roll type capacitor element 211. Electrode foil 215 is made of valve metal, aluminum according to Embodiment 2, and includes a dielectric oxide layer at a surface of the electrode foil 215. Negative electrode foil 216 is made of aluminum. In this case, center axis 211D is perpendicular to a surface of circuit board 2001A to which solid electrolytic capacitor 2001 is adapted to be mounted. Electrode foil 215 has the same width as electrode foil 216 in the direction of center axis 211D. While being would, electrode foil 215 deviates from electrode foil 216 towards end surface 211A along center axis 211D. This arrangement exposes edge 215A of electrode foil 215 at end surface 211A of capacitor element 211 to allow edge 215A to protrude from end surface 211A. Similarly, this arrangement expose edge 216A of electrode foil 216 at end surface 211B to allow edge 216A to protrude from end surface 211B. Separator 217 is made of porous insulator, such as fiber having numerous voids. Electrode 215 is removed from end surface 211B. Electrode 216 is removed from end surface 211A.

Figure 11B:
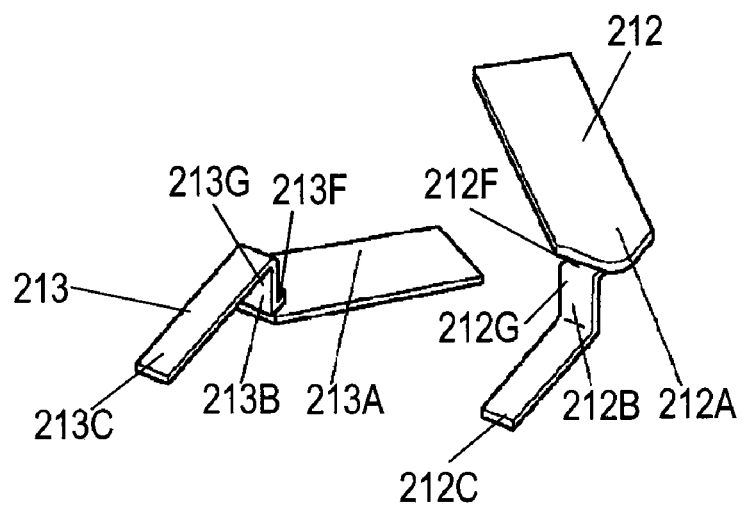

FIG. 11B is a perspective view of positive electrode collector 212 and negative electrode collector 213. Collector plates 212A and 213A of collectors 212 and 213 are formed with a metal plate made of aluminum. Joining portion 212F of terminal 212B is joined to collector plate 212A by laser welding. Terminal 212B extends from one end of collector plate 212A and has a smaller width than collector plate 212A. Joining portion 213F of terminal 213B is joined to collector plate 213A by laser welding. Terminal 213B extends from one end of collector plate 213A and has a smaller width than collector plate 213A.

Plated layers made of tin-based alloy may be provided on respective surfaces of distal end portions 212C and 213C of terminals 212B and 213B so as to be easily soldered to circuit board 2001A.

Terminal 212B of collector 212 further includes junction portion 212G connected between terminal 212B and joining portion 212F joined to collector plate 212A. Junction portion 212G extends substantially perpendicularly to collector plate 212A and terminal 212B. Junction portion 212G can be formed by bending terminal 212B perpendicularly, and then bending it substantially perpendicularly with respect to the previously-bent direction. Collector plate 212A is parallel to distal end portion 212C of terminal 212B. Terminal 213B of collector 213 further includes junction portion 213G connected between terminal 213B and joining portion 213F joined to collector plate 213A. Junction portion 213G extends substantially perpendicularly to collector plate 213A and terminal 213B. Junction portion 213G can be formed by bending terminal 213B substantially perpendicularly, and then bending it substantially perpendicularly with respect to the previously-bent direction. Collector plate 213A is parallel to distal end portion 213C of terminal 213B.

Figure 11C:
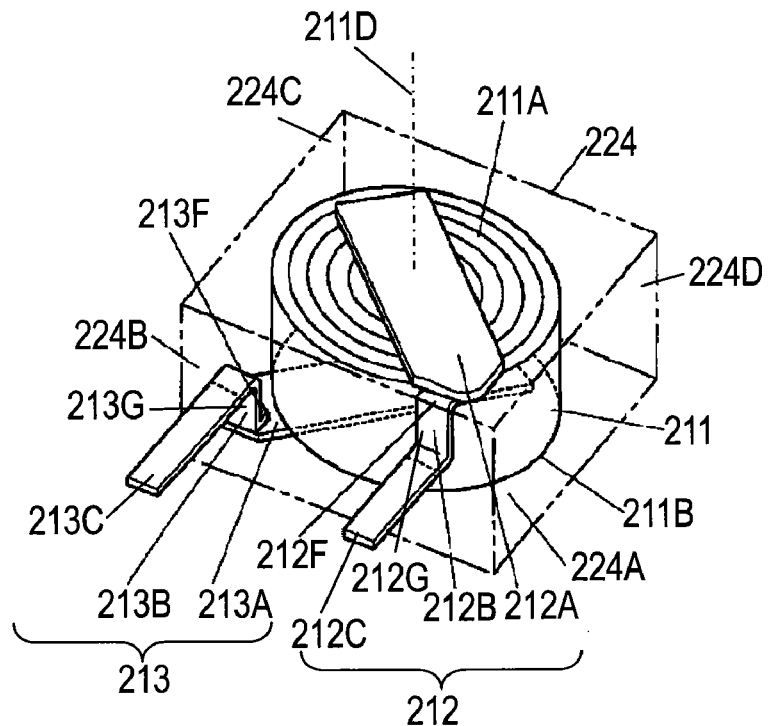

Collectors 212 and 213 are then attached to capacitor element 211, as shown in FIG. 11C. Virtual rectangular parallelepiped 224 shows a range in which outer package 214 covers capacitor element 211. Terminals 212B and 213B are positioned at corners 224A and 224B of virtual rectangular parallelepiped 224 adjacent to each other, such that distal end portions 212C and 213C of terminals 212B and 213B extend in the same direction perpendicular to center axis 211D, respectively. Upon being attached, collector plate 212A is joined to edge 215A of electrode foil 215 protruding from end surface 211A of capacitor element 211, and collector plate 213A is joined to edge 216A of electrode foil 216 protruding from end surface 211B of capacitor element 211. Distal end portions 212C and 213C of terminal 212B and 213B are directed in the same direction perpendicular to center axis 211D.

Junction portions 212G and 213G may be formed by bending terminals 212B and 213B after collector plates 212A and 213A are attached to capacitor element 211. Similarly, terminals 212B and 213B may be joined to collector plates 212A and 213A after collector plates 212A and 213A are attached to capacitor element 211.

Figure 11D:
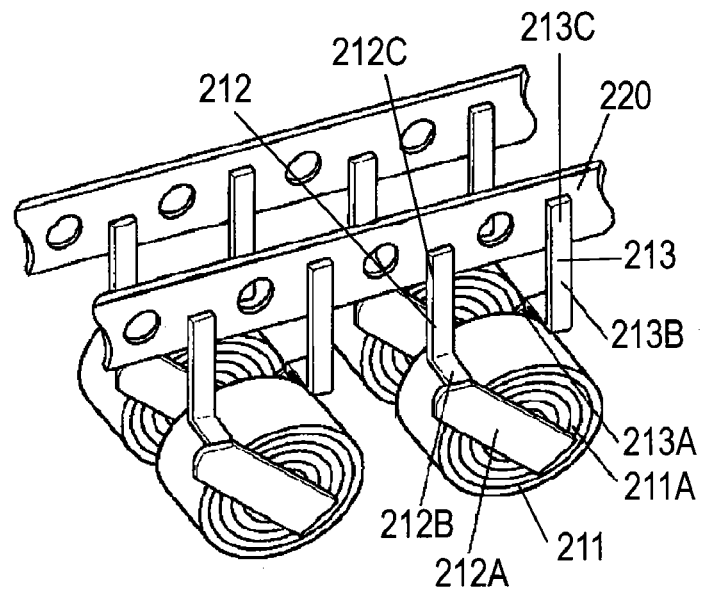

After that, as shown in FIG. 11D, distal end portions 212C and 213C of terminals 212B and 213B extending in the same direction are fixed to conveyor base 220 having a band shape with an adhesive to convey capacitor element 211. Distal end portions 212C and 213C of terminals 212B and 213B can be held with a chucking device pinching distal end portions 212C and 213C.

As shown in FIG. 3E, electrolyte-forming solution 226 containing polymerizable monomer, such as pyrrole or thiophene, and oxidant is prepared in container 225. While distal end portions 212C and 213C of terminals 212B and 213B held by conveying base 220 are located above capacitor element 211, capacitor element 211 is immersed in electrolyte-forming solution 226 to fill between electrode foils 215 and 216 of capacitor element 211 with electrolyte-forming solution 226. In this case, distal end portions 212C and 213C of terminals 212B and 213B are removed from solution 226 to prevent the portions from being immersed in electrolyte-forming solution 226. Then, capacitor element 211 is taken out from electrolyte-forming solution 226, thus forming a solid electrolyte layer containing conductive polymer, such as polypyrrole or polythiophene, on the surfaces of electrode foils 215 and 216 and in the voids of separator 217 by chemical polymerization at a predetermined temperature for a predetermined period of time.

Instead of immersing capacitor element 211 in electrolyte-forming solution 226 containing the polymerizable monomer and the oxidant, the capacitor element 211 can be sequentially immersed separately into polymerizable monomer solution and oxidant solution. The order of immersing capacitor element 211 into the polymerizable monomer solution and the oxidant solution can be appropriately determined.

Electrolyte-forming solution 226 contains solvent and additive, such as surfactant in addition to the polymerizable monomer and the oxidant, which are main constituents of polymerization reaction.

The polymerization for forming the solid electrolyte layer can be an electrolytic polymerization, or both the electrolytic polymerization and a chemical polymerization may be used.

Electrolyte-forming solution 226 may be solution for forming solid electrolytes, such as TCNQ complex salt or manganese dioxide, other than the conductive polymer.

Driving electrolytic solution containing organic solvent, such as ethylene glycol or γ-butyrolactone, and electrolyte material having conductive ion can be used as electrolyte-forming solution 226.

Electrolyte-forming solution 226 can be solution containing conductive polymer dispersed therein.

Figure 11E:
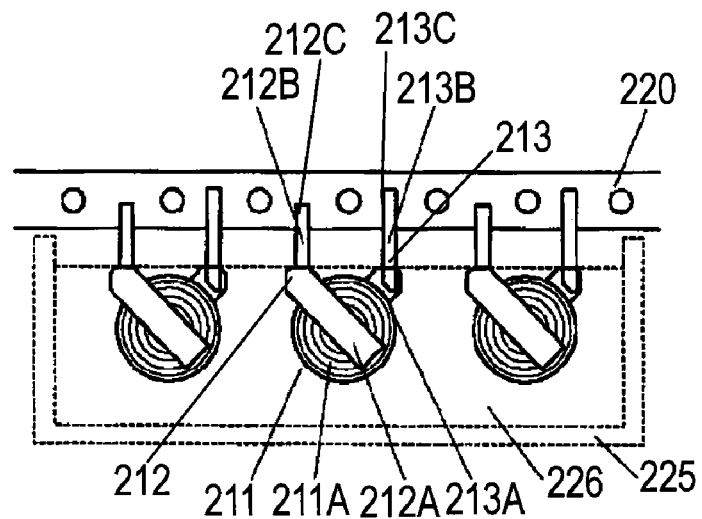
Figure 11F:
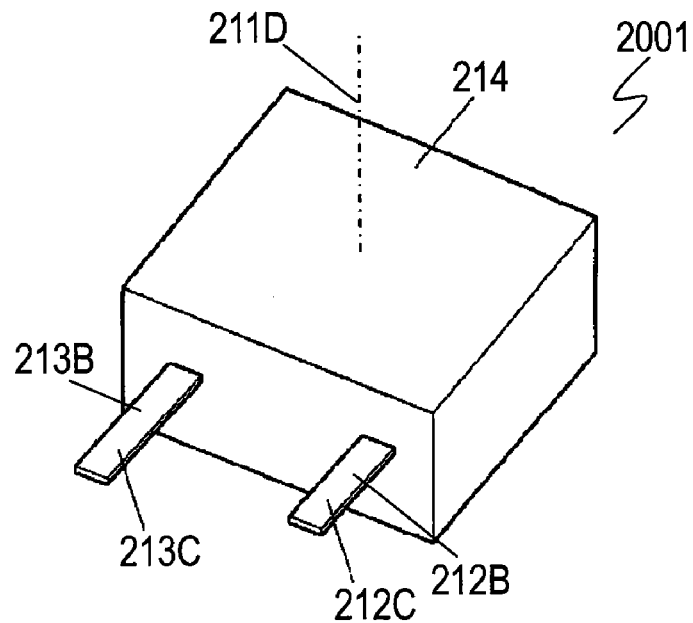

Then, as shown in FIG. 11F, outer package 214 having the rectangular parallelepiped shape is formed by covering capacitor element 211 with insulating resin material, such as epoxy. At this moment, terminals 212B and 213B are arranged at adjacent corners 214A and 214B of outer package 214, respectively while distal end portions 212C and 212B of terminals 212B and 213B are exposed to outside from surface 214G, respectively.

A voltage is then applied between terminals 212B and 213B to restore a defective portion of the dielectric oxide layer of electrode foil 215 so as to insulate the solid electrolyte at the defective portion and its vicinity, thereby reducing a leakage current and fabricating solid electrolytic capacitor 2001.

Capacitor element 211 can be immersed in re-anodizing solution after collectors 212 and 213 are attached to capacitor element 211, as shown in FIG. 11C, and then, the voltage may be applied between terminals 212B and 213B to re-anodizing electrode foil 215 to restore the dielectric oxide layer of electrode foil 215. In this case, capacitor element 211 can be immersed in the re-anodizing solution while being held by conveyor base 220, as shown in FIG. 11D.

In solid electrolytic capacitor 2001, the electronic component according to Embodiment 3, collector plates 212A and 213A of collectors 212 and 213 are joined to edges 215A and 216A of electrode foils 215 and 216 protruding from end surfaces 211A and 211B of cylindrical capacitor element 211, respectively. This structure reduces a connection resistance between electrode foils 215 and 216 and collectors 212 and 213 more than lead wire 102 rolled in the electrode foil of conventional solid electrolytic capacitor 601 shown in FIG. 34, thus providing solid electrolytic capacitor 2001 with low equivalent series resistance (ESR).

Collector plates 212A and 213A are not rolled with electrode foils 215 and 216, and allow end surfaces 211A and 211B of capacitor element 211 to have a circular shape close to a perfect circle. Capacitor element 101 of conventional solid electrolytic capacitor 601 shown in FIG. 34 may cause short-circuiting due to the contact between the electrode foil and the edge of the lead wire where stress concentrates. In capacitor element 211 according to Embodiment 3, electrode foils 215 and 216 are rolled with uniform forces, and are not prevented from the above short circuiting.

The rectangular parallelepiped shape of outer package 214 matches with a space having a rectangular parallelepiped shaped space on circuit board 2001A substantially occupied by capacitor 2001 mounted on circuit board 2001A. Roll type capacitor element 211 having the cylindrical shape is accommodated in outer package 214, and causes four corners 214A to 214D of outer package 214 to become dead spaces that are not occupied by capacitor element 211. Terminals 212B and 213B are arranged at corners 214A and 214B of corners 214A to 214D, respectively, so that a dead space on circuit board 2001A formed by mounting solid electrolytic capacitor 2001 can be effectively utilized. Therefore, outer package 214 and solid electrolytic capacitor 2001 can have small sizes while the size of capacitor element 211 is not reduced, that is, while electrical characteristics, such as a large capacitance, is maintained.

Terminals 212B and 213B are arranged at corners 214A and 214B of outer package 214 adjacent to each other, respectively, and are not arranged at corners of four corners 214A to 214D positioned diagonally. Thus, during processes for manufacturing solid electrolytic capacitor 2001, particularly in the process for immersing capacitor element 211 in liquid substance, such as electrolyte-forming solution 226, capacitor element 211 can be immersed sufficiently in the liquid substance while distal end portions 212C and 213C of terminals 212B and 213B are located above capacitor element 211, thereby preventing the liquid substance from being attached to distal end portions 212C and 213C of terminals 212B and 213B. As a result, the liquid substance can sufficiently fill capacitor element 211 to form a dense electrolyte layer, accordingly providing capacitor element 211 with a low resistance and a large capacitance. Further, this arrangement provides capacitor element 211 with air tightness at an interface between terminals 212B and 213B and outer package 214 and allows distal end portions 212C and 213C of terminals 212B and 213B to be soldered easily, hence manufacturing solid electrolytic capacitor 2001 having high quality efficiently.

As shown in FIG. 11E, when capacitor element 211 is immersed in the liquid substance, such as electrolyte-forming solution 226, collector plates 212A and 213A of collectors 212 and 213 having plate shapes cover portions of end surfaces 211A and 211B of capacitor element 211. If collector plates 212A and 213A extend elongatedly in the same direction, that is, if the entire surfaces of collector plates 212A and 213A face each other across capacitor element 211, collector plates 212A and 213A blocks the portion of capacitor element 211 between collector plates 212A and 213A, hence preventing the liquid substance from penetrating into capacitor element 211.

In solid electrolytic capacitor 2001, the electronic component according to Embodiment 3, collector plate 212A extends elongatedly from corner 224A (214A) towards corner 224C (214C) positioned diagonally from corner 224A (214A). Collector plate 213A extends elongatedly from corner 224B (214B) adjacent to corner 224A and towards corner 224D (214D) positioned diagonally from corner 224B (214B). Collector plates 212A and 213A thus extend in directions perpendicular to each other so that collector plates 212A and 213A deviate to facing each other partially, as shown in FIG. 3C. This arrangement reduces the portion of capacitor element 211 blocked by collector plates 212A and 213A, accordingly allowing the liquid substance to sufficiently penetrate into capacitor element 211. As a result, a dense electrolyte layer can be formed in capacitor element 211, and provides capacitor element 211 with a low resistance and a large capacitance. This arrangement reduces a period of time for immersing capacitor element 211 in the liquid substance, accordingly allowing solid electrolytic capacitor 2001 with high quality to be manufactured efficiently.

Distal end portions 212C and 213C of terminals 212B and 213B are exposed from same surface 214G of outer package 214 and extend in the same direction. Therefore, as shown in FIG. 11D, during processes for manufacturing solid electrolytic capacitor 2001, distal end portions 212C and 213C of terminals 212B and 213B can be easily fixed to single conveyor base 220, thereby allowing solid electrolytic capacitor 2001 to be manufactured at high productivity.

Terminals 212B and 213B of collectors 212 and 213 may not be very large as terminals 212B and 213B are arranged in the limited space of corners 214A and 214B of outer package 214. However, collector plates 212A and 213A of collectors 212 and 213 can be larger than terminals 212B and 213B as collector plates 212A and 213A are arranged on end surfaces 211A and 211B of capacitor element 211. This structure reduces electrical resistances of collectors 212 and 213, and increases a contacting area between end surfaces 211A and 211B of capacitor element 211 and collector plates 212A and 213A. Therefore, the connection resistance of electrode foils 215 and 216 and collectors 212 and 213 can be reduced, and provides solid electrolytic capacitor 2001 with a small equivalent series resistance (ESR).

Thus, the size (width) of collector plates 212A and 213A is different from the size (width) of terminals 212B and 213B of collectors 212 and 213. In solid electrolytic capacitor element 1001, the electronic component according to Embodiment 1 including collector plates 112A and 113A formed unitarily with terminals 112B and 113B, a larger difference in widths causes a larger material loss. In solid electrolytic capacitor 2001, the electronic component according to Embodiment 3, terminals 212B and 213B for external connection are joined to one ends of collector plates 212A and 213A having a flat plate shape. Thus, this structure reduces material loss of collectors 212 and 213, and allows solid electrolytic capacitor 2001 to be manufactured at high productivity and flexibility in the order of processes, such as bending and twisting.

Collector plates 212A and 213A can be made of metal material different from terminals 212B and 213B. In this case, when collector plates 212A and 213A are jointed to terminals 212B and 213B by welding, such as resistance welding or laser welding, respectively, the different metal materials melt and diffuse at joint portions at which collector plates 212A and 213A are jointed to terminals 212B and 213B. This case process may produce whisker under an environment of high humidity, temperature cycle depending on the combination of the metal materials. The whisker may short-circuits terminals 212B and 213B if the joint portion is exposed to the outside of outer package 214. According to Embodiment 3, collector plates 212A and 213A can be made of aluminum. Terminals 212B and 213B can include an iron base having a flat panel shape, a copper layer as a base layer provided on a surface of the iron base, and a tin plated layer provided on the copper layer. In this case, aluminum and tin diffuse at the joining portion when joining portions 212F and 213F of terminals 212B and 213B are joined to collector plates 212A and 213A by welding, respectively. The diffused aluminum and tin are left under an environment of high temperature and high humidity or subjected to heat cycle, and thereby, generate tin whisker. Upon growing, the tin whisker may short-circuit between terminals 212B and 213B.

In solid electrolytic capacitor 2001, the electronic component according to Embodiment 3, the portions where joining portions 212F and 213F of terminals 212B and 213B are joined to collector plates 212A and 213A, respectively, are covered by outer package 214 made of insulating resin, such as epoxy resin. This resin prevents the short-circuiting between terminals 212B and 213B caused by the whisker generated under the environment of high humidity or temperature cycle.

In solid electrolytic capacitor 2001, since terminals 212B and 213B are arranged at corners 214A and 214B of outer package 214, respectively, the thickness of outer package 214 is not necessarily large enough to cover the portions where collector plates 212A and 213A and terminals 212B and 213B are joined, respectively.

Figure 12A:
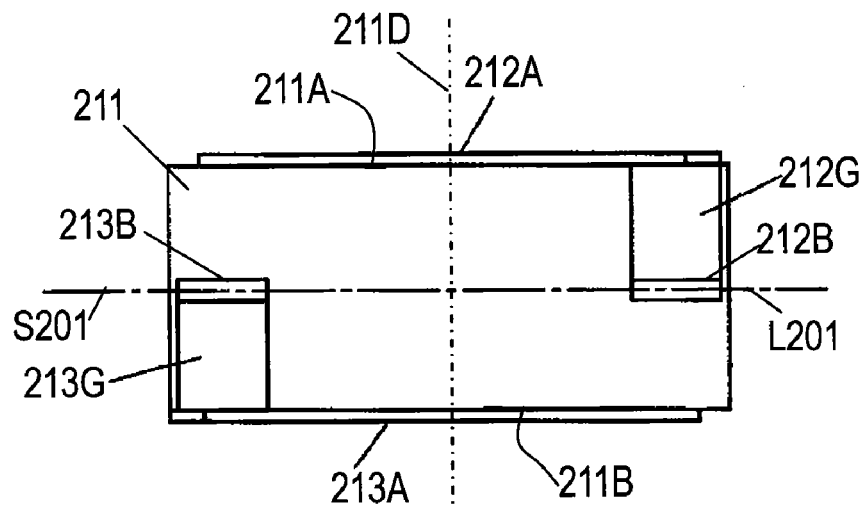
FIGS. 12A and 12B are side views of a functional element of the electronic component according to Embodiment 3.
Figure 12B:
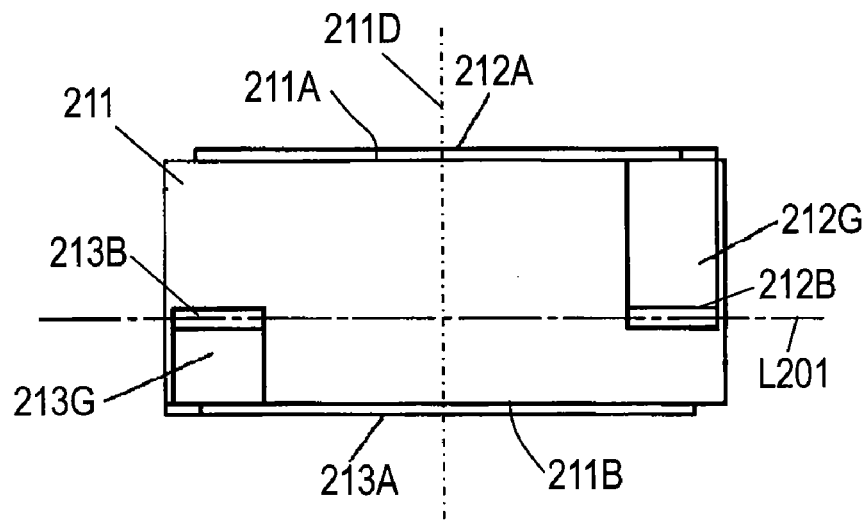

FIGS. 12A and 12B are side views of capacitor element 211, a functional element of solid electrolytic capacitor 2001, the electronic component according to Embodiment 3. Line L201 connecting distal end portions 212C and 213C of terminals 212B and 213B is substantially parallel to end surfaces 211A and 211B of capacitor element 211. Thus, as shown in FIG. 3D, intervals between plural capacitor elements 211 having distal end portions 212C and 213C of terminals 212B and 213C fixed to conveyor base 220 can be reduced, hence allowing electrolytic capacitor 2001 to be manufactured at high productivity with a small manufacturing apparatus with a small footprint. Furthermore, as shown in FIG. 3E, when plural capacitor elements 211 fixed to conveyor base 220 are immersed in the liquid substance, such as electrolyte-forming solution 226, container 225 storing the liquid substance can have a small size and has a quality easily controlled.

As shown in FIG. 12A, surface S201 which is parallel to end surfaces 211A and 211B of capacitor element 211 and which includes line L201 can be positioned at the middle between end surfaces 211A and 211B to allow collectors 212 and 213 to have the same shape, hence allowing components of the capacitor to be standardized and allowing solid electrolytic capacitor 2001 to be manufactured at high productivity.

Figure 13:
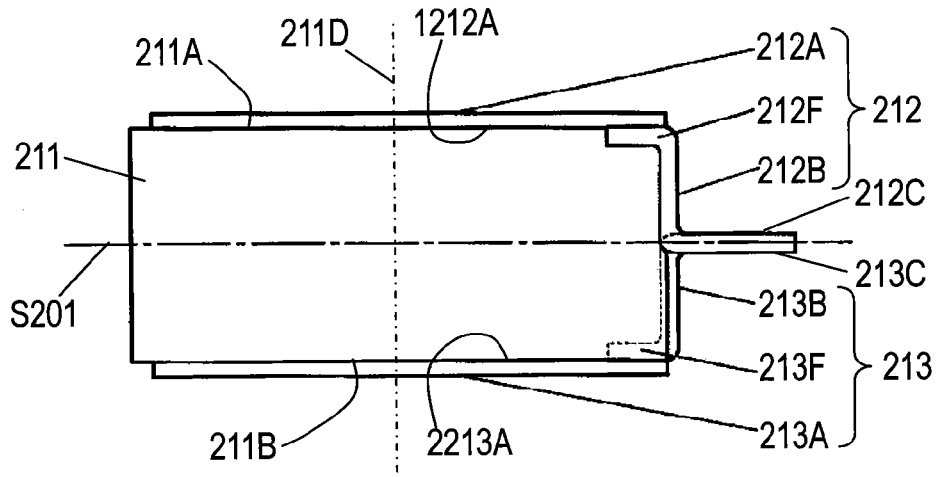
FIG. 13 is a side view of the electronic component according to Embodiment 3 for illustrating a method of manufacturing the electronic component.

FIG. 13 is a side view of capacitor element 211 shown in FIG. 10A. Joining portions 212F and 213F of terminals 212B and 213B are joined to one ends of collector plates 212A and 213A, respectively. Joining portions 212F and 213F are joined to surfaces 1212A and 1213A of collector plates 212A and 213A facing each other in the direction of center axis 211D. This arrangement allows joining portions 212F and 213F to be accommodated at corners 214A and 214B of outer package 214 while joining portions 212F and 213F do not protrude out from collector plates 212A and 213A. Thus, the height of solid electrolytic capacitor 2001 is prevented from increasing by the thicknesses of terminals 212B and 213B.

Junction portions 212G and 213G extend perpendicularly from collector plates 212A and 213A of collectors 212 and 213 within outer package 214, respectively. This structure provides a long path along which external elements, such as air and moisture, entering from the interface between terminals 212B and 213B and outer package 214 reach capacitor element 211. These external elements may deteriorate characteristics of capacitor element 211. The structure of collectors 212 and 213 prevents the external elements from reaching capacitor element 211, hence providing solid electrolytic capacitor 2001 with long-term environment resistance.

Figure 14:
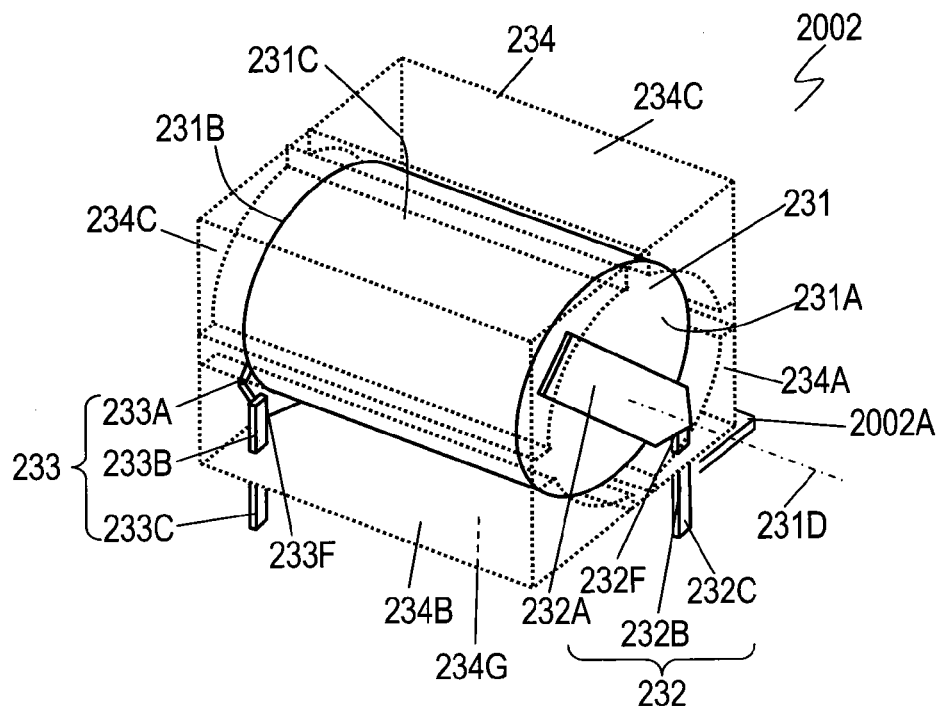
FIG. 14 is a perspective view of another electronic component according to Embodiment 3.

FIG. 14 is a perspective view of solid electrolytic capacitor 2002, another electronic component according to Embodiment 3. Solid electrolytic capacitor 2002 shown in FIG. 14 includes capacitor element 231, collectors 232 and 233, and outer package 234, instead of capacitor element 211, collectors 212 and 213, and outer package 214 of solid electrolytic capacitor 2001 shown in FIGS. 9 and 10. Capacitor element 231 has a cylindrical shape having end surfaces 231A and 231B, side surface 231C, and center axis 231D similar to end surfaces 211A and 211B, side surface 211C, and center axis 211D of capacitor element 211 of solid electrolytic capacitor 2001. Outer package 234 having a rectangular parallelepiped shape accommodates cylindrical capacitor element 231, and includes corners 234A to 234D and surfaces 234F and 234G similar to corners 214A to 214D and surfaces 214F and 214G of solid electrolytic capacitor 2001. Collectors 232 and 233 include collector plates 232A and 233A, terminals 232B and 233B, and distal end portions 232C and 233C similar to collector plates 212A and 213A, terminals 212B and 213B, and distal end portions 212C and 213C of collectors 212 and 213 of solid electrolytic capacitor 2001. Terminals 232B and 232B extend in the same direction perpendicular to center axis 231D from collector plates 232A and 233B, respectively. Collector plates 232A and 233A are joined to end surfaces 231A and 231B of capacitor element 231, respectively. Distal end portions 232C and 233C of terminals 232B and 233B are exposed from surface 234G of outer package 234. Surface 234G is a mounting surface adapted to contact circuit board 2002A when capacitor 2002 is mounted onto circuit board 2002A. Center axis 231D is parallel to surface 234G, the mounting surface.

Joining portions 232F and 233F are joined to the surfaces of collector plates 232A and 233A facing each other in the direction of center axis 231D. This arrangement accommodates joining portions 232F and 233F at corners 234A and 234B of outer package 234 while joining portions 232F and 233F do not protrude out from collector plates 232A and 233A. Thus, this arrangement prevents the width of solid electrolytic capacitor 2002 from increasing by the thicknesses of terminals 232B and 233B.

As the height of solid electrolytic capacitor 2002 shown in FIG. 14 is reduced, the areas of end surfaces 231A and 231B of capacitor element 231 decreases, necessarily increasing the widths of the electrode foils of capacitor element 231 along center axis 231D so as to ensure electrical characteristics, such as a capacitance. This arrangement prevents the liquid substance from penetrating into capacitor element 231 compared to capacitor element 211 of solid electrolytic capacitor 2001.

On the contrary, solid electrolytic capacitor 2001 shown in FIGS. 9 and 10 is mounted while surface 214G of outer package 214 contacts circuit board 2001A. This arrangement allows the areas of end surfaces 211A and 211B of capacitor element 211 to be large even if the height is small. Therefore, the widths of electrode foils 215 and 216 in a direction perpendicular to center axis 211D can increase as to ensure electrical characteristics, such as a capacitance. Therefore, the liquid substance can be easily penetrated into capacitor element 211.

In the case that solid electrolytic capacitor 2001 according to Embodiment 3 has polarity, an appearance of capacitor 2001 can be modified appropriately to allow the polarity to be visually recognized. As shown in FIG. 9, the polarities of terminals 212B and 213B can be visually recognized by the lengths of distal end portions 212C and 213C exposed to the outside of outer package 214 which are different from each other.

Exemplary Embodiment 4

Figure 15:
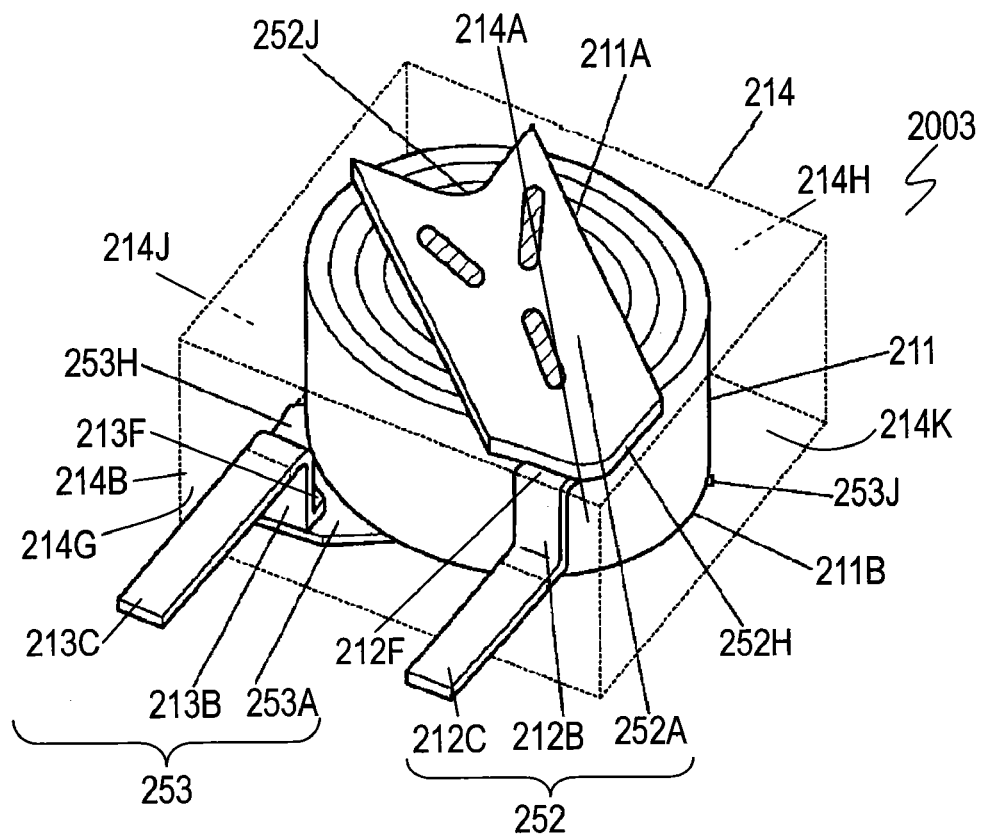
FIG. 15 is a perspective view of an electronic component according to Exemplary Embodiment 4 of the invention.

FIG. 15 is a perspective view of solid electrolytic capacitor 2003, an electronic component according to Exemplary Embodiment 4 of the present invention. In FIG. 15, components identical to those of solid electrolytic capacitor 2001 according to Embodiment 3 shown in FIG. 9 will be denoted by the same reference numerals, and their description will be omitted.

Solid electrolytic capacitor 2003 shown in FIG. 15 includes collectors 252 and 253 instead of collectors 212 and 213 of solid electrolytic capacitor 2001 according to Embodiment 3 shown in FIG. 9. Collectors 252 and 253 of solid electrolytic capacitor 2003 include collector plates 252A and 253A instead of collector plates 212A and 213A of collectors 212 and 213 of solid electrolytic capacitor 2001 according to Embodiment 3. Collector plate 252A made of a flat plate material has end 252H arranged at corner 214A and has end 252J opposite to end 252H. Collector plate 253A made of a flat plate material includes end 253H arranged at corner 214B and has end 253J opposite to end 253H. Similar to collectors 212 and 213 according to Embodiment 3, joining portions 212F and 213F of terminals 212B and 213B are joined to ends 252H and 253H of collector plates 252A and 253A made of the flat plate materials, respectively. End 252H of collector plate 252A has a shape protruding along surfaces 214G and 214H of outer package 214, that is, along the shape of corner 214A. End 252J of collector plate 252A has a shape depressed to fit the protruding shape of end 252H. End 253H of collector plate 253A has a shape protruding along surfaces 214G and 214J of outer package 214, that is, along the shape of corner 214B. End 253J of collector plate 253A has a shape depressed to fit the protruding shape of end 253H.

In solid electrolytic capacitor 2003 according to Embodiment 4, end 252H joined to terminal 212B of collector plate 252A is positioned at corner 214A of outer package 214. End 252H protrudes along surfaces 214G and 214H of outer package 214, and hence, increase the area of the portion of collector plate 252A joined to terminal 212B as large as possible in a limited space of corner 214A, thereby allowing collector plate 252A to be joined to terminal 212B with a large strength.

End 252J of collector plate 252A opposite to end 252H of collector plate 252A has the depressed shape fitting the protruding shape of end 252H, enlarging a portion of end surface 211A of capacitor element 211 into which the liquid substance penetrates. The shapes of ends 252H and 252J allow collector plate 252A to be fixed by welding radially from the center of end surface 211A of capacitor element 211, thereby allowing collector plate 252A to be fixed to capacitor element 211 with a large joining strength.

Since the protruding shape of end 252H fits the depressed shape of end 252J, collector plate 252A can be manufactured efficiently by continuously cutting an elongate metal flat plate with a cutter while almost no waste material is produced.

Similarly, end 252H joined to terminal 213B of collector plate 253A is positioned at corner 214A of outer package 214. End 252H protruding along surfaces 214G and 214H of outer package 214, and hence, increases the area of a portion of collector plate 252A joined to terminal 212B as large as possible in a limited space of corner 214A, thereby joining collector plate 252A to terminal 212B easily with a large strength.

Furthermore, end 253J of collector plate 252A opposite to end 252H of collector plate 252A has a depressed shape fitting the protruding shape of end 253H, enlarging a portion of end surface 211B of capacitor element 211 into which the liquid substance penetrates. The shapes of ends 253H and 253J allow collector plate 253A to be fixed by welding radially from the center of end surface 211B of capacitor element 211, thereby allowing collector plate 253A to be fixed to capacitor element 211 with a large joining strength.

Since the protruding shape of end 253H fits the depressed shape of end 253J, collector plate 253A can be manufactured efficiently by continuously cutting an elongate metal flat plate with a cutter while almost no waste material is produced.

Exemplary Embodiment 5

Figure 16:
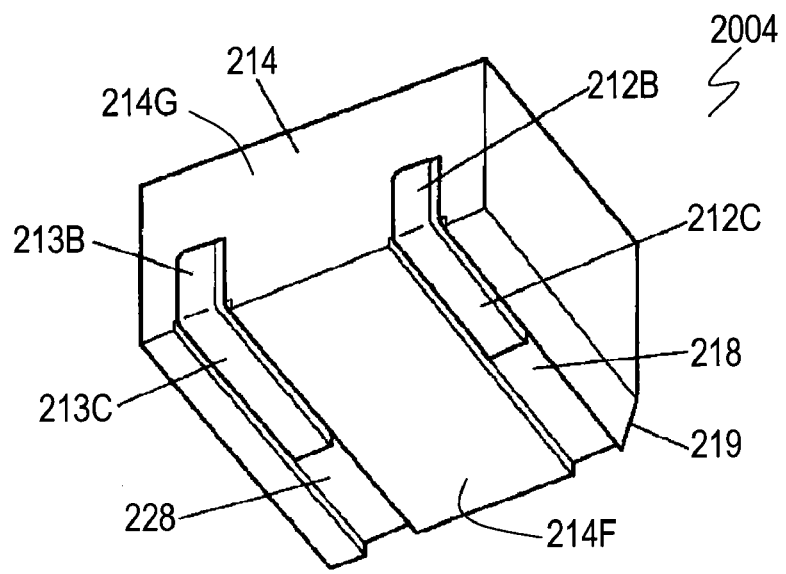
FIG. 16 is a bottom perspective view of an electronic component according to Exemplary Embodiment 5 of the invention.

FIG. 16 is a bottom perspective view of solid electrolytic capacitor 2004, an electronic component according to Exemplary Embodiment 5 of the present invention. In FIG. 16, components identical to those of solid electrolytic capacitor 2001 according to Embodiment 3 shown in FIGS. 9 to 11F will be denoted by the same reference numerals, and their description will be omitted.

In solid electrolytic capacitor 2004 shown in FIG. 16, distal end portions 212C and 213C of terminals 212B and 213B exposed from outer package 214 are bent and extend along surfaces 214G and 214F of outer package 214. Thus, solid electrolytic capacitor 2004 can be surface mounted on circuit board 2001A while surface 214F of outer package 214 contacts circuit board 2001A. Surface 214F of outer package 214 has grooves 218 and 228 provided therein to be fitted and fixed with distal end portions 212C and 213C of terminals 212B and 213B.

Figure 17:
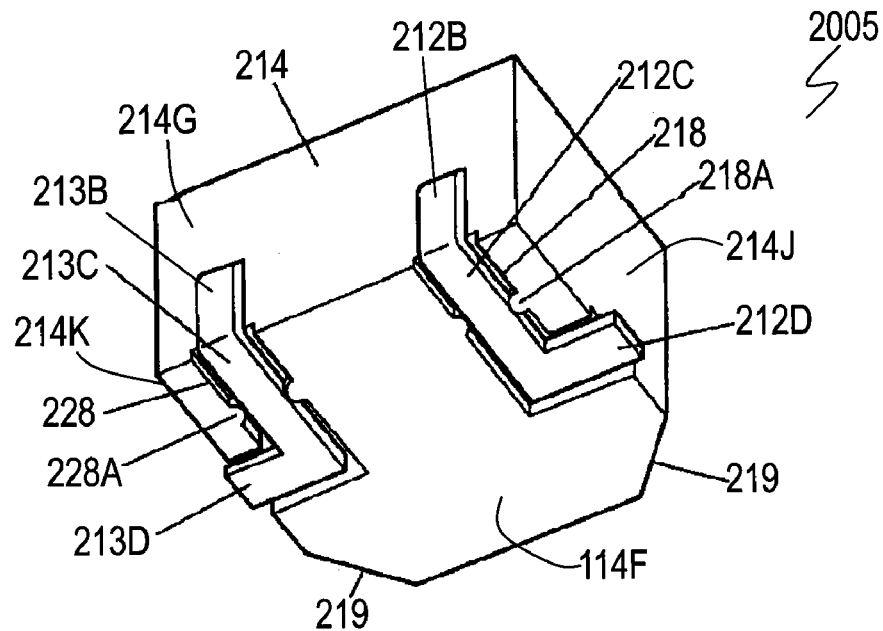
FIG. 17 is a bottom perspective view of another electronic component according to Embodiment 5.

FIG. 17 is a bottom perspective view of solid electrolytic capacitor 2005, another electronic component according to Embodiment 5. In FIG. 17, components identical to those of solid electrolytic capacitor 2004 shown in FIG. 16 will be denoted by the same reference numerals, and their description will be omitted.

As shown in FIG. 17, distal end portions 212C and 213C of terminals 212B and 213B arranged on surface 214F of outer package 214 include projections 212D and 213D that protrude to outside from surfaces 214K and 214J of outer package 214, respectively. A user cannot confirm visually, from outside, whether or not distal end portions 212C and 213C which are provided on surface 214F of outer package 214 are soldered when solid electrolytic capacitor 2005 is soldered on circuit board 2001A. Projections 212D and 213D allow the user to confirm visually indirectly whether or not distal end portions 212C and 123C are soldered when solid electrolytic capacitor 2005 is soldered on circuit board 2001A.

Terminals 212B and 213B are bent along a surface of outer package 214. Protrusions 218A and 228A for sandwiching distal end portions 212C and 213C and fixing in grooves 218 and 228 may be provided on inner surfaces of grooves 218 and 228.

Figure 18:
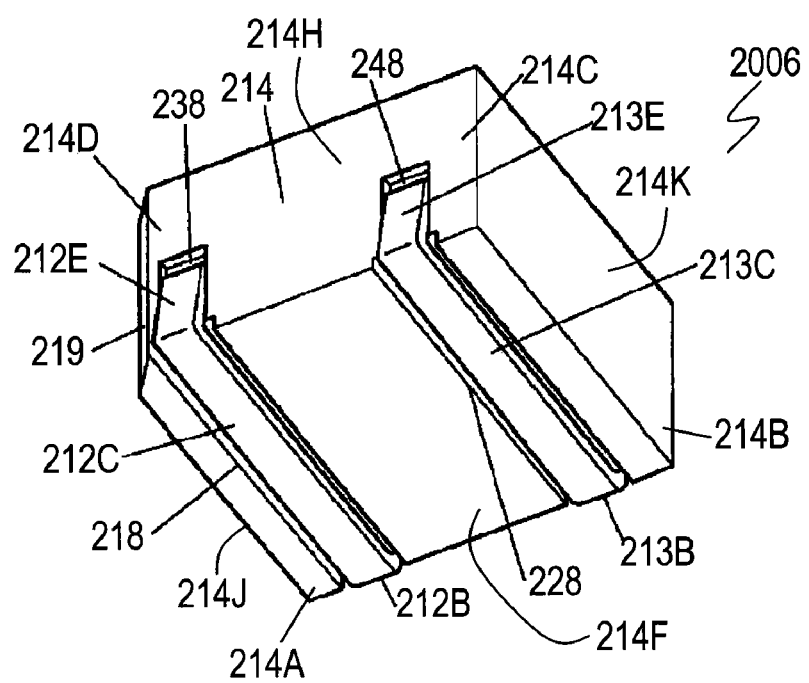
FIG. 18 is a bottom perspective view of a further electronic component according to Embodiment 5.

FIG. 18 is a bottom perspective view of solid electrolytic capacitor 2006, a further electronic component according to Embodiment 5 of the invention. In FIG. 18, components identical to those of solid electrolytic capacitor 2004 shown in FIG. 16 will be denoted by the same reference numerals, and their description will be omitted.

As shown in FIG. 18, in solid electrolytic capacitor 2006, distal end portions 212C and 213C of terminals 212B and 213B are exposed from surface 214G of outer package 214 and reach surface 214H opposite to surface 214G beyond surface 214F. Distal end portions 212C and 213C are provided in grooves 218 and 228 formed in surface 214F of outer package 214, respectively. Distal end portions 212C and 213C includes pawl 212E and 213E which are bent and extend along surface 214H of outer package 214. Surface 214H of outer package 214 has recesses 238 and 248 for receiving the distal ends of pawls 212E and 213E, respectively. The depths of recesses 238 and 248 increase as being farther away from surface 214F. This configuration fixes distal end portions 212C and 213C easily in grooves 218 and 228, respectively, without precisely controlling the widths of distal end portions 212C and 213C and grooves 218 and 228.

Recesses 238 and 248 are preferably provided in corners 214C and 214D of outer package 214 where terminals 212B and 213B are not provided, hence utilizing the space effectively without changing the size of outer package 214.

If solid electrolytic capacitors 2004 to 2006 according to Embodiment 5 have polarity, the appearance of the capacitors can be determined appropriately to allow the polarity to be visually recognized. In solid electrolytic capacitor 2004 shown in FIG. 16, the polarities of terminals 212B and 213B can be visually recognized by the lengths of distal end portions 212C and 213C exposed to outside of outer package 214 which are different from each other. Furthermore, the polarities of terminal 213B and terminal 212B exposed from corner 214B and corner 214A opposite to corner 214C and corner 214D, respectively, can be visually recognized by forming chamfered portion 219 only in one of corners 214C and 214D of four corners 214A to 214D of outer package 214 having the rectangular parallelepiped shape where terminals 212B and 213B are not provided.

In solid electrolytic capacitor 2006 shown in FIG. 17, chamfered portion 219 is formed in both corners 214C and 214D of the outer package. This structure reduces the amount of resin material of outer package 214, accordingly reduces the cost of capacitor 2006.

The shape of chamfered portion 219 may be flat or curved, and may be any shape that can indicate the polarity and that can ensure necessary characteristics, such as air tightness, heat resistance, impact resistance, and vibration resistance of outer package 214.

Exemplary Embodiment 6

Figure 19:
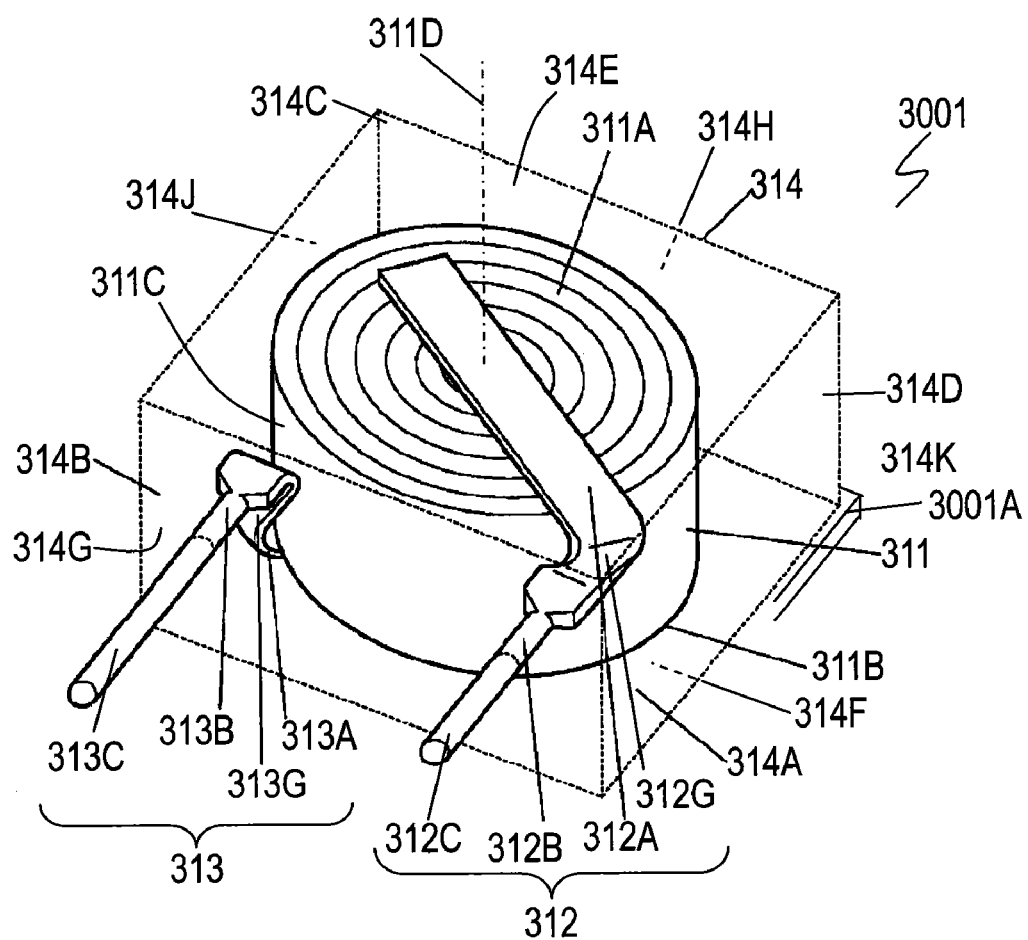
FIG. 19 is a perspective view of an electronic component according to Exemplary Embodiment 6 of the invention.

FIG. 19 is a perspective view of solid electrolytic capacitor 3001, an electronic component according to Exemplary Embodiment 6 of the present invention. Solid electrolytic capacitor 3001 includes capacitor element 311, i.e. a functional element, having end surfaces 311A and 311B opposite to each other, positive electrode collector 312 joined to end surface 311A of capacitor element 311, negative electrode collector 313 joined to end surface 311B of capacitor element 311, and outer package 314 for integrally covering capacitor element 311, positive electrode collector 312, and negative electrode collector 313. Capacitor element 311 is of a roll-type in which end surface 311A and end surface 311B function as a positive electrode and a negative electrode of capacitor element 311, respectively. Capacitor element 311 has a cylindrical shape extending along center axis 311D. Capacitor element 311 has circular end surfaces 311A and 311B opposite to each other arranged along center axis 311D, and side surface 311C extending parallel to center axis 311D and about center axis 311D. Positive electrode collector 312 includes collector plate 312A joined to end surface 311A of capacitor element 311, and terminal 312B for external connection extending from collector plate 312A. Negative electrode collector 313 includes collector plate 313A joined to end surface 311B of capacitor element 311, and terminal 313B for external connection extending from collector plate 313A. Outer package 314 having has a rectangular parallelepiped shape integrally covers capacitor element 311, positive electrode collector 312, and negative electrode collector 313 while exposing portions of terminals 312B and 313B of collectors 312 and 313 to outside. Outer package 314 has surfaces 314E and 314F perpendicular to center axis 311D, and surfaces 314G, 314H, 314J, and 314K connected to surfaces 314E and 314F and parallel to center axis 311D. Surfaces 314E and 314F have a square shape or a rectangular shape. Surfaces 314G, 314H, 314J, and 314K have a rectangular shape. Terminals 312B and 313B protrude from surface 314G. Surface 314H is parallel to surface 314G and positioned opposite to surface 314G. Surface 314J is connected perpendicularly to surfaces 314G and 314H. Surface 314K is connected perpendicularly to surfaces 314G and 314H, is parallel to surface 314J, and is positioned opposite to surface 314J. Outer package 314 has four corners 314A to 314D that are not occupied by capacitor element 311 as seen from a direction of center axis 311D, that is, as seen from surfaces 314E and 314F. Respective portions of terminals 312B and 313B of collectors 312 and 313 are arranged at corners 314A and 314B of the rectangular parallelepiped shape of outer package 314, respectively. Terminals 312B and 313B extend from corners 314A and 314B, respectively. Surface 314F is a mounting surface adapted to contact circuit board 3001A when solid electrolytic capacitor 3001 is mounted onto circuit board 3001A. Surface 314G extends from corner 314A to corner 314B. Surface 314K extends from corner 314A to corner 314D. Surface 314J extends from corner 314B to corner 314C.

Capacitor element 311 includes a positive electrode foil made of valve metal, such as aluminum, a dielectric oxide layer provided on a surface of the positive electrode foil, a separator provided on the dielectric oxide layer, and a negative electrode foil made of valve metal, such as aluminum, provided on the separator. The positive electrode foil, the dielectric oxide layer, the separator, and the negative electrode foil are rolled about center axis 311D to have a substantially cylindrical shape. Side surface 311C having a cylindrical shape provided at an outer periphery of capacitor element 311 is fastened with an insulating tape, such as an adhesive tape. The surface area of the surface of the positive electrode foil at which the dielectric oxide layer is provided is enlarged by etching. Center axis 311D is perpendicular to surface 314F, the mounting surface of solid electrolytic capacitor 3001.

The positive electrode foil and the negative electrode foil of capacitor element 311 are rolled while deviating from each other along center axis 311D. Thus, the positive electrode foil is exposed at end surface 311A, and the negative electrode foil is exposed at end surface 311B.

Capacitor element 311 further includes an electrolyte held between the positive electrode foil and the negative electrode foil, mainly held in the separator. The electrolyte may employ solid conductive polymer, such as polyaniline, polypyrrole, polythiophene, or a derivative thereof, or liquid electrolyte, such as electrolytic solution.

Each of the positive electrode and the negative electrode may include a collector made of aluminum foil and a polarized electrode layer made of carbon material arranged on the collector. The positive electrode and the negative electrode overlaps across the separator, and are rolled to have a substantially cylindrical shape.

Capacitor element 311 may be a metalized film capacitor. The capacitor has a substantially cylindrical shape in which the positive electrode and the negative electrode both made of metalized film overlap and are rolled. The metalized film includes a dielectric film made from polyethylene telephtalate, polypropylene, polyethylene naphthalate, or polyphenylene sulfide, and a vapor deposited electrode formed by partially vapor depositing metal, such as aluminum, on a surface of the dielectric film. The positive electrode and the negative electrode overlap and are rolled such that the vapor deposited electrodes of the positive electrode and the negative electrode do not contact each other.

The functional element is an active element or a passive element that performs an electrical function. For instance, if the electronic component is a capacitor, the electronic component has a predetermined electrical function serving as a capacitor. In this case, the functional element is a capacitor element, and performs a predetermined electrical function serving as the capacitor. If the electronic component is a battery, the electronic component has a predetermined electrical function serving as a battery. In this case, the functional element is a battery element, and performs a predetermined electrical function serving as the battery. If the electronic component is a semiconductor device, the electronic component has a predetermined electrical function serving as a semiconductor device. In this case, the functional element is a semiconductor element, and performs a predetermined electrical function serving as the semiconductor device.

Collector plate 312A and terminal 312B of positive electrode collector 312 are unitarily formed, and similarly, collector plate 313A and terminal 313B of negative electrode collector 313 are unitarily formed.

Collector plates 312A and 313A are made of a metal material having a plate shape. Collector plates 312A and 313A contact end surfaces 311A and 311B of capacitor element 311, respectively. Then, collector plate 312A and the positive electrode exposed at end surface 311A are mechanically and electrically joined by laser welding. Collector plate 313A and the negative electrode exposed at end surface 311B are mechanically and electrically joined by laser welding.

Further conductive materials, such as metal fine particles, may be provided between collector plate 312A and end surface 311A and between collector plate 313A and end surface 313B to join collector plate 312A and end surface 311A and to join collector plate 313A and end surface 311B.

Collector plates 312A and 313A are made of material, such as elementary substance of aluminum, iron, nickel or copper, or metal base material, such as aluminum alloy, iron alloy, nickel alloy, or copper alloy, that can be mechanically and electrically joined with the electrodes of capacitor element 311. In the case that the electrode foil is made of aluminum, collector plates 312A and 313A are preferably made of plate material of aluminum. Collector plates 312A and 313A can be easily joined to edges of the electrode foils exposed at end surfaces 311A and 311B of capacitor element 311 with a large joining area.

Distal end portions 312C and 313C of terminals 312B and 313B are made of metal material formed unitarily with collector plates 312A and 313A, respectively. Distal end portions 312C and 313C of terminals 312B and 313B have a round wire shape having a circular cross section. Terminals 312B and 313B are provided at one ends of collector plates 312A and 313A, and are arranged at corners 314A and 314B, adjacent to each other, of the rectangular parallelepiped shape of outer package 314, respectively.

Figure 20:
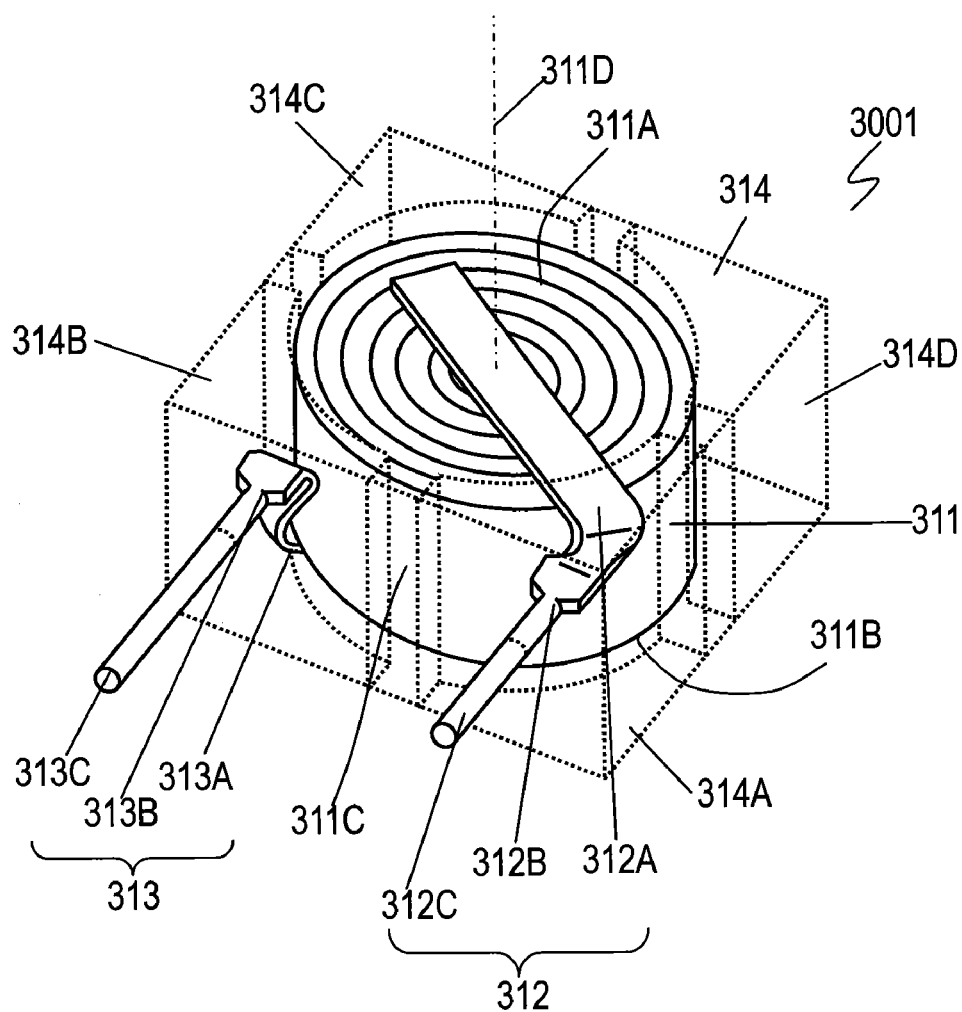
FIG. 20 is a perspective view of the electronic component according to Embodiment 6.

FIG. 20 is a perspective view of outer package 314 of solid electrolytic capacitor 3001 for illustrating corners 314A to 314D. As shown in FIG. 20, capacitor element 311 is accommodated in outer package 314 such that circular end surfaces 311A, 311B of cylindrical capacitor element 311 are parallel to surfaces of the rectangular parallelepiped shape of outer package 314 opposite to each other. Corners 314A to 314D are positioned between cylindrical side surface 311C of capacitor element 311 and a surface of outer package 314 having the rectangular parallelepiped shape. Corners 314A and 314D are positioned diagonally from each other in the rectangular parallelepiped shape. Corners 314B and 314C are positioned diagonally from each other in the rectangular parallelepiped shape. Corners 314A and 314B are adjacent to each other. Collector plate 312A of positive electrode collector 312 extends elongatedly from corner 314A towards corner 314C beyond center axis 311D. Collector plate 313A of positive electrode collector 313 extends elongatedly from corner 314B towards corner 314D beyond center axis 311D.

Terminals 312B and 313B have distal end portions 312C and 313C, respectively, that are exposed to outside of outer package 314. Plated layers may be formed on surfaces of distal end portion 312C and 313C of terminal 312B and 313B to connect securely to circuit board 3001A by soldering. The plated layers may be formed by plating simple substance, such as Ni or Sn, or tin-based metal, such as tin alloy containing Sn and at least one of Ag, Bi, In, and Pb.

Outer package 314 covers capacitor element 311 while exposing the portions of terminals 312B and 313B to the outside, and is made of insulating resin, such as epoxy resin, having high air tightness, high heat resistance, and excellent mechanical properties.

Capacitor element 311 may be accommodated in a metal case having an opening. In this case, the opening of the metal case is sealed with an insulating elastic member, such as a rubber, having apertures allowing the portions of terminals 312B and 313B to exposed to outside.

A method of manufacturing solid electrolytic capacitor 3001 according to Embodiment 6 will be described below. FIGS. 21A to 21F illustrate the method of manufacturing solid electrolytic capacitor 3001.

Figure 21A:
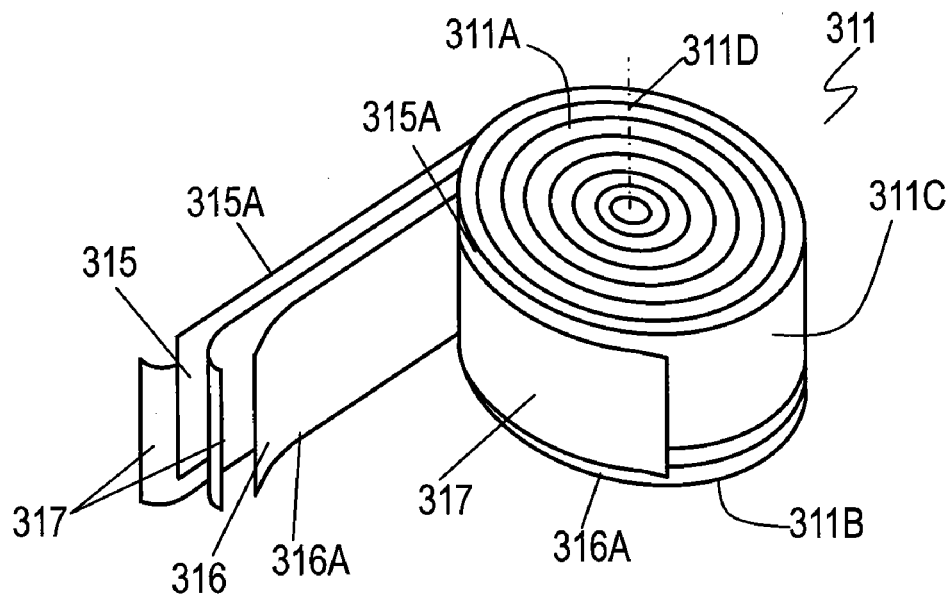
FIGS. 21A to 21F are perspective views of the electronic component according to Embodiment 6 for illustrating a method of manufacturing the electronic component.

FIG. 21A illustrates the structure of capacitor element 311. Electrode foil 315, electrode foil 316, and separator 317 having an insulating property are stacked and rolled about center axis 311D to have a substantially cylindrical shape while separator 317 is provided between positive electrode foil 315 and negative electrode foil 316. Then, side surface 311C having a substantially cylindrical shape is fastened with an insulating tape to provide roll type capacitor element 311. Electrode foil 315 is made of valve metal, aluminum according to Embodiment 6, and includes a dielectric oxide layer at a surface of the electrode foil 315. Negative electrode foil 316 is made of aluminum. In this case, center axis 311D is perpendicular to a surface of circuit board 3001A to which solid electrolytic capacitor 3001 is adapted to be mounted. Electrode foil 315 has the same width as electrode foil 316 in the direction of center axis 311D. While being would, electrode foil 315 deviates from electrode foil 316 towards end surface 311A along center axis 311D. This arrangement exposes edge 315A of electrode foil 315 at end surface 311A of capacitor element 311 to allow edge 315A to protrude from end surface 311A. Similarly, this arrangement expose edge 316A of electrode foil 316 at end surface 311B to allow edge 316A to protrude from end surface 311B. Separator 317 is made of porous insulator, such as fiber having numerous voids. Electrode 315 is removed from end surface 311B. Electrode 316 is removed from end surface 311A.

Figure 21B:
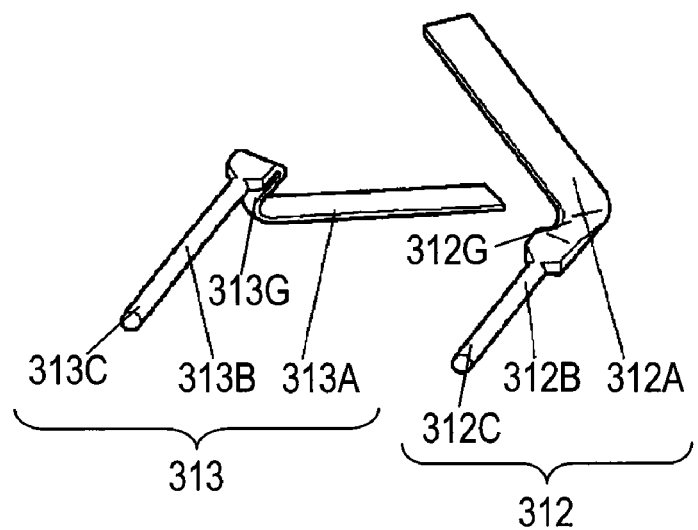

FIG. 21B is a perspective view of positive electrode collector 312 and negative electrode collector 313. Collectors 312 and 313 are metal plates made of aluminum. Terminal 312B extends from one end of collector plate 312A and has a round wire shape having a circular cross section. Terminal 313B extends from one end of collector plate 313A and has a round wire shape having a circular cross section. One end of a round wire material made of aluminum having a circular cross-section is pressed to have a flat plate shape to form collector plates 312A and 313A, thus providing terminals 312B and 313B including collector plates 312A and 313A and round wires extending from collector plates 312A and 313A, respectively.

Plated layers made of tin-based alloy may be provided on respective surfaces of distal end portions 312C and 313C of terminals 312B and 313B so as to be easily soldered to circuit board 3001A.

Collector 312 further includes junction portion 312G connected between collector plate 312A and terminal 312B. Junction portion 312G is substantially perpendicular to collector plate 312A and terminal 312B. Junction portion 312G can be formed by bending collector plate 312A perpendicularly, and then bending it substantially perpendicularly with respect to the previously-bent direction. Collector plate 312A is parallel to distal end portion 312C of terminal 312B. Collector 313 further includes junction portion 313G connected between collector plate 313A and terminal 313B. Junction portion 313G is substantially perpendicular to collector plate 313A and terminal 313B. Junction portion 313G can be formed by bending collector plate 313A substantially perpendicularly, and then bending it substantially perpendicularly with respect to the previously-bent direction. Collector plate 313A is parallel to distal end portion 313C of terminal 313B.

Junction portions 312G and 313G can be formed by bending terminals 312B and 313B instead of collector plates 312A and 313A, respectively.

Figure 21C:
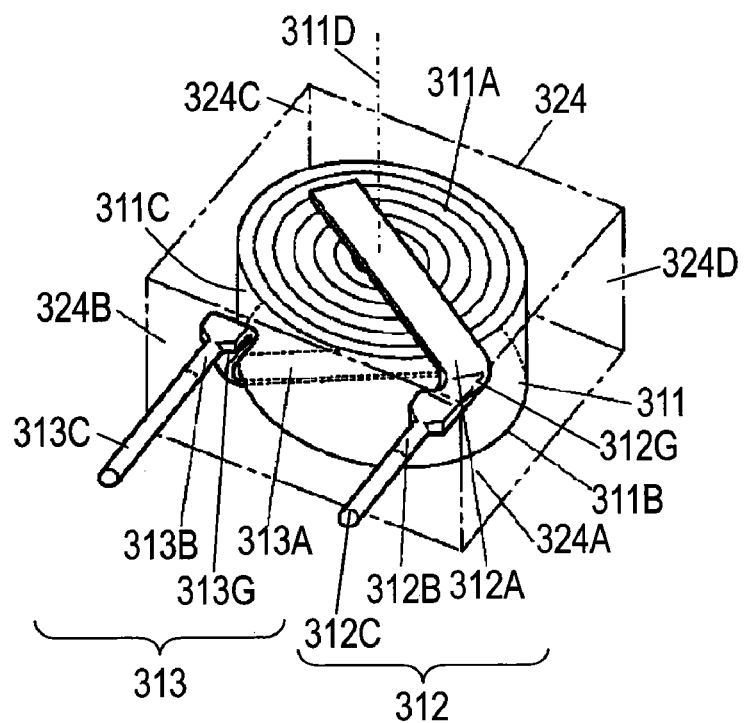

Collectors 312 and 313 are then attached to capacitor element 311, as shown in FIG. 21C. Virtual rectangular parallelepiped 324 shows a range in which outer package 314 covers capacitor element 311. Terminals 312B and 313B are positioned at corners 324A and 324B of virtual rectangular parallelepiped 324 adjacent to each other, such that distal end portions 312C and 313C of terminals 312B and 313B extend in the same direction perpendicular to center axis 311D, respectively. Upon being attached, collector plate 312A is joined to edge 315A of electrode foil 315 protruding from end surface 311A of capacitor element 311, and collector plate 313A is joined to edge 316A of electrode foil 316 protruding from end surface 311B of capacitor element 311.

As shown in FIG. 21C, junction portions 312G and 313G of collectors 312 and 313 are parallel to center axis 311D, that is, side surface 311C of capacitor element 311 having the cylindrical surface while collectors 312 and 313 are attached to capacitor element 311. Therefore, collectors 312 and 313 can be arranged at predetermined positions with respect to capacitor element 311 easily.

Junction portions 312G and 313G can be formed by bending collector plates 312A and 313A or terminals 312B and 313B after collector plates 312A and 313A are attached to capacitor element 311.

Figure 21D:
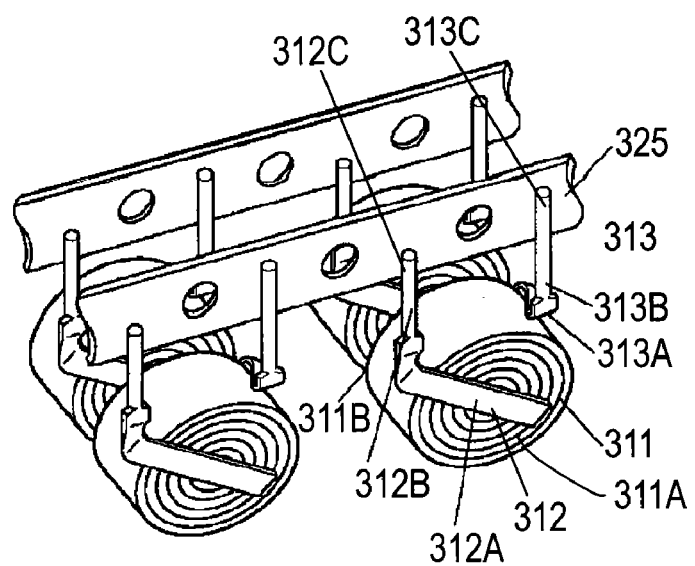

After that, as shown in FIG. 21D, distal end portions 312C and 313C of terminals 312B and 313B extending in the same direction are fixed to conveyor base 325 having a band shape with an adhesive tape to convey capacitor element 311. Distal end portions 312C and 313C of terminals 312B and 313B may be held with a chucking device pinching the distal end portions.

Figure 21E:
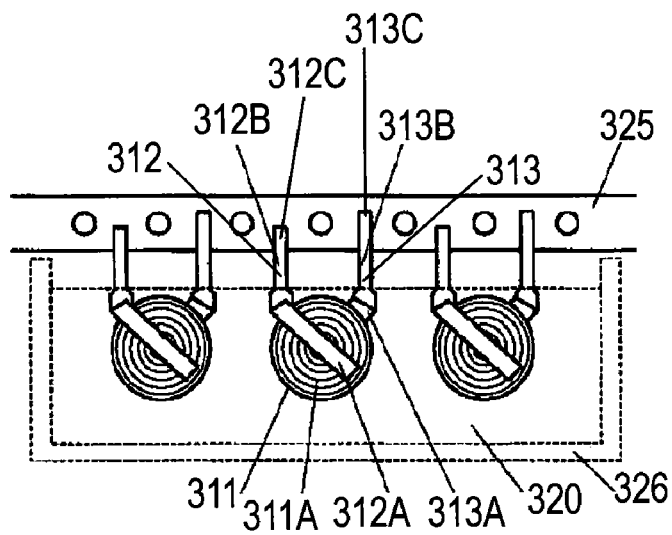

As shown in FIG. 21E, electrolyte-forming solution 320 containing polymerizable monomer, such as pyrrole or thiophene, and oxidant is prepared in container 326. While distal end portions 312C and 313C of terminals 312B and 313B held by conveying base 325 are located above capacitor element 311, capacitor element 311 is immersed in electrolyte-forming solution 320 to fill between electrode foils 315 and 316 of capacitor element 311 with electrolyte-forming solution 320. In this case, distal end portions 312C and 313C of terminals 312B and 313B are removed from solution 320 to prevent the portions from being immersed in electrolyte-forming solution 320. Then, capacitor element 311 is taken out from electrolyte-forming solution 320, thus forming a solid electrolyte layer containing conductive polymer, such as polypyrrole or polythiophene, on the surfaces of electrode foils 315 and 316 and in the voids of separator 317 by chemical polymerization at a predetermined temperature for a predetermined period of time.

Instead of immersing capacitor element 311 in electrolyte-forming solution 320 containing the polymerizable monomer and the oxidant, the capacitor element 311 can be sequentially immersed separately into polymerizable monomer solution and oxidant solution. The order of immersing capacitor element 311 into the polymerizable monomer solution and the oxidant solution can be appropriately determined.

Electrolyte-forming solution 320 contains solvent and additive, such as surfactant in addition to the polymerizable monomer and the oxidant, which are main constituents of polymerization reaction.

The polymerization for forming the solid electrolyte layer can be an electrolytic polymerization, or both the electrolytic polymerization and a chemical polymerization may be used.

Electrolyte-forming solution 320 may be solution for forming solid electrolytes, such as TCNQ complex salt or manganese dioxide, other than the conductive polymer.

Driving electrolytic solution containing organic solvent, such as ethylene glycol or γ-butyrolactone, and electrolyte material having conductive ion can be used as electrolyte-forming solution 320.

Electrolyte-forming solution 320 can be solution containing conductive polymer dispersed therein.

Figure 21F:
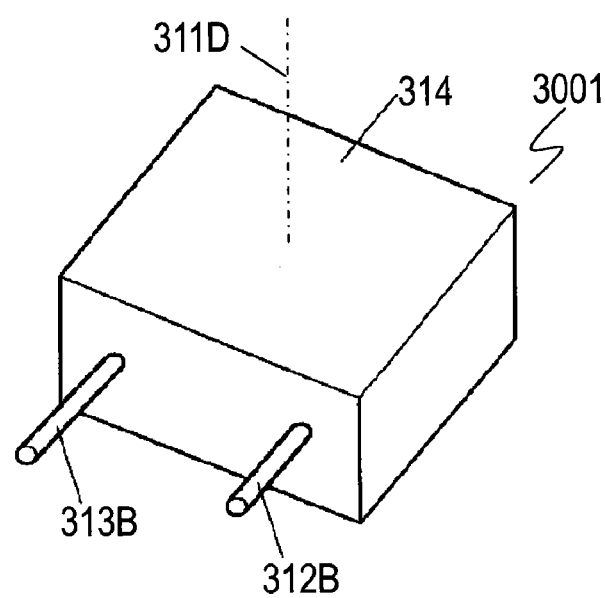

Then, as shown in FIG. 21F, outer package 314 having the rectangular parallelepiped shape is formed by covering capacitor element 311 with insulating resin material, such as epoxy. At this moment, terminals 312B and 313B are arranged at adjacent corners 314A and 314B of outer package 314, respectively while distal end portions 312C and 312B of terminals 312B and 313B are exposed to outside from surface 314G, respectively.

A voltage is then applied between terminals 312B and 313B to restore a defective portion of the dielectric oxide layer of electrode foil 315 so as to insulate the solid electrolyte at the defective portion and its vicinity, thereby reducing a leakage current and fabricating solid electrolytic capacitor 3001.

Capacitor element 311 can be immersed in re-anodizing solution after collectors 312 and 313 are attached to capacitor element 311, as shown in FIG. 21C, and then, the voltage may be applied between terminals 312B and 313B to re-anodizing electrode foil 315 to restore the dielectric oxide layer of electrode foil 315. In this case, capacitor element 311 can be immersed in the re-anodizing solution while being held by conveyor base 325, as shown in FIG. 21D.

In solid electrolytic capacitor 3001, the electronic component according to Embodiment 6, collector plates 312A and 313A of collectors 312 and 313 are joined to edges 315A and 316A of electrode foils 315 and 316 protruding from end surfaces 311A and 311B of cylindrical capacitor element 311, respectively. This structure reduces a connection resistance between electrode foils 315 and 316 and collectors 312 and 313 more than lead wire 102 rolled in the electrode foil of conventional solid electrolytic capacitor 601 shown in FIG. 34, thus providing solid electrolytic capacitor 3001 with low equivalent series resistance (ESR).

Collector plates 312A and 313A are not rolled with electrode foils 315 and 316, and allow end surfaces 311A and 311B of capacitor element 311 to have a circular shape close to a perfect circle. Capacitor element 101 of conventional solid electrolytic capacitor 601 shown in FIG. 34 may cause short-circuiting due to the contact between the electrode foil and the edge of the lead wire where stress concentrates. In capacitor element 311 according to Embodiment 6, electrode foils 315 and 316 are rolled with uniform forces, and are not prevented from the above short circuiting.

The rectangular parallelepiped shape of outer package 314 matches with a space having a rectangular parallelepiped shaped space on circuit board 3001A substantially occupied by capacitor 3001 mounted on circuit board 3001A. Roll type capacitor element 311 having the cylindrical shape is accommodated in outer package 314, and causes four corners 314A to 314D of outer package 314 to become dead spaces that are not occupied by capacitor element 311. Terminals 312B and 313B are arranged at corners 314A and 314B of corners 314A to 314D, respectively, so that a dead space on circuit board 3001A formed by mounting solid electrolytic capacitor 3001 can be effectively utilized. Therefore, outer package 314 and solid electrolytic capacitor 3001 can have small sizes while the size of capacitor element 311 is not reduced, that is, while electrical characteristics, such as a large capacitance, is maintained.

Terminals 312B and 313B are arranged at corners 314A and 314B of outer package 314 adjacent to each other, respectively, and are not arranged at corners of four corners 314A to 314D positioned diagonally. Thus, during processes for manufacturing solid electrolytic capacitor 3001, particularly in the process for immersing capacitor element 311 in liquid substance, such as electrolyte-forming solution 320, capacitor element 311 can be immersed sufficiently in the liquid substance while distal end portions 312C and 313C of terminals 312B and 313B are located above capacitor element 311, thereby preventing the liquid substance from being attached to distal end portions 312C and 313C of terminals 312B and 313B. As a result, the liquid substance can sufficiently fill capacitor element 311 to form a dense electrolyte layer, accordingly providing capacitor element 311 with a low resistance and a large capacitance. Further, this arrangement provides capacitor element 311 with air tightness at an interface between terminals 312B and 313B and outer package 314 and allows distal end portions 312C and 313C of terminals 312B and 313B to be soldered easily, hence manufacturing solid electrolytic capacitor 3001 having high quality efficiently.

When collector plates 312A and 313A having flat plate shapes are fixed to end surfaces 311A and 311B of capacitor element 311 by laser welding, respectively, collector plate 312A may not be parallel to collector plate 313A. Since terminals 312B and 313B provided at one ends of collector plates 312A and 313A have round wire shapes with a circular cross section instead of a flat shape, distal end portions 312C and 313C of terminals 312B and 313B are not influenced at all even if collector plate 312A is not parallel to collector plate 313A.

For instance, in the case that distal end portions 312C and 313C of terminals 312B and 313B have flat shapes, distal end portions 312C and 313C of terminals 312B and 313B is not parallel to each other if collector plate 312A is not parallel to collector plate 313A. If distal end portions 312C and 313C are fixed to conveyor base 325 with an adhesive tape, as shown in FIG. 21D, one of distal end portions 312C and 313C may not reliably contact conveyor base 325 to be removed, and may not be fixed to conveyor base 325 with a large strength with the adhesive tape. In solid electrolytic capacitor 3001 according to Embodiment 6, distal end portions 312C and 313C of terminals 312B and 313B have a round wire shape having a circular cross section. Even if collector plate 312A is not parallel to collector plate 313A, distal end portions 312C and 313C of terminals 312B and 313B reliably contact conveyor base 325 and are not removed, and thus can be reliably fixed to conveyor base 325 with a large strength with the adhesive.

As shown in FIG. 21E, when capacitor element 311 is immersed in the liquid substance, such as electrolyte-forming solution 320, collector plates 312A and 313A of collectors 312 and 313 having plate shapes cover portions of end surfaces 311A and 311B of capacitor element 311. If collector plates 312A and 313A extend elongatedly in the same direction, that is, if the entire surfaces of collector plates 312A and 313A face each other across capacitor element 311, collector plates 312A and 313A blocks the portion of capacitor element 311 between collector plates 312A and 313A, hence preventing the liquid substance from penetrating into capacitor element 311.

In solid electrolytic capacitor 3001, the electronic component according to Embodiment 6, collector plate 312A extends elongatedly from corner 324A (314A) towards corner 324C (314C) positioned diagonally from corner 324A (314A). Collector plate 313A extends elongatedly from corner 324B (314B) adjacent to corner 324A and towards corner 324D (314D) positioned diagonally from corner 324B (314B). Collector plates 312A and 313A thus extend in directions perpendicular to each other so that collector plates 312A and 313A deviate to facing each other partially, as shown in FIG. 3C. This arrangement reduces the portion of capacitor element 311 blocked by collector plates 312A and 313A, accordingly allowing the liquid substance to sufficiently penetrate into capacitor element 311. As a result, a dense electrolyte layer can be formed in capacitor element 311, and provides capacitor element 311 with a low resistance and a large capacitance. This arrangement reduces a period of time for immersing capacitor element 311 in the liquid substance, accordingly allowing solid electrolytic capacitor 3001 with high quality to be manufactured efficiently.

Distal end portions 312C and 313C of terminals 312B and 313B are exposed from same surface 314G of outer package 314 and extend in the same direction. Therefore, as shown in FIG. 21D, during processes for manufacturing solid electrolytic capacitor 3001, distal end portions 312C and 313C of terminals 312B and 313B can be easily fixed to single conveyor base 325, thereby allowing solid electrolytic capacitor 1001 to be manufactured at high productivity.

Figure 22A:
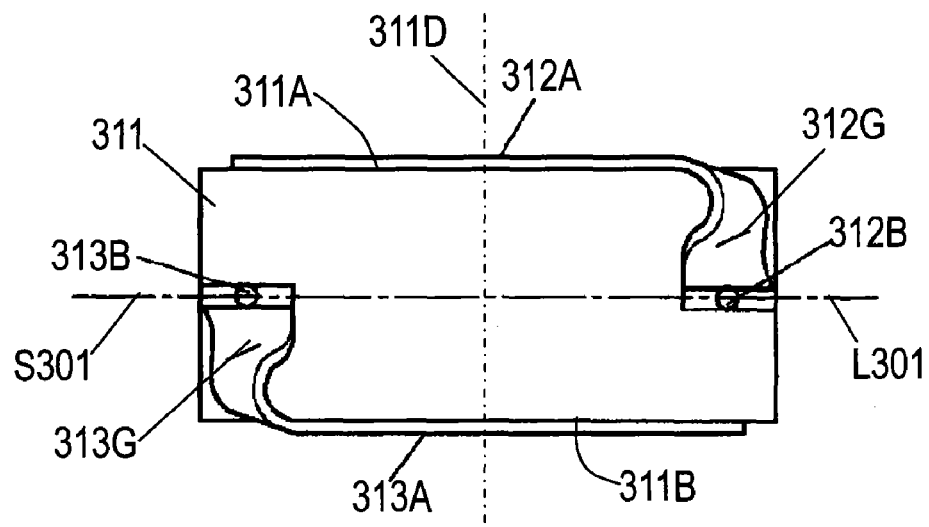
FIGS. 22A and 22B are side views of a functional element of the electronic component according to Embodiment 6.
Figure 22B:
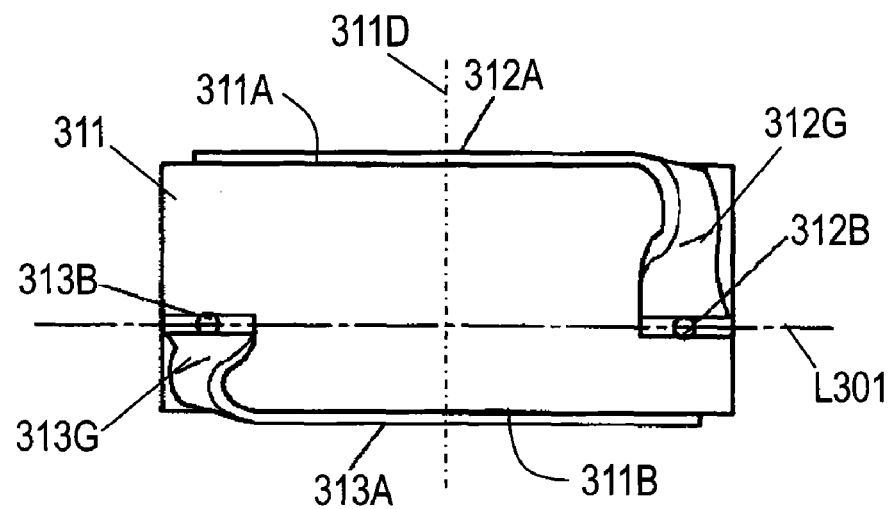

FIGS. 22A and 22B are side views of capacitor element 311, a functional element of solid electrolytic capacitor 3001 i.e. the electronic component according to Embodiment 6. Line L301 connecting distal end portions 312C and 313C of terminals 312B and 313B is substantially parallel to end surfaces 311A and 311B of capacitor element 311. Thus, as shown in FIG. 3D, intervals between plural capacitor elements 311 having distal end portions 312C and 313C of terminals 312B and 313C fixed to conveyor base 325 can be reduced, hence allowing electrolytic capacitor 3001 to be manufactured at high productivity with a small manufacturing apparatus with a small footprint. Furthermore, as shown in FIG. 3E, when plural capacitor elements 311 fixed to conveyor base 325 are immersed in the liquid substance, such as electrolyte-forming solution 320, container 326 storing the liquid substance can have a small size and has a quality easily controlled.

As shown in FIG. 22A, surface S301 which is parallel to end surfaces 311A and 311B of capacitor element 311 and which includes line L301 can be positioned at the middle between end surfaces 311A and 311B to allow collectors 312 and 313 to have the same shape, hence allowing components of the capacitor to be standardized and allowing solid electrolytic capacitor 3001 to be manufactured at high productivity.

Junction portions 312G and 313G extend perpendicularly from collector plates 312A and 313A of collectors 312 and 313 in outer package 314, respectively. Terminals 312B and 313B extend perpendicularly from junction portions 312G and 313G such that distal end portions 312C and 313C of terminals 312B and 313B are exposed from surface 314G of outer package 314. This structure provides a long path along which external elements, such as air and moisture, entering from the interface between terminals 312B and 313B and outer package 314 reach capacitor element 311. These external elements may deteriorate characteristics of capacitor element 311. The structure of collectors 312 and 313 prevents the external elements from reaching capacitor element 311, hence providing solid electrolytic capacitor 3001 with long-term environment resistance.

Figure 23:
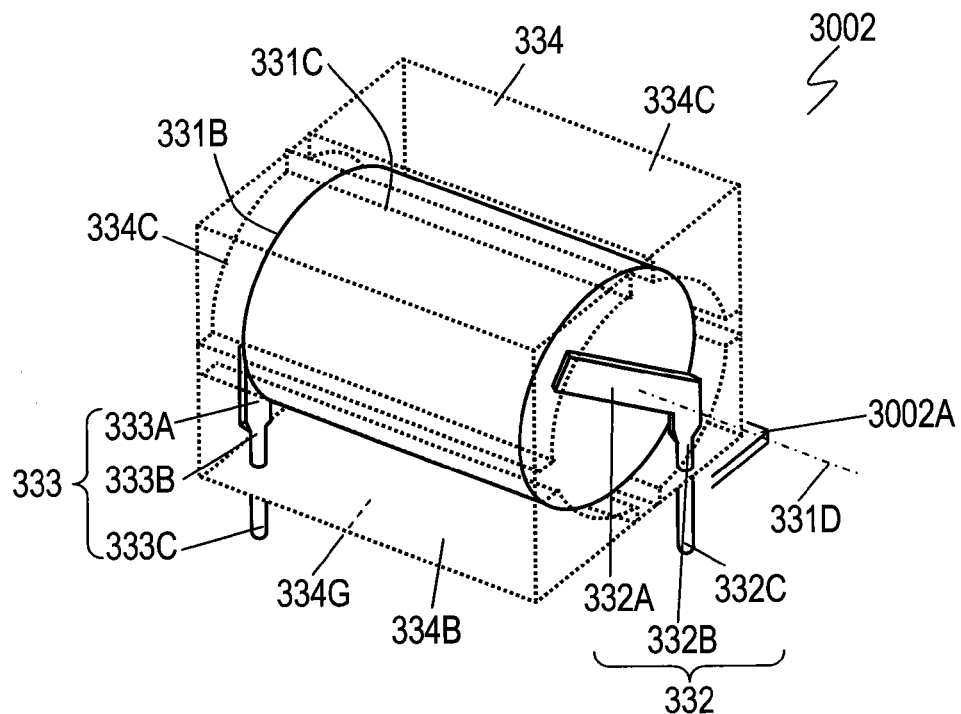
FIG. 23 is a perspective view of another electronic component according to Embodiment 6.

FIG. 23 is a perspective view of solid electrolytic capacitor 3002, another electronic component according to Embodiment 6. Solid electrolytic capacitor 3002 shown in FIG. 23 includes capacitor element 331, collectors 332 and 333 and outer package 334 instead of capacitor element 311, collectors 312 and 313, and outer package 314 of solid electrolytic capacitor 3001 shown in FIGS. 19 and 20. Capacitor element 331 has a cylindrical shape having end surfaces 331A and 331B, side surface 331C, and center axis 331D similar to end surfaces 311A and 311B, side surface 311C, and center axis 311D of capacitor element 311 of solid electrolytic capacitor 3001. Outer package 334 having a rectangular parallelepiped shape accommodates cylindrical capacitor element 331 therein, and has corners 334A to 334D and surfaces 334F and 334G similar to corners 314A to 314D and surfaces 314F and 314G of solid electrolytic capacitor 3001. Collectors 332 and 333 include collector plates 332A and 333A, terminals 332B and 333B, and distal end portions 332C and 333C similar to collector plates 312A and 313A, terminals 312B and 313B, and distal end portions 312C and 313C of collectors 312 and 313 of solid electrolytic capacitor 3001. Terminals 332B and 332B extend from collector plates 332A and 333A in the same direction perpendicular to center axis 331D. Terminals 332B and 332B are joined to end surfaces 331A and 331B of capacitor element 331, respectively. Distal end portions 332C and 333C of terminals 332B and 333B are exposed from surface 334G of outer package 334. Surface 334G is the mounting surface adapted to contact circuit board 3002A when capacitor 3002 is mounted onto circuit board 3002A. Center axis 331D is parallel to surface 334G, i.e., the mounting surface.

In order to reduce the height of solid electrolytic capacitor 3002 shown in FIG. 5, the areas of end surfaces 331A and 331B of capacitor element 331 become small, and the width of the electrode foil of capacitor element 331 along center axis 331D becomes large to ensure electrical characteristics, such as a capacitance. Therefore, the liquid substance penetrates into capacitor element 331 less than capacitor element 311 of solid electrolytic capacitor 3001.

In contrary, solid electrolytic capacitor 3001 shown in FIGS. 19 and 20 is mounted while surface 314G of outer package 314 contacts circuit board 3001A, and thus, the areas of end surfaces 311A and 311B of capacitor element 311 can be large even if its height is small. Therefore, the widths of electrode foils 315 and 316 in the direction perpendicular to center axis 311D can be large to ensure electrical characteristics, such as a capacitance. Therefore, the liquid substance can penetrate easily into capacitor element 311.

Exemplary Embodiment 7

Figure 24:
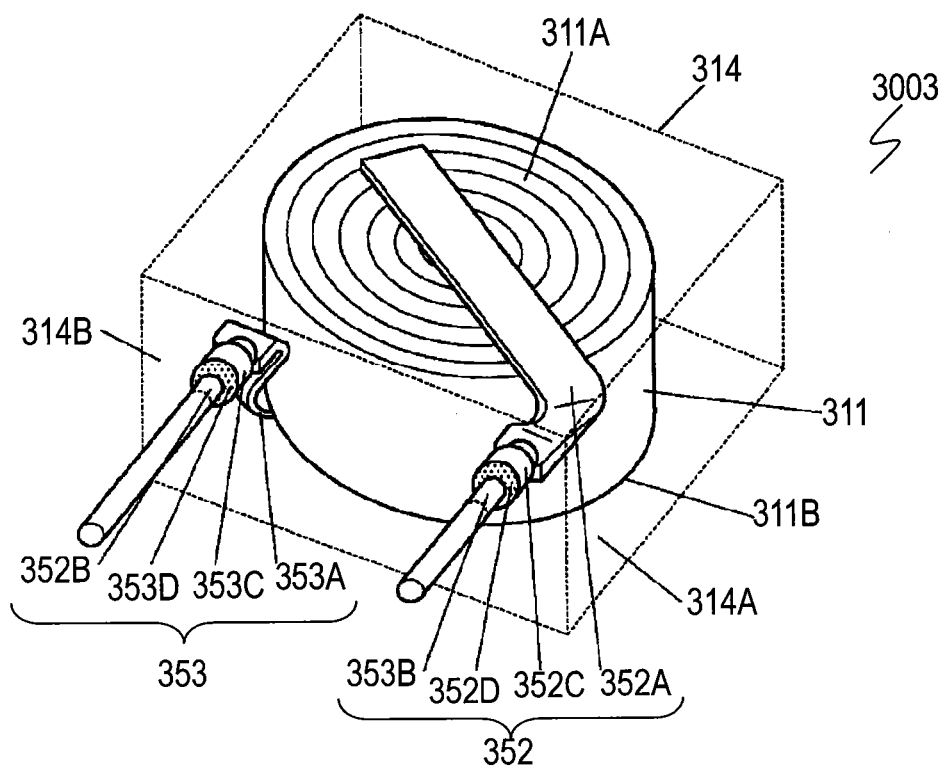
FIG. 24 is a perspective view of an electronic component according to Exemplary Embodiment 7 of the invention.

FIG. 24 is a perspective view of solid electrolytic capacitor 3003, an electronic component according to Exemplary Embodiment 7 of the present invention. In FIG. 24, components identical to those of solid electrolytic capacitor 3001 according to Embodiment 6 shown in FIGS. 19 to 21F are denoted by the same reference numerals, and their description will be omitted. Solid electrolytic capacitor 3003 according to Embodiment 7 shown in FIG. 24 includes collectors 352 and 353 instead of collectors 312 and 313 of solid electrolytic capacitor 3001 according to Embodiment 6 shown in FIG. 19.

Collectors 352 and 353 include collector plates 352A and 353A and terminals 352B and 353B instead of collector plates 312A and 313A and terminals 312B and 313B of collectors 312 and 313 of solid electrolytic capacitor 3001 shown in FIG. 19. Collector plate 352A and 353A are members separate from terminals 352B and 353B, respectively. Collector plates 352A and 353A are joined to end surfaces 311A and 311B of capacitor element 311, similar to collector plates 312A and 313A of solid electrolytic capacitor 3001. Round bar portions 352C and 353C are provided at one ends of collector plates 352A and 353A having flat panel shapes, respectively. Round bar portions 352C and 353C are joined with ends of terminals 352B and 353B made of metal and having round wire shapes, with joining portions 352D and 353D by laser welding or resistance welding, respectively.

Terminals 352B and 353B of collectors 352 and 353 can not be large since the terminals are arranged in the limited space of corners 314A and 314B of outer package 314. However, collector plates 352A and 353A constituting collectors 352 and 353 may be larger than terminals 352B and 353B since the plates are provided on end surfaces 311A and 311B of capacitor element 311. This structure reduces the electrical resistance of collectors 352 and 353 themselves, and reduces the connection resistance of electrode foils 315 and 316 and collectors 312 and 313, thereby providing solid electrolytic capacitor 3003 with a small equivalent series resistance (ESR).

Thus, the size (width) of collector plates 352A and 383A is different from the size (width) of terminals 352B and 353B of collectors 352 and 353. In solid electrolytic capacitor element 1001, the electronic component according to Embodiment 1 including collector plates 112A and 113A formed unitarily with terminals 112B and 113B, a larger difference in widths causes a larger material loss. In solid electrolytic capacitor 3001, the electronic component according to Embodiment 6, terminals 352B and 353B for external connection are joined to one ends of collector plates 352A and 353A having a flat plate shape. Thus, this structure reduces material loss of collectors 352 and 353, and allows solid electrolytic capacitor 3003 to be manufactured at high productivity and flexibility in the order of processes, such as bending and twisting.

Figure 25:
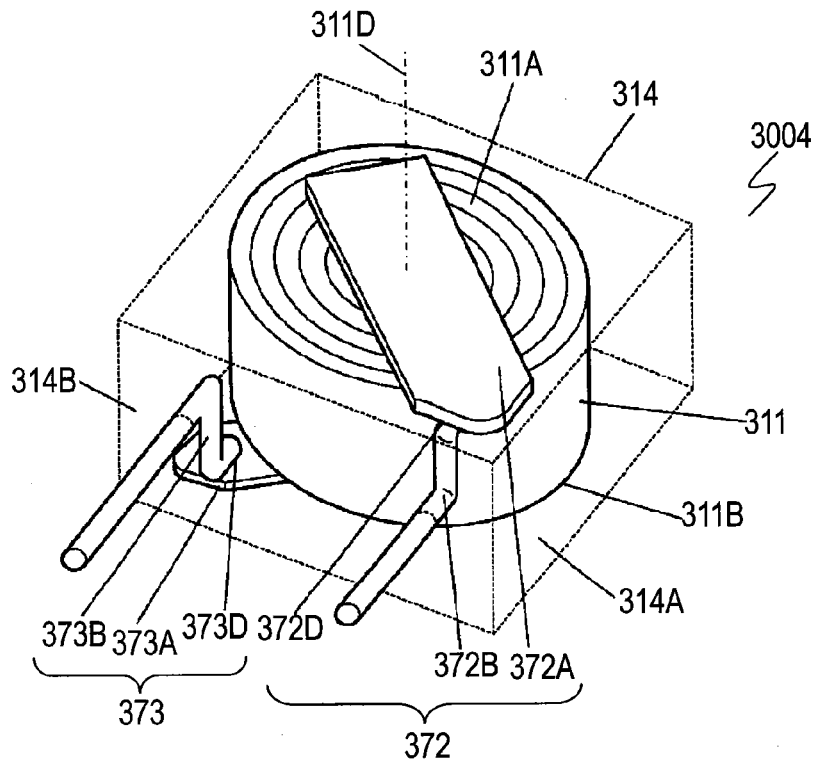
FIG. 25 is a perspective view of another electronic component according to Embodiment 7.
Figure 26:
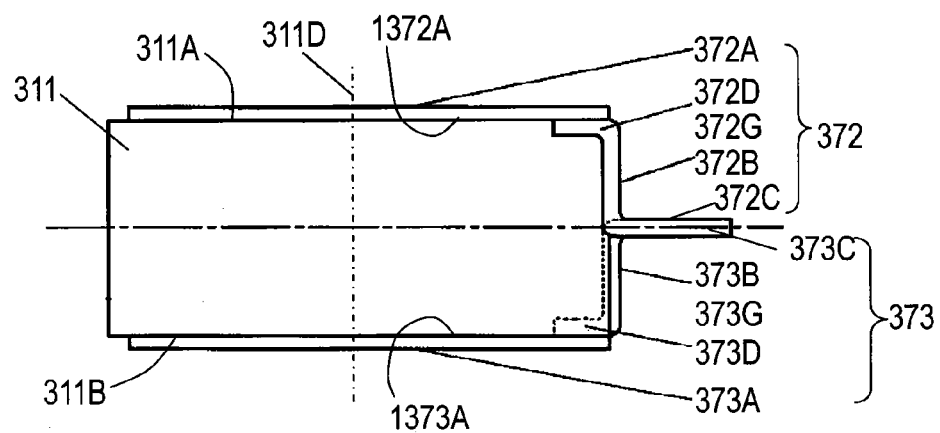
FIG. 26 is a side view of the electronic component according to Embodiment 7 for illustrating a method of manufacturing the electronic component.

FIG. 25 is a perspective view of solid electrolytic capacitor 3004, another electronic component according to Embodiment 7. FIG. 26 is a side view of capacitor element 311, a functional element of solid electrolytic capacitor 3004. In FIGS. 25 and 26, components identical to those of solid electrolytic capacitor 3001 according to Embodiment 6 shown in FIGS. 19 to 21F are denoted by the same reference numerals, and their description will be omitted. Solid electrolytic capacitor 3004 shown in FIGS. 25 and 26 include collectors 372 and 373 instead of collectors 312 and 313 of solid electrolytic capacitor 3001 according to Embodiment 6 shown in FIG. 19. Collectors 372 and 373 include collector plates 372A and 373A giving a flat plate shape and terminals 372B and 373B extending from collector plates 372A and 373A, respectively. Collector plates 372A and 373B are joined to end surfaces 311A and 311B of capacitor element 311, respectively, Joining portions 372D and 373D of terminals 372B and 373B have round wire shapes and are respectively joined to surfaces 1372A and 1373A of collector plates 372A and 373A facing each other in the direction of center axis 311D. This arrangement allows joining portions 372D and 373D to be accommodated at corners 314A and 314B of outer package 314 without projecting out from collector plates 372A and 373A. This structure prevents the height of solid electrolytic capacitor 3004 from increasing by the thicknesses of terminals 372B and 373B.

Figure 27:
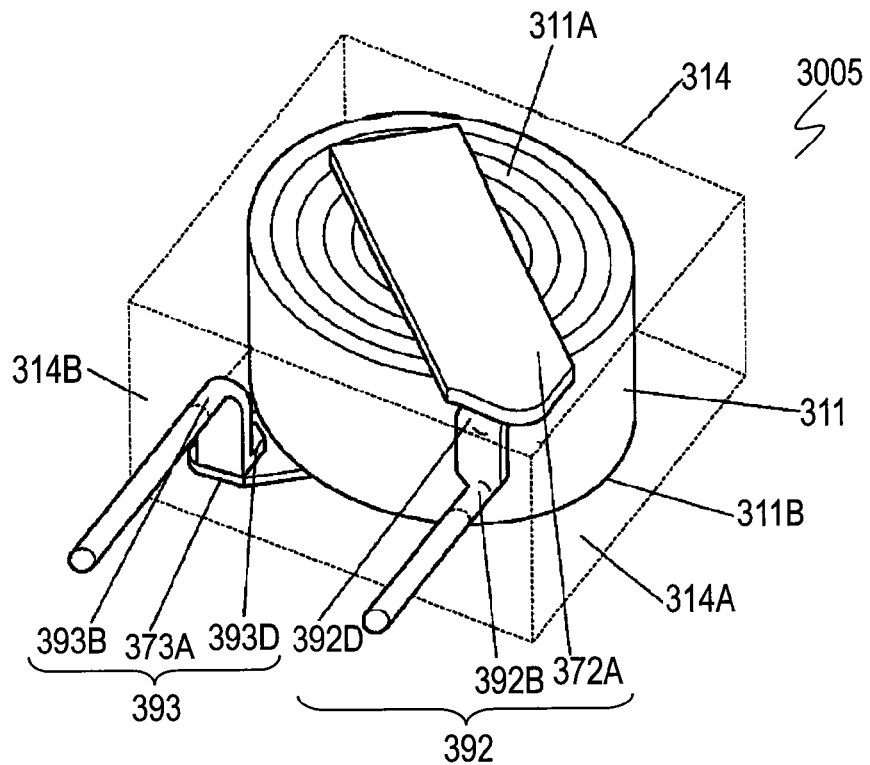
FIG. 27 is a perspective view of another electronic component according to Embodiment 7.

FIG. 27 is a perspective view of solid electrolytic capacitor 3005, a further electronic component according to Embodiment 7 of the invention. In FIG. 27, components identical to those of solid electrolytic capacitor 3004 shown in FIGS. 25 and 26 are denoted by the same reference numerals, and their description will be omitted. Solid electrolytic capacitor 3005 shown in FIG. 27 includes collectors 392 and 393 instead of collectors 372 and 373 of solid electrolytic capacitor 3005 shown in FIGS. 25 and 26. Collectors 392 and 393 include collector plates 372A and 373A similar to solid electrolytic capacitor 3004, and terminals 392B and 393B. Each of terminals 392B and 393B of collectors 392 and 393 includes joining portions 382D and 393D formed by processing the end of terminals 392B and 393B having a round wire shape into a flat shape. Joining portions 392D and 393D having the flat shapes are joined to collector plates 372A and 373A, respectively.

Figure 28:
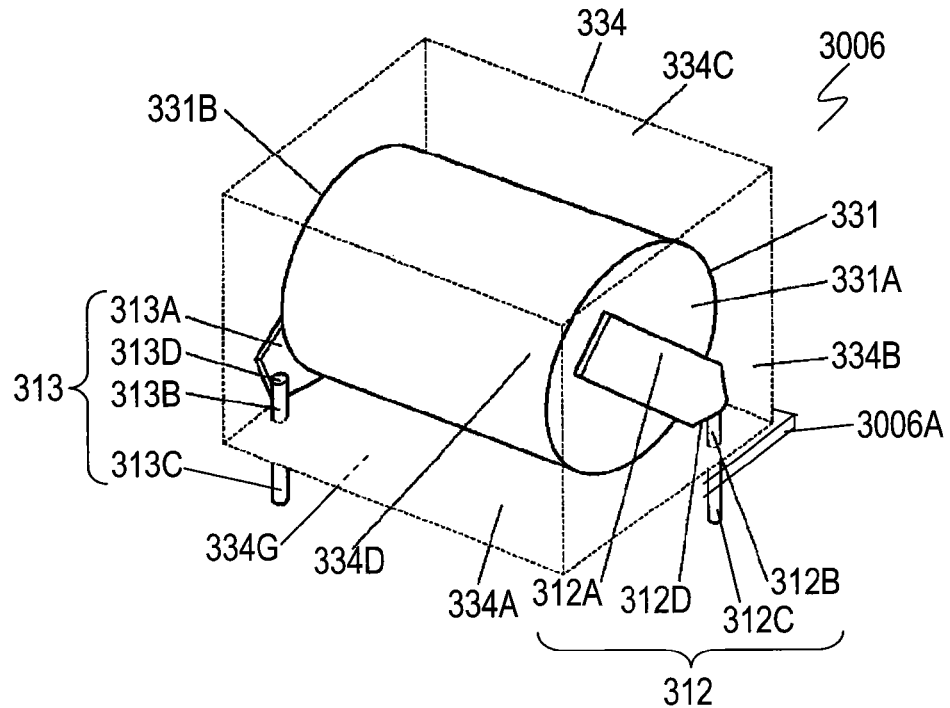
FIG. 28 is a perspective view of another electronic component according to Embodiment 7.

FIG. 28 is a perspective view of solid electrolytic capacitor 3006, a further electronic component according to Embodiment 7 of the present invention. Solid electrolytic capacitor 3006 shown in FIG. 28 includes capacitor element 331, collectors 412 and 413, and outer package 334 instead of capacitor element 311, collectors 312 and 313, and outer package 314 of solid electrolytic capacitor 3001 shown in FIGS. 19 and 20. Capacitor element 331 has a cylindrical shape having end surfaces 331A and 331B, side surface 331C, and center axis 331D similar to end surfaces 311A and 311B, side surface 311C, and center axis 311D of capacitor element 311 of solid electrolytic capacitor 3001. Outer package 334 having a rectangular parallelepiped shape accommodates cylindrical capacitor element 331, and has corners 334A to 334D and surfaces 334F and 334G similar to corners 314A to 314D and surfaces 314F to 314G of solid electrolytic capacitor 3001. Collectors 412 and 413 include collector plate 412A and 413A and terminal 412B and 413B having round bar shapes joined to one ends of collector plate 412A and 413B. Collector plates 412A and 413A are joined to end surfaces 331A and 331B of capacitor element 331, respectively. Terminals 412B and 413B extend in the same direction perpendicular to center axis 331D from collector plates 412A and 413B, respectively. Distal end portions 412C and 413C of terminals 412B and 413B are exposed from surface 334G of outer package 334. Surface 334G is a mounting surface adapted to contact circuit board 3006A when capacitor 3006 is mounted onto circuit board 3006A. Center axis 331D is parallel to surface 334G, i.e., the mounting surface. Joining portions 412D and 413D of terminals 412B, 413B having the round wire shapes are joined to surfaces of collector plates 412A and 413A facing each other in the direction of center axis 331D. This arrangement allows joining portions 412D, 413D to be accommodated at corners 334A and 334B of outer package 334 without projecting out from collector plates 412A and 413A. This structure prevents the width of solid electrolytic capacitor 3006 from increasing by the thicknesses of terminals 412B and 413B.

In solid electrolytic capacitor 3003 shown in FIG. 25, collector plates 352A and 353A can be made of metal material different from terminals 352B and 353B. In this case, when collector plates 352A and 353A are jointed to terminals 352B and 353B by welding, such as resistance welding or laser welding, respectively, the different metal materials melt and diffuse at joint portions at which collector plates 352A and 353A are jointed to terminals 352B and 353B. This case process may produce whisker under an environment of high humidity, temperature cycle depending on the combination of the metal materials. The whisker may short-circuits terminals 352B and 353B if the joint portion is exposed to the outside of outer package 314. According to Embodiment 3, collector plates 352A and 353A can be made of aluminum. Terminals 352B and 353B can include an iron base having a flat panel shape, a copper layer as a base layer provided on a surface of the iron base, and a tin plated layer provided on the copper layer. In this case, aluminum and tin diffuse at the joining portion when joining portions 352F and 353F of terminals 352B and 353B are joined to collector plates 352A and 353A by welding, respectively. The diffused aluminum and tin are left under an environment of high temperature and high humidity or subjected to heat cycle, and thereby, generate tin whisker. Upon growing, the tin whisker may short-circuit between terminals 352B and 353B.

In solid electrolytic capacitor 3003, the electronic component according to Embodiment 7 shown in FIG. 24, the portions where joining portions 352F and 353F of terminals 352B and 353B are joined to collector plates 352A and 353A, respectively, are covered by outer package 314 made of insulating resin, such as epoxy resin. This resin prevents the short-circuiting between terminals 352B and 353B caused by the whisker generated under the environment of high humidity or temperature cycle.

In solid electrolytic capacitor 3003, since terminals 352B and 353B are arranged at corners 314A and 314B of outer package 314, respectively, the thickness of outer package 314 is not necessarily large enough to cover the portions where collector plates 352A and 353A and terminals 352B and 353B are joined, respectively.

Exemplary Embodiment 8

Figure 29:
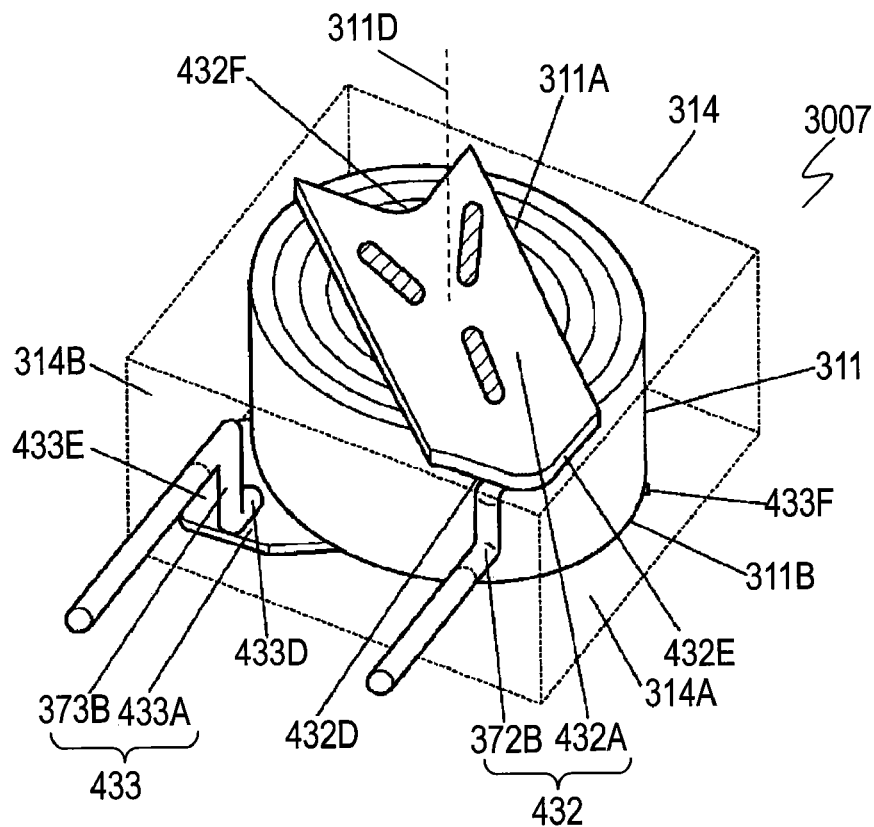
FIG. 29 is a perspective view of an electronic component according to Exemplary Embodiment 8 of the invention.

FIG. 29 is a perspective view of solid electrolytic capacitor 3007, an electronic component according to Exemplary Embodiment 8 of the present invention. In FIG. 29, components identical those of solid electrolytic capacitor 3004 according to Embodiment 7 shown in FIG. 25 are denoted by the same reference numerals, and their description will be omitted.

Solid electrolytic capacitor 3007 shown in FIG. 29 includes collectors 432 and 433 instead of collectors 372 and 373 of solid electrolytic capacitor 3004 according to Embodiment 7 shown in FIG. 25. Collectors 432 and 433 of solid electrolytic capacitor 3007 include collector plates 432A and 433A instead of collector plates 372A and 373A of collectors 372 and 373 of solid electrolytic capacitor 3004 according to Embodiment 7. Collector plate 432A having a flat plate shape has end 432E arranged at corner 314A and has end 432F opposite to end 432E. Collector plate 433A having a flat plate shape has end 433E arranged at corner 314B and has end 433F opposite to end 433E. Similar to collectors 372 and 373 according to Embodiment 7, joining portions 432D and 433D of terminals 372B and 373B are joined to ends 432E and 433E of collector plates 432A and 433A having the flat plate shapes, respectively. End 432E of collector plate 452A has a shape protruding along surfaces 314G and 314H of outer package 314, that is, along the shape of corner 314A. End 432F of collector plate 432A has a shape depressed to fit the protruding shape of end 432E. End 433E of collector plate 433A has a shape protruding along surfaces 314G and 314J of outer package 314, that is, along the shape of corner 314B. End 433F of collector plate 453A has a shape depressed to fit the protruding shape of end 433E.

In solid electrolytic capacitor 3007 according to Embodiment 8, end 432E joined to terminal 372B of collector plate 432A is positioned at corner 314A of outer package 314. End 432H protrudes along surfaces 314G and 314H of outer package 314, and hence, increase the area of the portion of collector plate 432A joined to terminal 372B as large as possible in a limited space of corner 314A, thereby allowing collector plate 432A to be joined to terminal 372B with a large strength.

End 432F of collector plate 432A opposite to end 432E has the depressed shape fitting the protruding shape of end 432E, enlarging a portion of end surface 311A of capacitor element 311 into which the liquid substance penetrates. The shapes of ends 432E and 432F allow collector plate 432A can be fixed by welding radially from a center of end surface 311A of capacitor element 311, thereby allowing collector plate 432A to be fixed to capacitor element 311 with a large joining strength.

Since the protruding shape of end 432H fits the depressed shape of end 432J, collector plate 432A can be manufactured efficiently by continuously cutting an elongate metal flat plate with a cutter while almost no waste material is produced.

Similarly, end 433E joined to terminal 373B of collector plate 433A is positioned at corner 314B of outer package 314. End 433H protrudes along surfaces 314G and 314J of outer package 314, and hence, increase the area of the portion of collector plate 433A joined to terminal 373B as large as possible in a limited space of corner 314B, thereby allowing collector plate 433A to be joined to terminal 373B with a large strength.

End 433F of collector plate 433A opposite to end 433E has the depressed shape fitting the protruding shape of end 433E, enlarging a portion of end surface 311A of capacitor element 311 into which the liquid substance penetrates. The shapes of ends 433E and 433F allow collector plate 433A can be fixed by welding radially from a center of end surface 311B of capacitor element 311, thereby allowing collector plate 433A to be fixed to capacitor element 311 with a large joining strength.

Since the protruding shape of end 433H fits the depressed shape of end 433J, collector plate 433A can be manufactured efficiently by continuously cutting an elongate metal flat plate with a cutter while almost no waste material is produced.

Exemplary Embodiment 9

Figure 30:
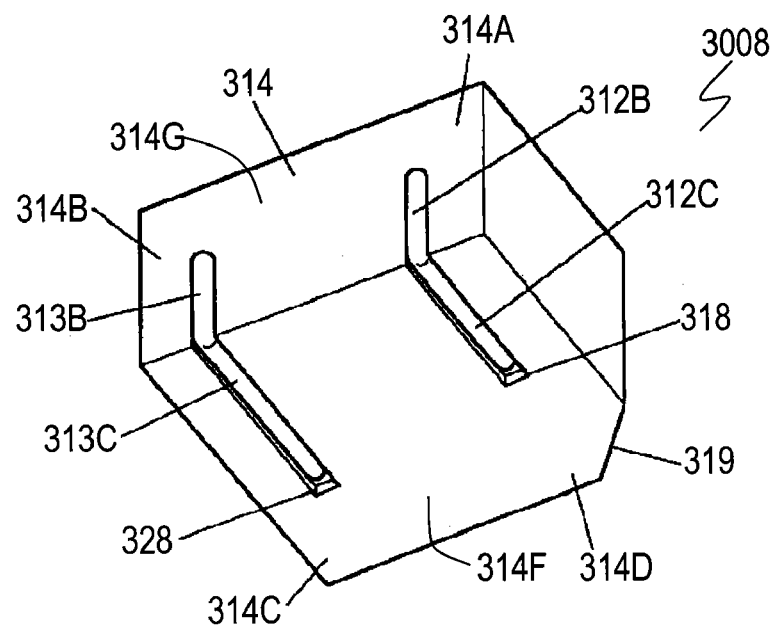
FIG. 30 is a bottom perspective view of an electronic component according to Exemplary Embodiment 9 of the invention.

FIG. 30 is a bottom perspective view of solid electrolytic capacitor 3008, an electronic component according to Exemplary Embodiment 9 of the present invention. In FIG. 30, components identical to those of solid electrolytic capacitor 3001 according to Embodiment 6 shown in FIGS. 19 to 21F are denoted by the same reference numerals, and their description will be omitted.

In solid electrolytic capacitor 3008 shown in FIG. 30, distal end portions 312C and 313C of terminals 312B and 313B exposed from outer package 314 are bent and extend along surfaces 314G and 314F of outer package 314. Thus, solid electrolytic capacitor 3008 can be surface mounted on circuit board 3001A while surface 314F of outer package 314 contacts circuit board 3001A. Surface 314F of outer package 314 has grooves 318 and 328 therein to fit and fix distal end portions 312C and 313C of terminals 312B and 313B therein.

Figure 31:
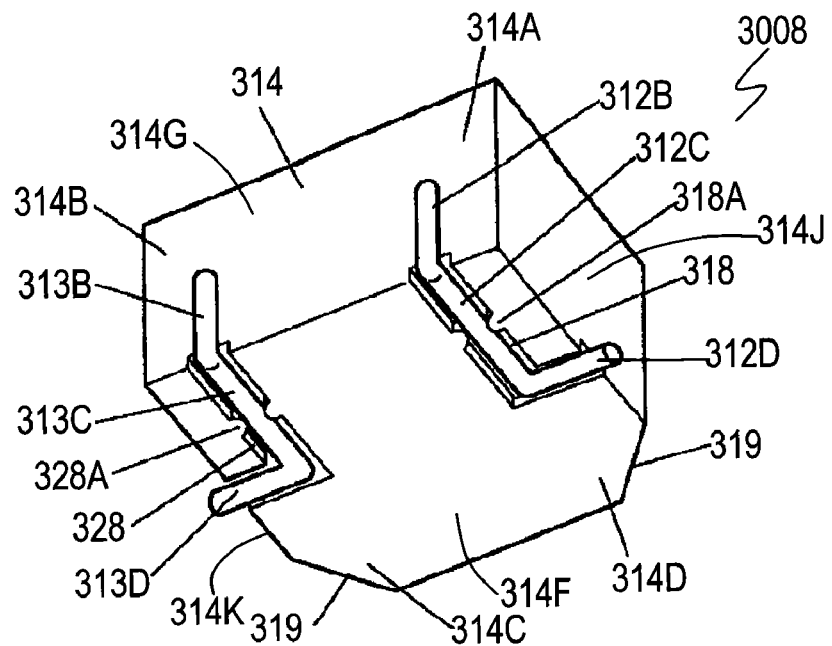
FIG. 31 is a bottom perspective view of another electronic component according to Embodiment 9.

FIG. 31 is a bottom perspective view of solid electrolytic capacitor 3009, another electronic component according to Embodiment 9 of the present invention. In FIG. 31, components identical to those of solid electrolytic capacitor 3008 shown in FIG. 30 are denoted by the same reference numerals, and their description will be omitted.

As shown in FIG. 31, distal end portions 312C and 313C of terminals 312B and 313B arranged on surface 314F of outer package 314 include protrusions 312D and 313D that project to outside from surfaces 314K and 314J of outer package 314, respectively. A user cannot confirm visually, from outside, whether or not distal end portions 312C and 313C which are provided on surface 314F of outer package 314 are soldered when solid electrolytic capacitor 3009 is soldered on circuit board 3001A. Projections 312D and 313D allow the user to confirm visually indirectly whether or not distal end portions 312C and 313C are soldered when solid electrolytic capacitor 3009 is soldered on circuit board 3001A.

Terminals 312B and 313B are bent along the surface of outer package 314. Protrusions 318A and 328A for sandwiching and fixing distal end portions 312C and 313C in grooves 318 and 328 may be provided the inner surfaces of grooves 318 and 328, respectively.

Figure 32:
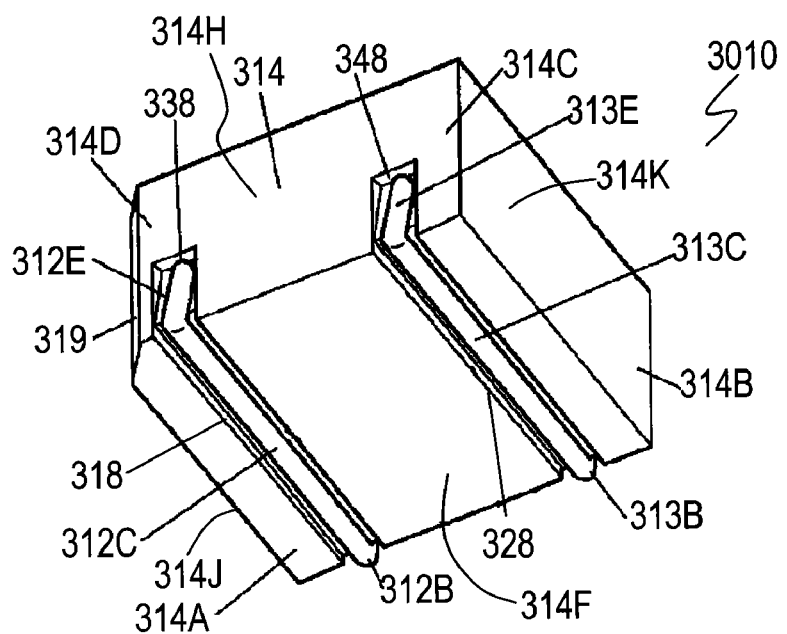
FIG. 32 shows a bottom perspective view of a further electronic component according to Embodiment 9.

FIG. 32 is a bottom perspective view of solid electrolytic capacitor 3010, a further electronic component according to Embodiment 9 of the present invention. In FIG. 32, components identical to those of solid electrolytic capacitor 3008 shown in FIG. 30 are denoted by the same reference numerals, and their description will be omitted.

As shown in FIG. 32, in solid electrolytic capacitor 3010, distal end portions 312C and 313C of terminals 312B and 313B exposed from surface 314G of outer package 314 reach surface 314H opposite to surface 314G beyond surface 314F. Distal end portions 312C and 313C are arranged in grooves 318 and 328 formed in surface 314F of outer package 314, respectively. Distal end portions 312C and 313C include pawl 312E and 313E bent and being extend along surface 314H of outer package 314. Surface 314H of outer package 314 has recesses 338 and 348 therein for receiving the distal ends of pawls 312E and 313E. The depths of recesses 338, 348 increase as being farther away from surface 314F. This configuration fixes distal end portions 312C and 313C easily in grooves 318 and 328, respectively, without precisely controlling the widths of distal end portions 312C and 313C and grooves 318 and 328.

Recesses 338 and 348 are preferably arranged in corners 314C and 314D of outer package 314 where terminals 312B and 313B are not provided, hence utilizing the space effectively without changing the size of outer package 314.

When collector plates 312A and 313A having the flat plate shapes shown in FIG. 19 are fixed to end surfaces 311A and 311B of capacitor element 311 by laser welding, collector plate 312A may not be parallel to collector plate 313A. Even in such case, the influence on the degree of parallelization of distal end portions 312C and 313C of terminals 312B and 313B can be suppressed since terminals 312B and 313B have a round wire shape with a circular cross section instead of a flat shape. As a result, distal end portions 312C and 313C arranged on surface 414F of outer package 414 do not twist, and reliably contact and are satisfactorily soldered to the circuit board, as shown in FIG. 32.

Figure 33:
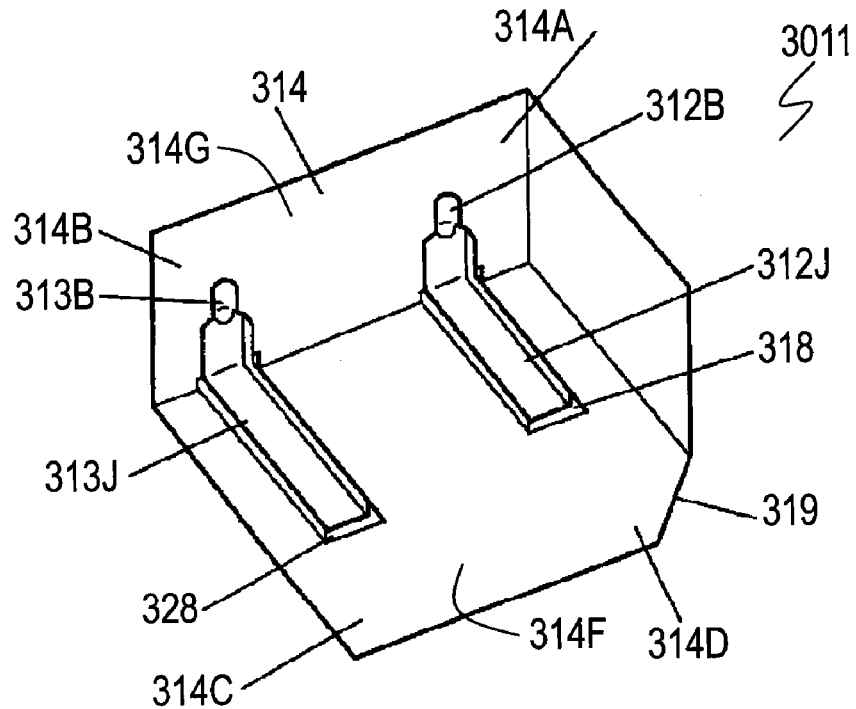
FIG. 33 is a bottom perspective view of a further electronic component according to Embodiment 9.

FIG. 33 is a bottom perspective view of solid electrolytic capacitor 3011, a further electronic component according to Embodiment 9 of the present invention. In FIG. 33, components identical to those of solid electrolytic capacitor 3008 shown in FIG. 30 are denoted by the same reference numerals, and their description will be omitted.

In solid electrolytic capacitor 3011, terminals 312B and 313B of collectors 312 and 313 include distal end portions 312J and 313J instead of distal end portions 312C and 313C of solid electrolytic capacitor 3008 shown in FIG. 30. Distal end portions 312J and 313J of terminals 312B and 313B have a flat plate shape, and are bent to extend along surfaces 314G and 314F of outer package 314. Distal end portions 312J and 313J are processed to have a flat plate shape from a round wire shape, and are bent along surfaces 314G and 314F. Distal end portions 312J and 313J with the flat plate shape thus become parallel, and increase the area to be soldered with the circuit board, thus connecting solid electrolytic capacitor 3011 to the circuit board with a large strength.

In the case that solid electrolytic capacitors 3008 to 3011 according to the Embodiment 9 have polarity, the appearance of capacitors 3008 to 3011 can be determined appropriately to allow the polarity to be visually recognized. In solid electrolytic capacitor 3008 shown in FIG. 30, the polarities of terminals 312B and 313B can be visually recognized by the lengths of distal end portions 312C and 313C exposed to outside of outer package 314 which are different from each other. Furthermore, the polarities of terminals 313B and 312B exposed from corners 314B and 314A opposite to corners 314C and 314D, respectively, can be visually recognized by forming chamfered portion 319 only in one of corners 314C and 314D of four corners 314A to 314D of outer package 314 having the rectangular parallelepiped shape where terminals 312B and 313B are not provided.

In solid electrolytic capacitor 3009 shown in FIG. 31, chamfered portion 319 is formed in both corners 314C and 314D of the outer package. This structure reduces the amount of resin material of outer package 314, accordingly reducing the cost of capacitor 3009.

The shape of chamfered portion 319 may be flat or curved, and may be any shape that can indicate the polarity and that can ensure necessary characteristics, such as air tightness, heat resistance, impact resistance, and vibration resistance of outer package 314.

What is claimed is:

1. An electronic component comprising:
    a functional element having
        a first end surface having a circular shape and functioning as an electrode,
        a second end surface which is opposite to the first end surface along a center axis and which is parallel to the first end surface, the second end face having a circular shape and functioning as an electrode, and
        a side surface having a cylindrical shape extending along the center axis, wherein the functional element includes first and second electrode foils which are rolled about the center axis and which are exposed from the first and second surfaces, respectively;
    a first collector including
        a first collector plate joined to the first end surface of the functional element, and
        a first terminal extending from the first collector plate;
    a second collector including
        a second collector plate joined to the second end surface of the functional element, and
        a second terminal extending from the second collector plate; and
    an outer package having a rectangular parallelepiped shape for integrally covering the functional element, the first collector, and the second collector, wherein
    the first terminal of the first collector and the second terminal of the second collector include a first distal end portion and a second distal end portion exposed from the outer package, respectively,
    the outer package has a first surface and a second surface parallel to the first end surface and the second end surface of the functional element, and has first to fourth corners as seen from a direction of the center axis,
    the first corner is adjacent to the second corner and is positioned diagonally from the third corner, and
    the first terminal and the second terminal are arranged at the first corner and the second corner of the outer package, respectively.

2. The electronic component according to claim 1, wherein the first collector plate of the first collector partially faces the second collector plate of the second collector across the functional element.

3. The electronic component according to claim 1, wherein
    the outer package further has a third surface connected to the first surface and the second surface, the third surface being parallel to the center axis, and
    the first distal end portion of the first terminal and the second distal end portion of the second terminal extend in a same direction from the third surface of the outer package.

4. The electronic component according to claim 1, wherein a line connecting the first distal end portion and the second distal end portion is parallel to the first end surface and the second end surface of the functional element.

5. The electronic component according to claim 1, wherein the first distal end portion and the second distal end portion extend along a surface of the outer package.

6. The electronic component according to claim 1, wherein the outer package has a chamfered portion provided in the third corner.

7. The electronic component according to claim 1, wherein
    the functional element further includes
        a separator provided between the first and the second electrode foils, and
        an electrolyte held in the separator, and
    the first and the second electrode foils, and the separator are rolled about the center axis.

8. The electronic component according to claim 1, wherein
    the first terminal is joined to the first collector plate as a member separate from the first collector plate, and
    the second terminal is joined to the second collector plate as a member separate from the second collector plate.

9. The electronic component according to claim 8, wherein widths of the first and the second collector plates are larger than widths of the first and the second terminals.

10. The electronic component according to claim 8, wherein
    the first collector plate and the second collector plate has include a first surface and a second surface facing each other in a direction of the center axis, respectively,
    the first terminal is joined to the first surface of the first collector plate, and
    the second terminal is joined to the second surface of the second collector plate.

11. The electronic component according to claim 8, wherein a portion where the first collector plate and the first terminal are joined and a portion where the second collector plate and the second terminal are joined are covered by the outer package.

12. The electronic component according to claim 8, wherein
    the first collector plate extends from the first corner towards the third corner of the outer package,
    the first collector plate extends from the first corner towards the third corner of the outer package,
    the outer package further has a third surface extending from the first corner to the third corner, a fourth surface extending from the first corner to the fourth corner, and a fifth surface extending from the second corner to the third corner,
    the first collector plate includes
        a first end positioned at the first corner and having a shape protruding along the third surface and the fourth surface of the outer package, and a second end being opposite to the first end and having a shape depressed to fit the protruding shape of the first end, and the second collector includes
a third end positioned at the second corner and having a shape protruding along the third surface and the fifth surface of the outer package, and
a fourth end being opposite to the third end and having a shape depressed to fit the protruding shape of the third end.

13. The electronic component according to claim 1, wherein
the first distal end portion of the first terminal has a round wire shape having a circular cross section, and
the second distal end portion of the second terminal has a round wire shape having a circular cross section.

14. The electronic component according to claim 13, wherein
the first distal end portion and the second distal end portion extend along a surface of the outer package, and
respective portions of the first distal end portion and the second distal end portion have flat shapes.

15. A method of manufacturing an electronic component comprising:
providing a functional element having
a first end surface having a circular shape and functioning as an electrode,
a second end surface which is opposite to the first end surface along a center axis and which is parallel to the first end surface, the second end face having a circular shape and functioning as an electrode, and
a side surface having a cylindrical shape extending along the center axis, wherein the functional element includes first and second electrode foils which are rolled about the center axis and which are exposed from the first and second surfaces, respectively;
providing a first collector including
a first collector plate joined to the first end surface of the functional element, and
a first terminal extending from the first collector plate;
providing a second collector including
a second collector plate joined to the second end surface of the functional element, and
a second terminal extending from the second collector plate; and
providing an outer package having a rectangular parallelepiped shape for integrally covering the functional element, the first collector, and the second collector, wherein
the first terminal of the first collector and the second terminal of the second collector include a first distal end portion and a second distal end portion exposed from the outer package, respectively,
the outer package has a first surface and a second surface parallel to the first end surface and the second end surface of the functional element, and has first to fourth corners as seen from a direction of the center axis,
the first corner is adjacent to the second corner and is positioned diagonally from the third corner, and
the first terminal and the second terminal are arranged at the first corner and the second corner of the outer package, respectively.

16. The method according to claim 15, wherein
the outer package further has a third surface which is connected to the first surface and the second surface and which is parallel to the center axis,
the first distal end portion of the first terminal and the second distal end portion of the second terminal extend in a same direction from the third surface of the outer package,
said method further comprising immersing the functional element in liquid substance while holding the first distal end portion of the first terminal and the second distal end portion of the second terminal after said providing the first collector and said providing the second collector.

17. The method according to claim 16, wherein
the functional element further includes
a separator provided between the first and the second electrode foils, and
an electrolyte held in the separator,
the first electrode foil, the second electrode foil, and the separator are rolled about the center axis, and
said immersing the functional element in the liquid substance comprises forming an electrolyte between the first electrode foil and the second electrode foil.

18. The method according to claim 17, wherein the liquid substance is solution containing polymerizable monomer and oxidant or solution containing conductive polymer dispersed therein.

19. The method according to claim 17, wherein the liquid substance comprises driving electrolytic solution.

20. The method according to claim 17, wherein
the first terminal is a member separate from the first collector plate, and
the second terminal is a member separate from the second collector plate,
said method further comprising:
joining the first terminal to the first collector plate, and
joining the second terminal to the second collector plate.

21. The method according to claim 15, wherein
the first distal end portion of the first terminal has a round wire shape having a circular cross section, and
the second distal end portion of the second terminal has a round wire shape having a circular cross section.

* * * * *